(12) United States Patent
Takeuchi et al.

(10) Patent No.: US 7,866,829 B2
(45) Date of Patent: Jan. 11, 2011

(54) OPTICAL DIAPHRAGM, PROJECTOR, CORRECTION PARAMETER CALIBRATOR, AND CORRECTION PARAMETER CALIBRATING METHOD

(75) Inventors: Kesatoshi Takeuchi, Shiojiri (JP); Hidehito Iisaka, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 1049 days.

(21) Appl. No.: 11/645,660

(22) Filed: Dec. 27, 2006

(65) Prior Publication Data

US 2007/0153238 A1 Jul. 5, 2007

(30) Foreign Application Priority Data

Dec. 29, 2005 (JP) .............................. 2005-380647

(51) Int. Cl.
*G03B 21/14* (2006.01)
(52) U.S. Cl. .......................................... 353/88; 353/97
(58) Field of Classification Search .................. 353/88, 353/89, 90, 91, 92, 93, 97
See application file for complete search history.

(56) References Cited

U.S. PATENT DOCUMENTS

| | | | | |
|---|---|---|---|---|
| 5,379,083 | A * | 1/1995 | Tomita | 353/122 |
| 5,597,223 | A * | 1/1997 | Watanabe et al. | 353/97 |
| 5,622,418 | A * | 4/1997 | Daijogo et al. | 353/97 |
| 6,438,532 | B1 | 8/2002 | Kiji | |
| 7,021,772 | B2 * | 4/2006 | Abe et al. | 353/97 |
| 7,093,941 | B2 * | 8/2006 | Kawashima et al. | 353/97 |
| 7,210,795 | B2 | 5/2007 | Hara et al. | |
| 2003/0146919 | A1 * | 8/2003 | Kawashima et al. | 345/609 |
| 2004/0141159 | A1 * | 7/2004 | Abe et al. | 353/97 |
| 2004/0212900 | A1 | 10/2004 | Seita | |
| 2005/0068505 | A1 | 3/2005 | Momose et al. | |
| 2005/0200817 | A1 * | 9/2005 | Kim et al. | 353/97 |
| 2005/0264770 | A1 * | 12/2005 | Hara et al. | 353/97 |
| 2005/0275399 | A1 | 12/2005 | Kitanaka et al. | |

FOREIGN PATENT DOCUMENTS

| | | |
|---|---|---|
| JP | A-63-256814 | 10/1988 |
| JP | 07-043771 A | 2/1995 |
| JP | A-10-268906 | 10/1998 |
| JP | A-11-237363 | 8/1999 |
| JP | A-11-249194 | 9/1999 |

(Continued)

*Primary Examiner*—Georgia Y Epps
*Assistant Examiner*—Bao-Luan Le
(74) *Attorney, Agent, or Firm*—Oliff & Berridge, PLC

(57) ABSTRACT

An optical diaphragm for adjusting an amount of an incident light beam, includes: light shielding vanes that are configured movably, and move to change an opening area enabling a passage of the light beam, thereby adjusting the amount of the light beam; an electromagnetic actuator including a coil through which a current passes, and a permanent magnet that generates a magnetic flux, moves with respect to the coil by an electromagnetic force due to an interaction between the current passing through the coil and the magnetic flux, and is connected to the light shielding vanes to move the light shielding vanes; and a position detector including: a magnetic element that outputs a predetermined voltage in accordance with intensity of a magnetic field from the permanent magnet; and an output characteristics corrector that obtains a predetermined correction parameter, and corrects output characteristics of the magnetic element based on the correction parameter.

12 Claims, 17 Drawing Sheets

FOREIGN PATENT DOCUMENTS

| JP | A-2002-318622 | 10/2002 |
| JP | A-2003-107556 | 4/2003 |
| JP | 2004-264819 A | 9/2004 |
| JP | 2004-325745 A | 11/2004 |
| JP | 2005-351849 A | 12/2005 |
| JP | A-2005-338711 | 12/2005 |

* cited by examiner

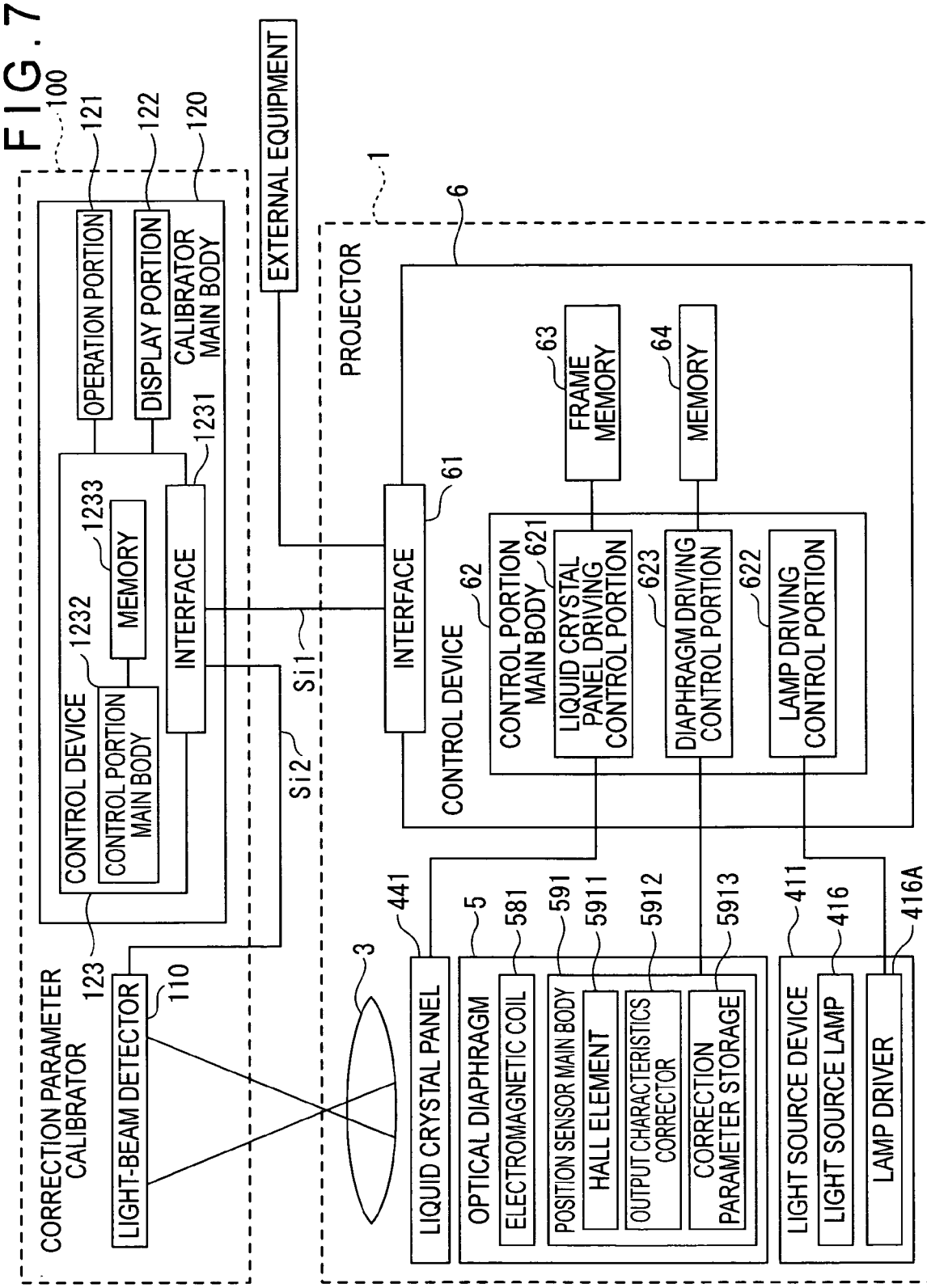

OPTICAL DIAPHRAGM, PROJECTOR, CORRECTION PARAMETER CALIBRATOR, AND CORRECTION PARAMETER CALIBRATING METHOD

The entire disclosure of Japanese Patent Application No. 2005-380647, filed Dec. 29, 2005, is expressly incorporated by reference herein.

BACKGROUND

1. Technical Field

The present invention relates to an optical diaphragm, a projector, a correction parameter calibrator, and a correction parameter calibrating method.

2. Related Art

Up to now, a projector has been known, which includes a light source device, an optical modulator for modulating a light beam irradiated from the light source device in accordance with image information to form an optical image, and a projection optical device for enlarging and projecting the optical image.

In order to adjust the amount of a light beam irradiated from the light source device to be incident upon the optical modulator for the purpose of enhancing contrast of a projected image or the like in such a projector, a projector having an opening/closing light shielding member (optical diaphragm) for partially shielding the light beam irradiated from the light source device has been proposed (see JP 2004-264819 A, for example).

The optical diaphragm described in the document has a pair of light shielding plates (light shielding vanes) each having a rectangular plate shape configured so as to rotate. Then, the optical diaphragm moves the light shielding vanes to desired positions with good precision by a driving device such as a pulse motor, thereby shielding against a light beam irradiated from the light source device in stages.

However, the optical diaphragm described in the above-mentioned document uses the pulse motor or the like as the driving device, so the size of the driving device inhibits the miniaturization of the optical diaphragm. Further, due to the vibration during driving of the driving device, stable driving cannot be realized.

Therefore, there is a demand for a technique capable of simplifying the configuration of an optical diaphragm, and moving light shielding vanes with high precision to perform stable driving.

SUMMARY

It is an object of the invention to provide an optical diaphragm capable of simplifying a configuration, and moving light shielding vanes with high precision to perform stable driving, a projector, a correction parameter calibrator, and a correction parameter calibrating method.

An optical diaphragm for adjusting an amount of an incident light beam according to the invention includes: light shielding vanes that are configured movably, and move to change an opening area enabling a passage of the light beam, thereby adjusting the amount of the light beam; an electromagnetic actuator including a coil through which a current passes, and a permanent magnet that generates a magnetic flux, moves with respect to the coil by an electromagnetic force due to an interaction between the current passing through the coil and the magnetic flux, and is connected to the light shielding vanes to move the light shielding vanes; and a position detector including: a magnetic element that outputs a predetermined voltage in accordance with intensity of a magnetic field from the permanent magnet; and an output characteristics corrector that obtains a predetermined correction parameter, and corrects output characteristics of the magnetic element based on the correction parameter.

According to the aspect of the invention, the optical diaphragm has the electromagnetic actuator as a driving device for moving the light shielding vanes. The electromagnetic actuator has the following features.

That is, the electromagnetic actuator enables low-voltage driving, which realizes low power consumption of the optical diaphragm.

Further, the electromagnetic actuator exhibits a relatively large force in a relatively small region, and hence, can move the light shielding vanes smoothly.

Further, the electromagnetic actuator can be used even in a poor environment (e.g., under high humidity), which prolongs the life of the optical diaphragm.

Still further, the electromagnetic actuator has satisfactory driving response characteristics, so the electromagnetic actuator enables the light shielding vanes to respond at a high speed to rotate smoothly.

Accordingly, by using the electromagnetic actuator as the driving device, compared with the configuration using a pulse motor or the like as the driving device as in the conventional example, the driving device can be formed with a simple configuration such as a permanent magnet and a coil, whereby the optical diaphragm can be simplified and miniaturized. Further, compared with the conventional configuration, the vibration during driving can be reduced, whereby stable driving of the optical diaphragm can be realized.

Regarding a control device for driving the optical diaphragm, by adopting a processing configuration shown below, a processing load can be alleviated.

The control device drives the electromagnetic actuator based on an output value (voltage value) from a position detector (magnetic element). More specifically, when the light shielding vanes are placed at positions with which a predetermined opening area is obtained, based on opening area-voltage value associated information (in which an opening area stored in a memory or the like is associated with a designed voltage value), the control device recognizes the designed voltage value associated with the predetermined opening area. Then, the control device drives the electromagnetic actuator so that the output value from the position detector becomes substantially the same as the recognized designed voltage value, and places a permanent magnet at a predetermined position. That is, the control device places the permanent magnet at the predetermined position, thereby moving the light shielding vanes and placing them at positions with which the predetermined opening area is obtained.

However, in the case where production errors (e.g., a production error of a mounting position of the permanent magnet, a production error of a magnetization position of the permanent magnet, a production error of a mounting position of the position detector) occur in the optical diaphragm, the following problems arise.

Even in the case where the permanent magnet is placed at a position corresponding to the predetermined opening area, an output value different from the designed voltage value corresponding to the predetermined opening area is outputted from the position detector. Therefore, as described above, in the case where the control device drives the electromagnetic actuator so that the output value from the position detector becomes substantially the same as the designed voltage value corresponding to the predetermined opening area, the permanent magnet cannot be placed at the position corresponding to the predetermined position. That is, the light shielding vanes cannot be placed at the positions with which the predetermined opening area is obtained.

According to the aspect of the invention, the position detector has a magnetic element and an output characteristics corrector. Owing to this, if a correction parameter is calibrated to an optimum correction parameter, the output characteristics corrector corrects the output characteristics of the magnetic element based on the calibrated correction parameter. Therefore, even in the case where the above-mentioned production errors occur in the optical diaphragm, when the permanent magnet is placed at the position corresponding to the predetermined opening, the designed voltage value corresponding to the predetermined opening area can be outputted from the position detector (magnetic element). Therefore, as described above, in the case where the control device drives the electromagnetic actuator so that the output value from the position detector becomes substantially the same as the designed voltage value corresponding to the predetermined opening area, the permanent magnet can be placed at the position corresponding to the predetermined opening area, and the light shielding vanes can be placed with high precision at the positions with which the predetermined opening area is obtained. Thus, while the processing load of the control device that drives the optical diaphragm is being reduced, the light shielding vanes are moved with high precision using the control device, whereby stable driving can be realized.

In the optical diaphragm of the aspect of the invention, the correction parameter is preferably an offset correction parameter for, under a condition that the permanent magnet is placed at a defined position at which the opening area becomes a predetermined opening area, offsetting a position of the permanent magnet with respect to a defined voltage value so that the magnetic element outputs the predetermined defined voltage value, thereby correcting output characteristics.

According to the aspect of the invention, the correction parameter is the offset correction parameter. Therefore, the output characteristics corrector performs a correction (offset correction) of the output characteristics of the magnetic element using the offset correction parameter, thereby offsetting the position of the permanent magnet with respect to a specified voltage value (e.g., an offset voltage value), and enabling the magnetic element to output the specified voltage value under the condition that the permanent magnet is placed at a specified position with which the predetermined opening area is obtained. Thus, owing to the configuration in which the offset correction can be performed using the offset correction parameter, the output characteristics of the magnetic element can be corrected with a simple circuit configuration.

In the optical diaphragm of the aspect of the invention, the correction parameter is preferably a gain correction parameter that, when the permanent magnet is placed in a range from a first position with which the opening area becomes a minimum opening area to a second position with which the opening area becomes a maximum opening area, corrects output characteristics so that the magnetic element outputs each designed voltage value in terms of design so as to correspond to each position in the range of the permanent magnet.

According to the aspect of the invention, the correction parameter is the gain correction parameter. Therefore, the output characteristics corrector performs a correction (gain correction) of the output characteristics of the magnetic element using the gain correction parameter, thereby enabling the magnetic element to output each designed voltage value corresponding to each position in a range of the permanent magnet under the condition that the permanent magnetic is placed in a range from the first position with which the opening area becomes the minimum opening area to the second position with which the opening area becomes the maximum opening area. Thus, owing to the configuration in which the gain correction can be performed using the gain correction parameter, the output characteristics of the magnetic element can be corrected with a simple circuit configuration.

Further, owing to the gain correction, the voltage value outputted from the magnetic element can be corrected to each designed voltage value over an entire range (the first position to the second position), so stable driving can be realized by moving the light shielding vanes with high precision.

In the optical diaphragm of the aspect of the invention, it is preferable that the position detector include a correction parameter storage that stores the correction parameter so that the correction parameter is rewritable; and the output characteristics corrector reads the correction parameter stored in the correction parameter storage, and correct output characteristics of the magnetic element based on the read correction parameter.

According to the aspect of the invention, the correction parameter storage provided in the position detector stores the correction parameter so that it is rewritable. Therefore, the correction parameter can be appropriately calibrated to be updated to an optimum correction parameter. Thus, the output characteristics corrector corrects the output characteristics of the magnetic element using the updated optimum correction parameter, whereby in the case where the permanent magnet is placed at a position corresponding to a predetermined opening area, the magnetic element can output a designed voltage value corresponding to the predetermined opening area.

A projector of an aspect of the invention includes: a light source device; an optical modulator that modulates a light beam irradiated from the light source device; a projection optical device that enlarges and projects the light beam modulated in the optical modulator; an optical diaphragm that is placed in an optical path of the light beam irradiated from the light source device to the optical modulator, and adjusts a light amount of the light beam irradiated from the light source device to the optical modulator; and a control device for controlling the optical diaphragm.

In this case, regarding the control device, the configuration of a control device in which the above-mentioned processing load is alleviated can be adopted.

According to the aspect of the invention, the projector has the above-mentioned optical diaphragm, so it can have the same function and effect as those of the optical diaphragm.

Further, the optical diaphragm can adjust the amount of a light beam irradiated from the light source to the optical modulator. Therefore, for example, the control device controls the optical diaphragm in accordance with the brightness of an image to reduce the light amount in an entirely dark scene and to increase the light amount in an entirely light scene, thereby realizing a projected image with a high contrast ratio.

Further, the optical diaphragm can be simplified and miniaturized in terms of a configuration, so it can be easily placed between optical components disposed close to each other in the projector, whereby the degree of freedom of a layout of the projector can be enhanced.

Still further, owing to the optical diaphragm capable of suppressing the vibration during driving and performing stable driving, a projected image can be maintained satisfactorily with the influence by the vibration on the projected image suppressed.

Further, the light shielding vanes can be moved with high precision, using the control device, while the processing load of the control device is being reduced. Therefore, the amount of a light beam irradiated from the light source device to the optical modulator can be adjusted with high precision, and the quality of a projected image can be enhanced.

In the projector of the aspect of the invention, it is preferable that the control device include a correction parameter storage that stores the correction parameter so that the correction parameter is rewritable; and the output characteristics corrector read the correction parameter stored in the correction parameter storage, and correct output characteristics of the magnetic element based on the read correction parameter.

According to the aspect of the invention, the correction parameter storage provided in the control device stores the correction parameter so that it is rewritable. Therefore, the correction parameter is appropriately calibrated to be updated to an optimum correction parameter. Thus, the output characteristics corrector corrects the output characteristics of the magnetic element using the updated optimum correction parameter, whereby in the case where the permanent magnet is placed at a position corresponding to a predetermined opening area, the magnetic element can output a designed voltage value corresponding to the predetermined opening area.

A correction parameter calibrator of an aspect of the invention, for calibrating a correction parameter, is used for a projector including: a light source device; an optical modulator that modulates a light beam irradiated from the light source device; a projection optical device that enlarges and projects the light beam modulated in the optical modulator; an optical diaphragm that is placed in an optical path of the light beam irradiated from the light source device to the optical modulator, and adjusts a light amount of the light beam irradiated from the light source device to the optical modulator; and a projector-side control device that drives the light source device, the optical modulator, and the optical diaphragm, in which: the optical diaphragm includes: light shielding vanes that are configured movably, and move to change an opening area enabling a passage of the light beam, thereby adjusting the amount of the light beam; an electromagnetic actuator including a coil through which a current passes and a permanent magnet that generates a magnetic flux, moves with respect to the coil by an electromagnetic force due to an interaction between the current passing through the coil and the magnetic flux, and is connected to the light shielding vanes to move the light shielding vanes; and a position detector including: a magnetic element that outputs a predetermined voltage in accordance with intensity of a magnetic field from the permanent magnet; an output characteristics corrector that obtains a predetermined correction parameter, and corrects output characteristics of the magnetic element based on the correction parameter; and a correction parameter storage that stores the correction parameter so that the correction parameter is rewritable, the projector-side control device drives and controls the electromagnetic actuator based on an output value from the position detector; the correction parameter calibrator includes: a calibration-side control device that outputs a predetermined control instruction to the projector-side control device to drive the projector; and a light-beam detector that detects a light amount of an optical image enlarged and projected from the projector, and outputs detection light amount information on the light amount, the calibration-side control device includes: a light amount information storage that stores reference light amount information on a reference light amount to be a reference; an output value information storage that stores reference output value information on a reference output value to be a reference; a light source driving control device that causes the projector-side control device to drive the light source device, and causes the light source device to irradiate a light beam; a diaphragm driving control portion that causes the projector-side control device to drive the electromagnetic actuator, and places the permanent magnet at a reference position where the reference output value based on the reference output value information is outputted from the position detector; and a parameter updating portion that updates the correction parameter stored in the correction parameter storage so that a detection light amount based on the detection light amount information outputted from the light-beam detector becomes substantially the same as the reference light amount based on the reference light amount information.

The correction parameter calibrator of the aspect of the invention is a correction parameter calibrator, which is used for the above-mentioned projector. Therefore, the correction parameter calibrator can exhibit the same function and effect as those of the above-mentioned projector.

Further, the correction parameter calibrator includes the calibration-side control device and the light-beam detector. Therefore, under the condition that the projector is assembled, the correction parameter can be calibrated, for example, as follows.

First, the light source driving control portion of the calibration-side control device causes the projector-side control device to drive the light source device, thereby causing the light source device to irradiate a light beam (light beam irradiation step).

Next, the diaphragm driving control portion of the calibration-side control device causes the projector-side control device to drive the electromagnetic actuator, thereby placing the permanent magnet at the reference position where the reference output value based on reference output value information stored in the output value information storage is outputted from the position detector (electromagnetic element) (permanent magnetic positioning step).

Next, the calibration-side control device causes the light-beam detector to detect the light amount of an optical image to be enlarged and projected from the projector (light-beam detection step).

Next, the parameter updating portion of the calibration-side control device updates the correction parameter stored in the correction parameter storage so that the light amount detected by the light-beam detector becomes substantially the same as the reference light amount based on the reference light amount information stored in the light amount information storage (parameter updating step).

For example, in the case where production errors occur in the optical diaphragm as described above, even in the case where the projector-side control device places the permanent magnet at the reference position where the reference output value (designed voltage value) corresponding to the predetermined opening area is outputted from the position detector in the permanent magnet positioning step, the light shielding vanes are not placed at positions where the predetermined opening area is obtained. More specifically, the light amount detected in the light-beam detection step is not the same as the reference light amount corresponding to the predetermined opening area. By updating the correction parameter in the parameter updating step, the output characteristics of the magnetic element is corrected by the output characteristics corrector, and the output value outputted from the magnetic element is changed. Further, the projector-side control device controls so that the permanent magnet is placed at the reference position where the reference output value corresponding to the predetermined opening area is outputted from the position detector, whereby the position of the permanent magnet is changed, and the opening area by the light shielding vanes is changed. Then, in the parameter updating step, the correction parameter is updated so that the detected light amount becomes substantially the same as the reference light amount corresponding to the predetermined opening area, whereby in the case where the permanent magnet is placed at the position corresponding to the predetermined opening area, the reference output value corresponding to the predetermined opening area can be outputted from the position detector.

As described above, the correction parameter calibrating apparatus updates the correction parameter based on the light amount of an optical image irradiated from the light source device and enlarged and projected by the projection optical device via the optical diaphragm and the optical modulator under the condition that the projector is assembled. Therefore, the amount of a light beam irradiated from the light source device to the optical modulator can be adjusted with high precision, and the quality of a projected image can be enhanced.

A correction parameter calibrator of an aspect of the invention, for calibrating a correction parameter, is used for an optical diaphragm that adjusts an amount of an incident light beam, in which: the optical diaphragm includes: light shielding vanes that are configured movably, and move to change an opening area enabling a passage of the light beam, thereby adjusting the amount of the light beam; an electromagnetic actuator including a coil through which a current passes and a permanent magnet that generates a magnetic flux, moves with respect to the coil by an electromagnetic force due to an interaction between the current passing through the coil and the magnetic flux, and is connected to the light shielding vanes to move the light shielding vanes; and a position detector including: a magnetic element that outputs a predetermined voltage in accordance with intensity of a magnetic field from the permanent magnet; an output characteristics corrector that obtains a predetermined correction parameter, and corrects output characteristics of the magnetic element based on the correction parameter; and a correction parameter storage that stores the correction parameter so that the correction parameter is rewritable, the correction parameter calibrator includes: a correction light source device that irradiates a light beam to the optical diaphragm; a light-beam detector that detects an amount of a light beam irradiated from the correction light source device via the optical diaphragm; and a calibration-side control device that drives and controls the correction light source device and the electromagnetic actuator; and the calibration-side control device includes: a light amount information storage that stores reference light amount information on a reference light amount to be a reference; an output value information storage that stores reference output value information on a reference output value to be a reference; a light source driving control device that causes the correction light source device to irradiate a light beam; a diaphragm driving control portion that drives and controls the electromagnetic actuator based on an output value outputted from the position detector, and places the permanent magnet at a reference position where the reference output value based on the reference output value information is outputted from the position detector; and a parameter updating portion for updating the correction parameter stored in the correction parameter storage so that a detection light amount based on the detection light amount information outputted from the light-beam detector becomes substantially the same as the reference light amount based on the reference light amount information.

The correction parameter calibrator of the aspect of the invention is a correction parameter calibrator, which is used for the above-mentioned optical diaphragm. Therefore, the correction parameter calibrator can exhibit the same function and effect as those of the above-mentioned optical diaphragm.

Further, the correction parameter calibrator includes the light source device for correction, the light-beam detector and the calibration-side control device. Therefore, under the condition that the optical diaphragm is assembled, the correction parameter can be calibrated, for example, as follows.

First, the light source driving control portion of the calibration-side control device causes the light source device for correction to irradiate a light beam to the optical diaphragm (light-beam irradiation step).

Next, the diaphragm driving control portion of the calibration-side control device drives and controls the electromagnetic actuator to place the permanent magnet at the reference position where the reference output value based on the reference output value information stored in the output value information storage from the position detector (magnetic element) (permanent magnet positioning step).

Next, the calibration-side control device causes the light-beam detector to detect the amount of a light beam via the optical diaphragm irradiated from the light source device for correction (light-beam detection step).

Next, the parameter updating portion of the calibration-side control device updates the correction parameter stored in the correction parameter storage so that the light amount detected by the light-beam detector becomes substantially the same as the reference light amount based on the reference light amount information stored in the light amount information storage (parameter updating step).

For example, in the case where production errors occur in the optical diaphragm as described above, even in the case where the diaphragm driving control portion places the permanent magnet at the reference position where the reference output value (designed voltage value) corresponding to the predetermined opening area is outputted from the position detector in the permanent magnet positioning step, the light shielding vanes are not placed at positions with which the predetermined opening area is obtained. More specifically, the light amount detected in the light-beam detection step is not the same as the reference light amount corresponding to the predetermined opening area. By updating the correction parameter in the parameter updating step, the output characteristics of the magnetic element is corrected by the output characteristics corrector, and the output value outputted from the magnetic element is changed. Further, diaphragm driving control portion controls so that the permanent magnet is placed at the reference position where the reference output value corresponding to the predetermined opening area is outputted from the position detector, whereby the position of the permanent magnet is changed, and the opening area by the light shielding vanes is changed. Then, in the parameter updating step, the correction parameter is updated so that the detected light amount becomes substantially the same as the reference light amount corresponding to the predetermined opening area, whereby in the case where the permanent magnet is placed at the position corresponding to the predetermined opening area, the reference output value corresponding to the predetermined opening area can be outputted from the position detector.

As described above, the correction parameter calibrator updates the correction parameter based on the amount of a light beam via the optical diaphragm irradiated from the light source device for correction under the condition that the optical diaphragm is assembled. Therefore, it is not necessary to update the correction parameter under the condition that the optical diaphragm is mounted on optical equipment such as a projector, and the correction parameter can be updated using the optical diaphragm main alone and the correction parameter calibrator, whereby the efficiency of the operation space for updating the correction parameter can be enhanced.

In the correction parameter calibrator of the aspect of the invention, the correction light source device is preferably constructed of a solid light-emitting element.

According to an aspect of the invention, the light source device for correction is composed of a solid light-emitting element. Therefore, for example, compared with the configuration adopting a light source lamp of a discharge emitting type as the light source device for correction, the correction parameter calibrator can be miniaturized and reduced in weight. Further, since a light beam with a stable brightness can be irradiated from the light source device for correction, the correction parameter is updated based on the amount of a light beam with a stable brightness is updated, whereby the correction parameter can be calibrated with high precision.

A correction parameter calibrator of an aspect of the invention, for calibrating a correction parameter is used for an optical diaphragm that adjusts an amount of an incident light beam, in which: the optical diaphragm includes: light shielding vanes that are configured movably, and move to change an opening area enabling a passage of the light beam, thereby adjusting the amount of the light beam; an electromagnetic actuator including a coil through which a current passes and a permanent magnet that generates a magnetic flux, moves with respect to the coil by an electromagnetic force due to an interaction between the current passing through the coil and the magnetic flux, and is connected to the light shielding vanes to move the light shielding vanes; and a position detector including: a magnetic element that outputs a predetermined voltage in accordance with intensity of a magnetic field from the permanent magnet; an output characteristics corrector that obtains a predetermined correction parameter, and corrects output characteristics of the magnetic element based on the correction parameter; and a correction parameter storage that stores the correction parameter so that the correction parameter is rewritable; the correction parameter calibrator includes: a mechanical diaphragm driving device that is mechanically connected to the optical diaphragm to drive it, thereby placing each of the light shielding vanes at a predetermined position; and a calibration-side control device that drives the mechanical diaphragm driving device; and the calibration-side control device includes: an output value information storage that stores reference output value information on a reference output value to be a reference; a mechanical diaphragm driving control portion that drives the mechanical diaphragm driving device to place each of the light shielding vanes at a predetermined reference position; and a parameter updating portion that updates the correction parameter stored in the correction parameter storage so that an output value outputted from the position detector becomes substantially the same as a reference output value based on the reference output value information.

The correction parameter calibrator of the aspect of the invention is a correction parameter calibrator, which is used for the above-mentioned optical diaphragm. Therefore, the correction parameter calibrator can exhibit the same function and effect as those of the above-mentioned optical diaphragm.

Further, the correction parameter calibrator includes the mechanical diaphragm driving device and the calibration-side control device. Therefore, under the condition that the optical diaphragm is assembled, the correction parameter calibrator can calibrate the correction parameter, for example, as follows.

First, the mechanical diaphragm driving control portion of the calibration-side control device drives the mechanical diaphragm driving device to place the light shielding vanes at the predetermined reference positions (light shielding vane positioning step).

Next, the parameter updating portion of the calibration-side control device updates the correction parameter stored in the correction parameter storage so that the output value outputted from the position detector becomes substantially the same as the reference output value based on the reference output value information stored in the output value information storage (parameter updating step).

For example, in the case where production errors occur in the optical diaphragm as described above, even when the mechanical diaphragm driving control portion places the light shielding vanes at reference positions corresponding to the predetermined opening area in the light shielding vane positioning step, an output value different from the reference output value (designed voltage value) corresponding to the predetermined opening area is outputted from the position detector. In the parameter updating step, the correction parameter for correcting the output characteristics so that the reference output value is outputted from the magnetic element is updated.

As described above, the correction parameter calibrator places the light shielding vanes at the predetermined reference positions using the mechanical diaphragm driving device under the condition that the optical diaphragm is assembled, and updates the correction parameter based on the output value outputted from the position detector. Therefore, it is not necessary to update the correction parameter under the condition that the optical diaphragm is mounted on optical equipment such as a projector, and the correction parameter can be updated using the optical diaphragm single main body and the correction parameter calibrator, whereby the efficiency of the operation space for updating the correction parameter can be enhanced. Further, compared with the configuration in which a light beam is outputted to the optical diaphragm, and the correction parameter is updated based on the light beam via the optical diaphragm, the correction parameter can be calibrated satisfactorily without depending upon a working environment.

According to an aspect of the invention, there is provided a correction parameter calibrating method using a correction parameter calibrator that is used in a projector and calibrates a correction parameter, the projector including: a light source device; an optical modulator that modulates a light beam irradiated from the light source device; a projection optical device that enlarges and projects the light beam modulated in the optical modulator; an optical diaphragm that is placed in an optical path of the light beam irradiated from the light source device to the optical modulator, and adjusts a light amount of the light beam irradiated from the light source device to the optical modulator, and a projector-side control device for driving the light source device, the optical modulator, and the optical diaphragm, the optical diaphragm including: light shielding vanes that are configured movably, and move to change an opening area enabling a passage of the light beam, thereby adjusting the amount of the light beam; an electromagnetic actuator including a coil through which a current passes; and a permanent magnet that generates a magnetic flux, moves with respect to the coil by an electromagnetic force due to an interaction between the current passing through the coil and the magnetic flux, and is connected to the light shielding vanes to move the light shielding vanes; and a position detector including: a magnetic element that outputs a predetermined voltage in accordance with intensity of a magnetic field from the permanent magnet; an output characteristics corrector that obtains a predetermined correction parameter, and corrects output characteristics of the magnetic element based on the correction parameter; and a correction parameter storage that stores the correction parameter so that the correction parameter is rewritable, the projector-side control device driving and controlling the electromagnetic actuator based on an output value from the position detector, the correction parameter calibrating method including: a light-beam irradiation step of causing the projector-side control device to drive and control the light source device, and causing the light source device to irradiate a light beam; a permanent magnet positioning step of causing the projector-side control device to drive and control the electromagnetic actuator, and placing the permanent magnet at a reference position where a reference output value to be a reference is outputted from the position detector; a light-beam detection step of detecting a light amount of a optical image enlarged and projected from the projector; and a parameter updating step of updating the correction parameter stored in the correction parameter storage so that a detection light amount detected in the light-beam detection step becomes substantially the same as a reference light amount to be a reference.

The correction parameter calibrating method of the aspect of the invention is performed by using the above-mentioned correction parameter calibrator. Therefore, the correction parameter calibrating method can exhibit the same function and effect as those of the above-mentioned correction parameter calibrator.

According to an aspect of the invention, there is provided a correction parameter calibrating method using a correction parameter calibrator that is used in an optical diaphragm for adjusting an amount of an incident light beam, and calibrates a correction parameter, the optical diaphragm including: light shielding vanes that are configured movably, and move to change an opening area enabling a passage of the light beam, thereby adjusting the light amount of the light beam; an electromagnetic actuator including a coil through which a current passes; and a permanent magnet that generates a magnetic flux, moves with respect to the coil by an electromagnetic force due to an interaction between the current passing through the coil and the magnetic flux, and is connected to the light shielding vanes to move the light shielding vanes; and a position detector including a magnetic element that outputs a predetermined voltage in accordance with intensity of a magnetic field from the permanent magnet, an output characteristics corrector that obtains a predetermined correction parameter, and corrects output characteristics of the magnetic element based on the correction parameter, and a correction parameter storage that stores the correction parameter so that the correction parameter is rewritable, the correction parameter calibrating method including: a permanent magnet positioning step of driving and controlling the electromagnetic actuator, and placing the permanent magnet at a reference position where a reference output value to be a reference is outputted from the position detector; a light-beam detection step of detecting an amount of a light beam via the optical diaphragm; and a parameter updating step of updating the correction parameter stored in the correction parameter storage so that a detection light amount detected in the light-beam detection step becomes substantially the same as a reference light amount to be a reference.

The correction parameter calibrating method of the aspect of the invention is performed by using the above-mentioned correction parameter calibrator. Therefore, the correction parameter calibrating method can exhibit the same function and effect as those of the above-mentioned correction parameter calibrator.

According to an aspect of the invention, there is provided a correction parameter calibrating method using a correction parameter calibrator that is used in an optical diaphragm for adjusting an amount of an incident light beam, and calibrates a correction parameter, the optical diaphragm including: light shielding vanes that are configured movably, and move to change an opening area enabling a passage of the light beam, thereby adjusting the light amount of the light beam; an electromagnetic actuator including a coil through which a current passes; and a permanent magnet that generates a magnetic flux, moves with respect to the coil by an electromagnetic force due to an interaction between the current passing through the coil and the magnetic flux, and is connected to the light shielding vanes to move the light shielding vanes; and a position detector including a magnetic element that outputs a predetermined voltage in accordance with intensity of a magnetic field from the permanent magnet, an output characteristics corrector that obtains a predetermined correction parameter, and corrects output characteristics of the magnetic element based on the correction parameter, and a correction parameter storage that stores the correction parameter so that the correction parameter is rewritable, the correction parameter calibrating method including: a light shielding vane positioning step of placing each of the light shielding vanes at a predetermined reference position; and a parameter updating step of updating the correction parameter stored in the correction parameter storage so that an output value outputted from the position detector becomes substantially the same as a reference output value to be a reference.

The correction parameter calibrating method of the aspect of the invention is performed by using the above-mentioned correction parameter calibrator, so it can exhibit the same function and effect as those of the above-mentioned correction parameter calibrator.

BRIEF DESCRIPTION OF THE DRAWINGS

The invention will be described with reference to the accompanying drawings, wherein like numbers reference like elements.

FIG. 7 is a block diagram schematically showing a control configuration of a projector and a correction parameter corrector in the first exemplary embodiment;

DESCRIPTION OF EXEMPLARY EMBODIMENT(S)

First Exemplary Embodiment

Hereinafter, a first exemplary embodiment of the invention will be described with reference to the attached drawings.

Configuration of Projector

Figure 1:
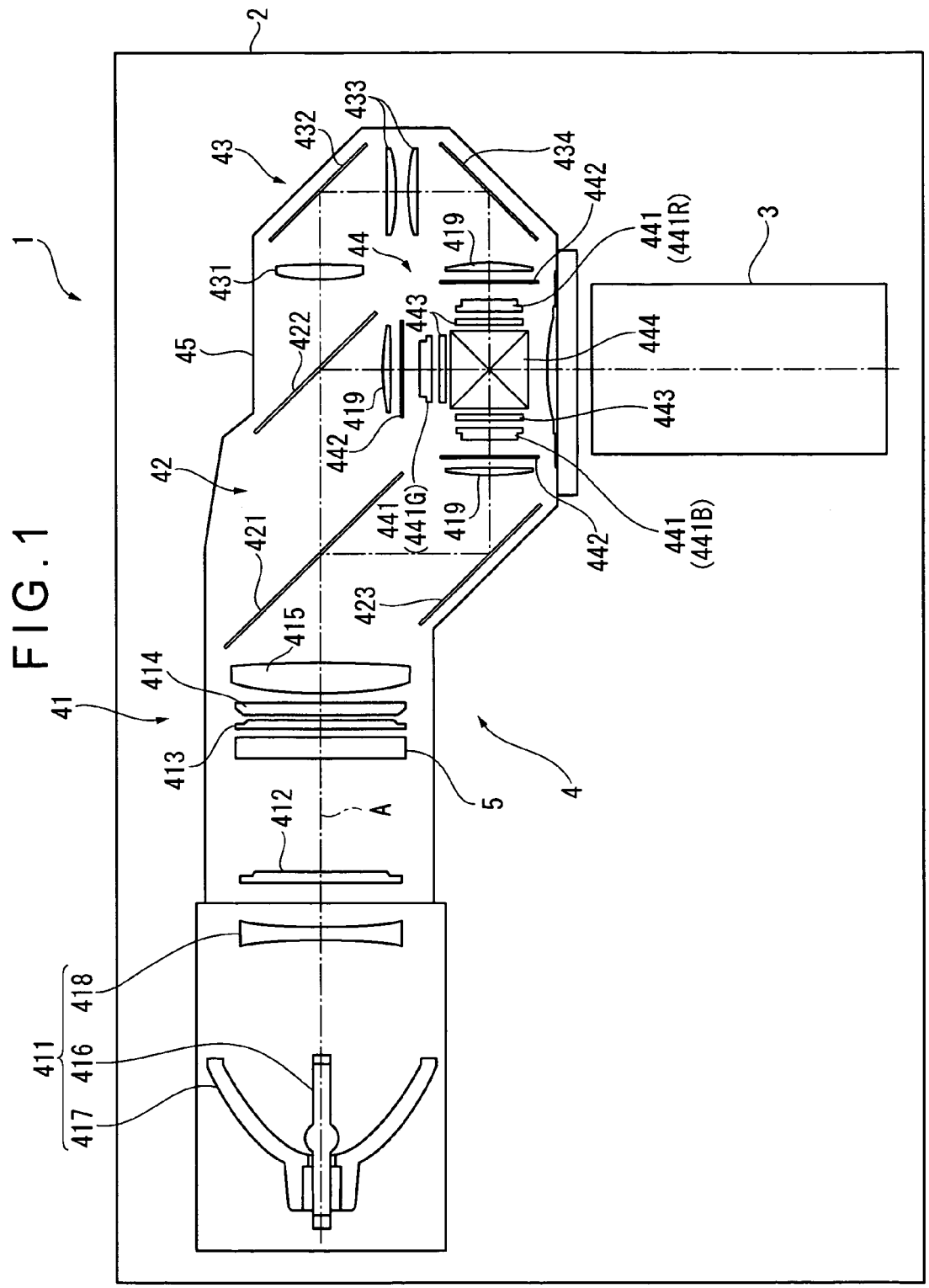
FIG. 1 is a diagram schematically showing a configuration of a projector in a first exemplary embodiment of the invention.

FIG. 1 is a diagram schematically showing a configuration of a projector 1.

The projector 1 modulates a light beam irradiated from a light source to form an optical image in accordance with image information, and enlarges and projects the formed optical image on a screen (not shown). The projector 1 includes an exterior casing 2, a projection lens 3 serving as a projection optical device, an optical unit 4, a control device 6 (see FIG. 7), etc., as shown in FIG. 1.

It is assumed that a cooling unit including a cooling fan for cooling an inside of the projector 1, a power supply unit for supplying power to each constituent member in the projector 1, a control device 6, and the like are placed in a space other than the projection lens 3 and the optical unit 4 in the exterior casing 2. However, those components are not shown in FIG. 1.

The exterior casing 2 is composed of synthetic resin and, as shown in FIG. 1, is formed in a substantially rectangular solid shape as a whole, in which the projection lens 3 and the optical unit 4 are accommodated. The exterior casing 2 is composed of an upper case constituting a top surface, a front surface, a back surface, and a side surface of the projector 1, and a lower case constituting a bottom surface, a front surface, and a back surface of the projector 1, and the upper case and the lower case are fixed to each other with a screw or the like. However, they are not shown in FIG. 1.

The exterior casing 2 may be composed of other materials instead of the synthetic resin or the like, and may be composed of metal, for example.

The optical unit 4 optically processes a light beam irradiated from the light source to form an optical image (color image) corresponding to image information under the control of the control device 6. As shown in FIG. 1, the optical unit 4 has a substantially L-shape in a plan view, which extends along a back surface of the exterior casing 2, and which extends along side surfaces of the exterior casing 2. The detailed configuration of the optical unit 4 will be described later.

The projection lens 3 enlarges and projects the optical image (color image) formed by the optical unit 4 on a screen (not shown). The projection lens 3 is configured as a combined lens in which a plurality of lenses are accommodated in a tubular lens barrel.

Detailed Configuration of an Optical Unit

As shown in FIG. 1, the optical unit 4 includes an illumination optical device 41, a color separating optical device 42, a relay optical device 43, an optical device 44, an optical diaphragm 5, and an optical component casing 45 accommodating the devices 5 and 41 to 44, and supporting and fixing the projection lens 3 at a predetermined position.

The illumination optical device 41 is an optical system for illuminating an image formation area of a liquid crystal panel (described later) constituting the optical device 44 substantially uniformly. As shown in FIG. 1, the illumination optical device 41 includes a light source device 411, a first lens array 412, a second lens array 413, a polarization converter 414, and a superposing lens 415.

As shown in FIG. 1, the light source device 411 includes a light source lamp 416 for irradiating a light beam in a radial manner, a reflector 417 for reflecting a radiation irradiated from the light source lamp 416 and converging the radiation at a predetermined position, a parallelizing concave lens 418 for parallelizing the light beam converged by the reflector 417 with respect to an illuminating optical axis A, and a lamp driver 416A (see FIG. 7) for driving the light source lamp 416. As the light source lamp 416, a halogen lamp, a metal halide lamp, or a high-pressure mercury lamp is used in many cases. Further, although the reflector 417 is an ellipsoidal reflector having a rotation ellipsoidal surface, the reflector 417 may be a parabolic reflector having a rotation parabolic surface. In the latter case, the parallelizing concave lens 418 is omitted.

The first lens array 412 has a configuration in which small lenses each having a substantially rectangular shape are arranged in a matrix seen from the optical axis direction. Each small lens divides a light beam irradiated from the light source device 411 into a plurality of partial light beams.

The second lens array 413 has a configuration substantially similar to that of the first lens array 412, and has a configuration in which small lenses are arranged in a matrix. The second lens array 413 has a function of forming each small lens image of the first lens array 412 in the image formation area of the liquid crystal panel (described later) of the optical device 44 together with the superposing lens 415.

The polarization converter 414 is placed between the second lens array 413 and the superposing lens 415, and converts light from the second lens array 413 into substantially one kind of polarized light.

Specifically, each partial light converted into substantially one kind of polarized light by the polarization converter 414 is finally superposed substantially in the image formation area of the liquid crystal panel (described later) of the optical device 44 by the superposing lens 415. In the projector using a liquid crystal panel of the type modulating polarized light, only one kind of polarized light is used, so a substantially half of the light from the light source device 411 emitting random polarized light cannot be used. Therefore, by using the polarization converter 414, the irradiated light from the light source device 411 is converted into substantially one kind of polarized light, whereby the use efficiency of light in the optical device 44 is enhanced.

As shown in FIG. 1, the color separating optical device 42 includes two dichroic mirrors 421 and 422 and a reflection mirror 423, and has a function of separating a plurality of partial light beams irradiated from the illumination optical device 41 by the dichroic mirrors 421 and 422 into color light beams of three colors, that is, red, green, and blue.

The relay optical device 43 includes an incident-side lens 431, relay lenses 433, and reflection mirrors 432 and 434, and has a function of guiding the color light beams separated by the color separating optical device 42 to a liquid crystal panel for red light.

At this time, a red light component and a green light component of the light beam irradiated from the illumination optical device 41 are transmitted through the dichroic mirror 421 of the color separating optical device 42, and a blue light component is reflected thereby. The blue light reflected by the dichroic mirror 421 is reflected by the reflection mirror 423, and passes through a field lens 419 to reach a liquid crystal panel for blue light. The field lens 419 converts each partial light beam irradiated through the second lens array 413 into a light beam parallel to a center axis thereof (principal light beam). This also applies to other field lenses 419 provided on a light-incident side of the liquid crystal panels for green light and red light, respectively.

Among the red light and the green light transmitted through the dichroic mirror 421, the green light is reflected by the dichroic mirror 422, and passes through the field lens 419 to reach the liquid crystal panel for green light. On the other hand, the red light is transmitted through the dichroic mirror 422, and passes through the relay optical device 43 and further through the field lens 419 to reach the liquid crystal panel for red light. The reason for using the relay optical device 43 for red light is to prevent the decrease in a use efficiency of light due to the dispersion of light or the like caused by the length of an optical path of red light larger than those of the other color light beams. More specifically, the purpose of using the relay optical device 43 for red light is to transmit a partial light beam incident upon the incident-side lens 431 to the field lens 419 as it is. The relay optical device 43 has a configuration of transmitting red light among three color light beams, but the invention is not limited thereto, and for example, the relay optical device 43 may have a configuration of transmitting blue light.

The optical device 44 has three liquid crystal panels 441 (a liquid crystal panel for red light is referred to as 441R, a liquid crystal panel for green light is referred to as 441G, and a liquid crystal panel for blue light is referred to as 441B) serving as the optical modulators, three incident-side polarization plates 442, three irradiation-side polarization plates 443, and a cross dichroic prism 444.

As shown in FIG. 1, the three incident-side polarization plates 442 are respectively placed on the downstream of the optical path of each field lens 419. The incident-side polarization plates 442 receive each color light beam with the polarization direction aligned substantially in one direction by the polarization converter 414, transmit only polarized light substantially in the same direction as that of the polarization orientation of the light beams aligned by the polarization converter 414 among the incident light beams, and absorb the other light beams. The incident-side polarization plates 442 have a configuration in which a polarization film is attached to a light-transparent substrate made of sapphire, quartz, or the like, although not shown.

As shown in FIG. 1, the three liquid crystal panels 441 are respectively placed on the downstream of the optical paths of the incident-side polarization plates 442. The liquid crystal panels 441 have a configuration in which liquid crystal that is an electrochemical material is sealed hermetically between a pair of transparent glass substrates, and the alignment state of the liquid crystal at a predetermined pixel position is controlled in accordance with the driving signal outputted from the control device 6, whereby the polarization orientation of a polarized light beam irradiated from each incident-side polarization plate 442 is modulated, although not shown.

The three irradiation-side polarization plates 443 are respectively placed on the downstream of the optical paths of the liquid crystal panels 441. The irradiation-side polarization plates 443 have substantially the same configuration as that of the incident-side polarization plates 442, and although not shown, have a configuration in which a polarization film is attached to a light-transparent substrate. The polarization film constituting the irradiation-side polarization plates 443 is placed so that the transmitting axis which allows a light beam to transmit the plates 443 is substantially orthogonal to a transmitting axis which allows a light beam to transmit the incident-side polarization plates 442.

The cross dichroic prism 444 is an optical element that is placed on the downstream of the optical paths of the irradiation-side polarization plates 443, and combines optical images modulated for each color light irradiated through each irradiation-side polarization plate 443 to form a color image. The cross dichroic prism 444 has a square shape in a plan view in which four right-angled prisms are attached, and two dielectric polymer films are formed on an interface between the attached right-angled prisms. The dielectric multi-layer films reflect each color light via each irradiation-side polarization plate 443 irradiated from the liquid crystal panels 441R, 441G, and 441B, and transmit the color light via the irradiation-side polarization plate 443 irradiated from the liquid crystal panel 441G. Thus, each color light modulated by each liquid crystal panel 441 is combined to form a color image.

As shown in FIG. 1, the optical diaphragm 5 is placed between the first lens array 412 and the second lens array 413, and moves light shielding vanes (described later) to change the opening area for transmitting a light beam under the control of the control device 6, thereby adjusting the amount of a light beam via the first lens array 412 irradiated from the light source device 411.

The specific configuration of the optical diaphragm 5 will be described later.

Configuration of Optical Diaphragm

Figure 2:
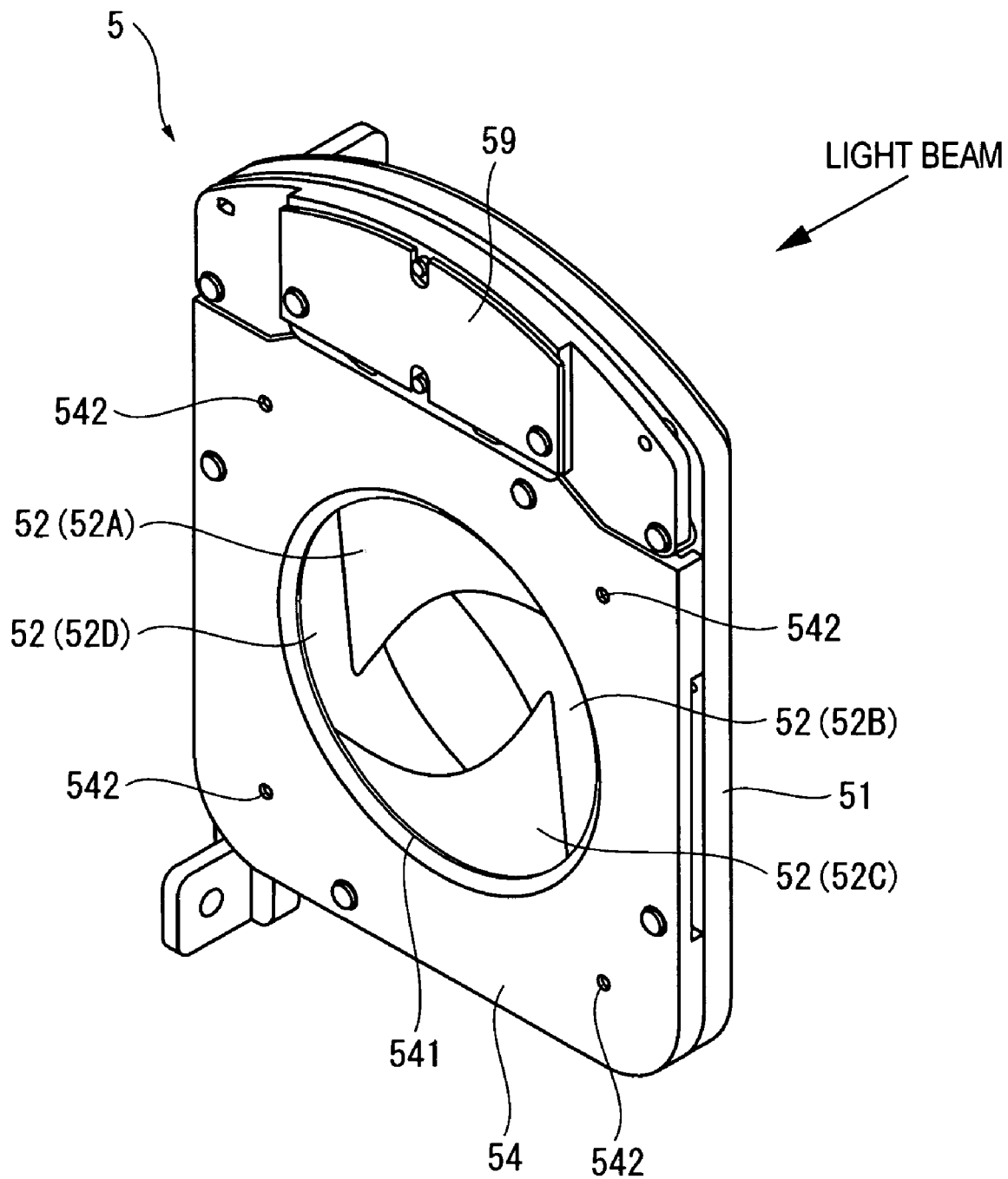
FIG. 2 is a diagram showing an example of the schematic configuration of an optical diaphragm in the first exemplary embodiment.
Figure 3:
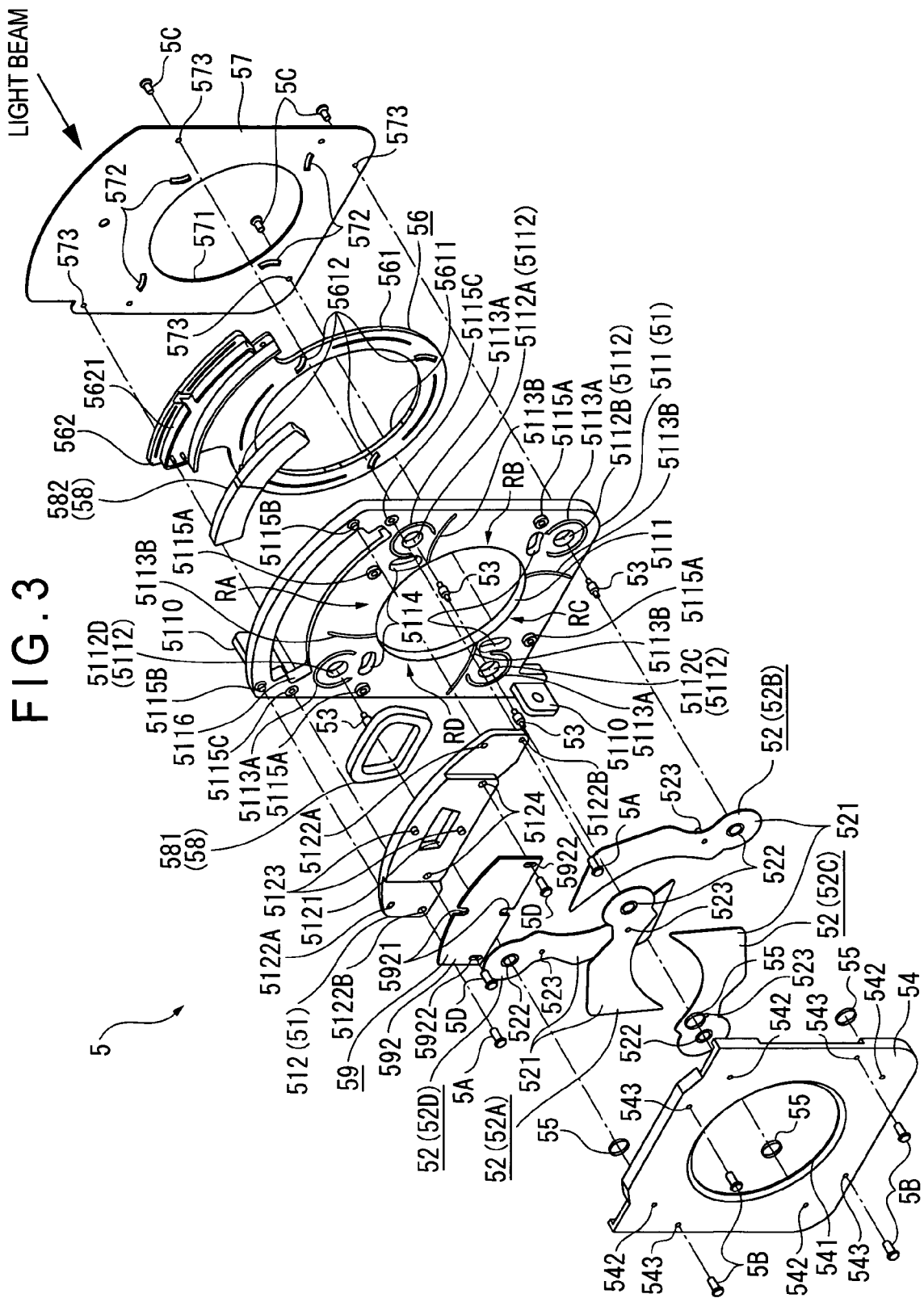
FIG. 3 is a diagram showing an example of the schematic configuration of the optical diaphragm in the first exemplary embodiment.

FIGS. 2 and 3 are diagrams showing an example of the schematic configuration of the optical diaphragm 5. Specifically, FIG. 2 is a perspective view of the optical diaphragm 5 seen from a light-irradiation side (second lens array 413 side). FIG. 3 is an exploded perspective view of the optical diaphragm 5 seen from the light-irradiation side (second lens array 413 side).

As shown in FIGS. 2 and 3, the optical diaphragm 5 includes a base plate 51, four light shielding vanes 52, four rotation axes 53 (FIG. 3), a vane holder 54, four coil springs 55 (FIG. 3), a diaphragm ring 56 (FIG. 3), a ring holder 57 (FIG. 3), an electromagnetic actuator 58 (FIG. 3), and a position sensor 59 as a position detector.

The base plate 51 supports the entire optical diaphragm 5 and fixes the entire optical diaphragm 5 inside the optical component casing 45. As shown in FIG. 3, the base plate 51 includes a base plate main body 511 and a fixing member connecting portion 512.

Figure 4:
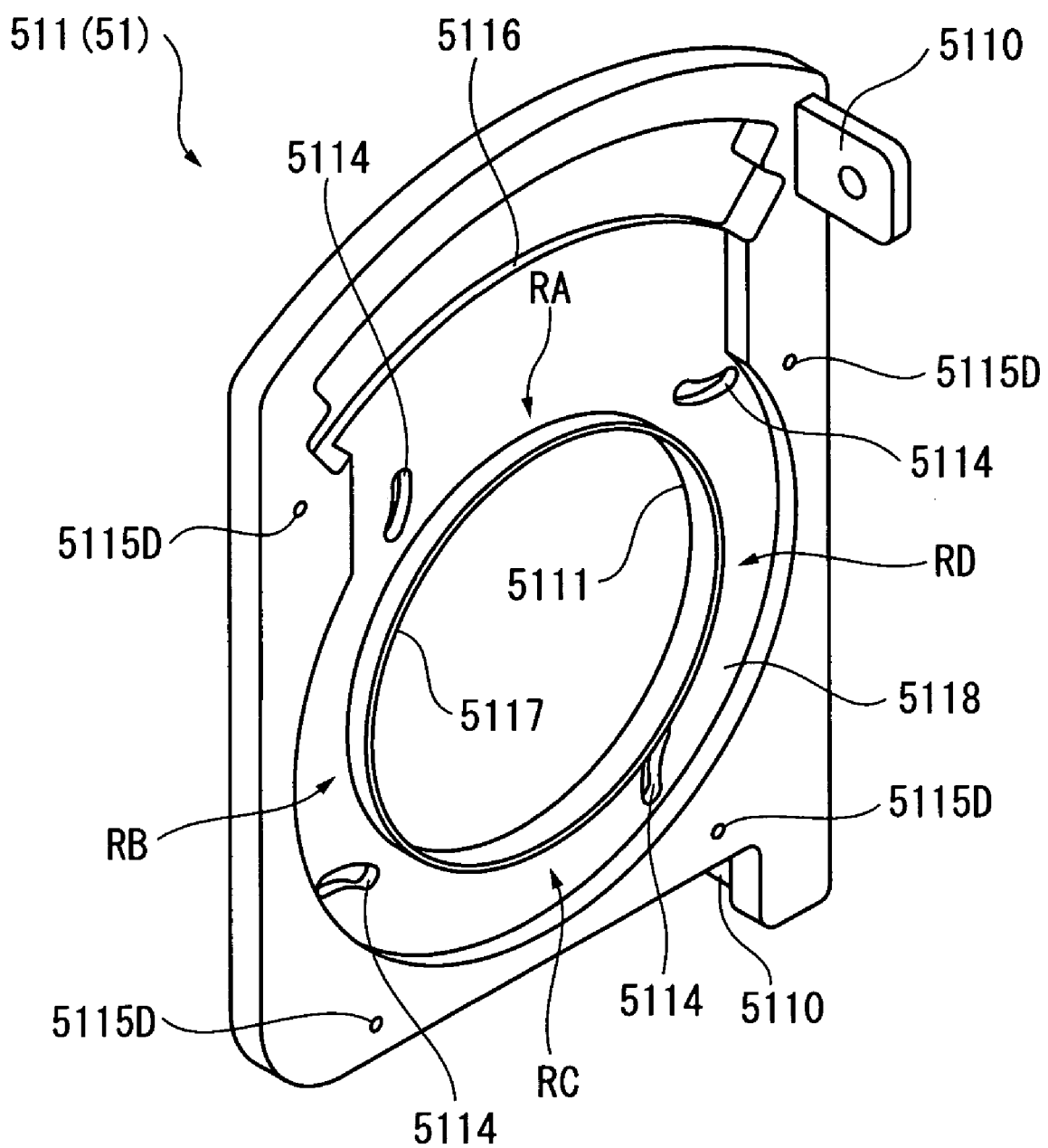
FIG. 4 is a perspective view of a base plate main body seen from a light-incident side in the first exemplary embodiment.

FIG. 4 is a perspective view of the base plate main body 511 seen from a light-incident side (first lens array 412 side).

As shown in FIGS. 2 to 4, the base plate main body 511 is composed of a metal plate having a substantially rectangular shape in a plan view extending along a plane orthogonal to an optical axis of an incident light beam.

As shown in FIGS. 3 and 4, in the base plate main body 511, an opening 5111 in a circular shape in a plan view transmitting a light beam irradiated from the first lens array 412 is formed substantially in a center portion in a plan view.

Further, as shown in FIG. 3, in the base plate main body 511, concave portions 5112 in a circular shape in a plan view are respectively formed in the vicinities of four corners of the base plate 51 on the light-irradiation surface. The concave portions 5112 in a clockwise direction from a concave portion on a right upper side seen from the light-irradiation side are referred to as 5112A, 5112B, 5112C, and 5112D. The concave portions 5112 respectively fix one end portion side of each of the four rotation axes 53, and place bearings (described later) of the four light shielding vanes 52 in a movably fit state.

Hereinafter, for convenience of description, as shown in FIGS. 3 and 4, in the base plate main body 511, regions on the periphery of the opening 5111 are referred to as a first region RA on the upper side including the concave portion 5112A, a second region RB on the right side seen from the light-irradiation side including the concave portion 5112B, a third region RC on the lower side including the concave portion 5112C, and a fourth region RD on the left side seen from the light-irradiation side including the concave portion 5112D.

Further, as shown in FIG. 3, in the respective regions RA to RD on the light-irradiation surface of the base plate main body 511, a first protrusion 5113A having an arc shape in a plan view with respect to each concave portion 5112 (each rotary shaft 53) is formed so as to surround each concave portion 5112 at a position close to each concave portion 5112. The first protrusions 5113A respectively abut on a plate surface of each vane (described later) constituting each light shielding vane 52 under the condition that the optical diaphragm 5 is assembled.

Among the respective first protrusions 5113A, the heights of the first protrusions 5113A formed in the regions RA and RC at diagonal positions are set to be the same, although not shown specifically. Similarly, the heights of the first protrusions 5113A formed in the regions RB and RD at diagonal positions are set to be the same. Then, the heights of the first protrusions 5113A formed in the regions RB and RD are set to be larger by a predetermined size than the heights of the first protrusions 5113A formed in the regions RA and RC.

Further, as shown in FIG. 3, in the respective regions RA to RD on the light-irradiation surface of the base plate main body 511, a second protrusion 5113B having an arc shape in a plan view with respect to each concave portion 5112 (each rotary shaft 53) is formed at a position away from each concave portion 5112. The second protrusions 5113B abut on a plate surface of each vane (described later) constituting each light shielding vane 52 under the condition that the optical diaphragm 5 is assembled in the same way as in the first protrusions 5113A. The height of each second protrusion 5113B is set to be similar to that of each first protrusion 5113A.

Further, as shown in FIGS. 3 and 4, in the respective regions RA to RD of the base plate main body 511, a track hole 5114 having an arc shape in a plan view with respect to each concave portion 5112 (each rotary shaft 53) passing through the light-irradiation surface and the light-incident surface are respectively formed at a position close to each concave portion 5112. The track holes 5114 are escape holes through which pin-shaped portions (described later) of the respective light shielding vanes 52 are respectively inserted under the condition that the optical diaphragm 5 is assembled, and which are formed so as not to mechanically interfere with the respective pin-shaped portions when the respective pin-shaped portions move.

Further, as shown in FIG. 3, in the respective regions RA to RD on the light-irradiation surface of the base plate main body 511, attachment holes 5115A for attaching the vane holder 54 are respectively formed. The attachment holes 5115A are respectively formed at positions where they do not mechanically interfere with the respective light shielding vanes 52, even in the case where the respective light shielding vanes 52 are set on the base plate main body 511, and the respective light shielding vanes 52 are rotated.

Further, as shown in FIGS. 3 and 4, on the upper end side of the base plate main body 511, an arc-shaped hole 5116 in an arc shape in a plan view with respect to the center axis (optical axis of an incident light beam) of the opening 5111 is formed.

The arc-shaped hole 5116 is an escape hole through which a needle (described later) of the electromagnetic actuator 58 and a part of a needle connecting portion (described later) of the diaphragm ring 56 can be inserted under the condition that the optical diaphragm 5 is assembled, and which does not mechanically interfere with the needle and the part of the needle connecting portion even in the case where the diaphragm ring 56 is rotated.

Further, as shown in FIG. 3, on the light-irradiation surface in a peripheral portion of the arc-shaped hole 5116, two positioning protrusion 5115B and two attachment holes 5115C for attaching the fixing member connecting portion 512 are formed.

Further, as shown in FIG. 4, on the light-incident surface of the base plate main body 511, a ring support 5117 in a circular shape in a plan view protruding from the periphery of the opening 5111 to the light-incident side is formed. The ring support 5117 is fitted in a circular hole (described later) of the diaphragm ring 56 in a movably fit state.

As shown in FIG. 4, in the peripheral portion of the ring support 5117, a concave portion 5118 in a circular shape in a plan view is formed. Further, the concave portion 5118 is formed so that an upper side thereof extends across an upper edge of the base plate main body 511. The concave portion 5118 is a portion in which the diaphragm ring 56 is placed, and which rotatably supports the diaphragm ring 56 substantially with respect to a center axis (optical axis of an incident light beam) of the opening 5111, and has a shape corresponding to the outer shape of the diaphragm ring 56.

Further, as shown in FIG. 4, in the respective regions RA to RD on the light-incident surface of the base plate main body 511, attachment holes 5115D for attaching the ring holder 57 are respectively formed in the peripheral portion of the concave portion 5118. The attachment holes 5115D are respectively formed at positions where they do not mechanically interfere with the diaphragm ring 56, even in the case where the ring holder 57 is attached to the base plate main body 511 via the diaphragm ring 56 and the diaphragm ring 56 is rotated.

Further, on a lower side of the light-irradiation surface and on an upper side of the light-incident surface of the base plate main body 511, fixing portions 5110 that protrude in a direction outside of a plane of the base plate main body 511 and fix the base plate main body 511 in the optical component casing 45 are respectively formed. More specifically, by fixing the base plate main body 511 in the optical component casing 45 via the fixing portions 5110, the entire optical diaphragm 5 is fixed in the optical component casing 45.

The fixing member connecting portion 512 is a member for connecting a fixing member (described later) of the electromagnetic actuator 58 to the base plate main body 511. The fixing member connecting portion 512 is composed of a plate in a substantially rectangular shape in a plan view as shown in FIG. 3, and is attached to the light-irradiation surface of the base plate main body 511 so as to cover the arc-shaped hole 5116.

On the light-irradiation surface in the fixing member connecting portion 512, a concave portion in a substantially circular shape in a plan view is formed so as to correspond to the shape of an electromagnetic coil serving as a fixing member (described later) of the electromagnetic actuator 58, although not shown specifically. In the concave portion, the electromagnetic coil is accommodated.

Further, as shown in FIG. 3, in the fixing member connecting portion 512, a through-hole 5121 in a rectangular shape in a plan view passing through the light-irradiation surface and the light-incident surface is placed substantially at the center of the concave portion.

Further, as shown in FIG. 3, in four corner portions of the fixing member connecting portion 512, two positioning holes 5122A and two attachment holes 5122B are respectively formed so as to correspond to the two positioning protrusions 5115B and the two attachment holes 5115C of the base plate main body 511. The fixing member connecting portion 512 is positioned by fitting the two positioning holes 5122A in the two positioning protrusions 5115B of the base plate main body 511 under the condition that the electromagnetic coil is accommodated in the concave portion, and is fixed to the base plate main body 511 by inserting fixing screws 5A in the two attachment holes 5122B and screwing them into the two attachment holes 5115A of the base plate main body 511.

Thus, under the condition that the fixing member connecting portion 512 is fixed to the base plate main body 511, the electromagnetic coil accommodated in the concave portion of the fixing member connecting portion 512 is placed at a position offset from the base plate main body 511 to the light-irradiation side (side at a distance from the diaphragm ring 56).

Further, as shown in FIG. 3, in the peripheral portion of the through hole 5121 in the fixing member connecting portion 512, two positioning protrusions 5123 for positioning the position sensor 59 and two fixing holes 5124 for fixing the position sensor 59 are formed.

Four light shielding vanes 52 are composed of metallic members, and as shown in FIG. 3, are axially supported respectively so as to rotate along a plane orthogonal to the optical axis of an incident light beam by the respective concave portions 5112 via four rotary shafts 53 in the respective regions RA to RD on the light-irradiation surface of the base plate main body 511, and rotate to change an opening area for transmitting a light beam to adjust the amount of a light beam irradiated from the first lens array 412. In the following, the light shielding vanes 52 placed in the respective regions RA to RD are respectively referred to as 52A to 52D.

The light shielding vanes 52 have the same shape, and as shown in FIG. 3, are respectively composed of a vane plate 521, a bearing 522, and a pin-shaped portion 523.

As shown in FIG. 3, the vane plate 521 has a substantially L-shape in a plan view with an edge formed in a curved line shape, and is composed of a metallic plate shielding an incident light beam. Under the condition that the optical diaphragm 5 is assembled, each vane plate 521 is placed so that the inner portion of an L-shape of each vane plate 521 is placed so as to be directed to the inside of the opening 5111 and so as to surround the opening 5111. Further, under the condition that the optical diaphragm 5 is assembled, each vane plate 521 is placed so that each plate surface is orthogonal to the optical axis of an incident light beam.

The bearing 522 is a bearing of the rotary shaft 53, which is provided integrally on one end side in an L-shape of the vane plate 521, and enables the vane plate 521 to rotate.

The bearing 522 has a substantially cylindrical shape which protrudes from the light-incident surface of the vane plate 521 to the light-incident side and which allows the rotary shaft 53 to be inserted therein, although not shown specifically. More specifically, the thickness of the bearing 522 in the optical axis direction of a light beam is set to be larger than the thickness of the vane plate 521 in the optical axis direction of a light beam. Then, the bearing 522 can rotate about the rotary shaft 53 under the condition that the rotary shaft 53 is inserted, and rotates about the rotary shaft 53 to rotate the vane plate 521. Thus, each vane plate 521 rotates, whereby the opening area of the opening for transmitting a light beam formed at inner edges of the vane plates 521 each having an L-shape is changed.

Under the condition that the optical diaphragm 5 is assembled, the rotary shaft 53 is inserted in the bearing 522, and the light-incident surface of the bearing 522 abuts on a bottom of the concave portion 5112 of the base plate main body 511.

Further, the vane plate 521 is configured to as to be substantially perpendicular to the bearing 522, and is substantially perpendicular to the rotary shaft 53 to be inserted in the bearing 522 under the condition that the optical diaphragm 5 is assembled. More specifically, each vane plate 521 is substantially parallel to a plate surface of the base plate main body 511 under the condition that the optical diaphragm 5 is assembled.

Each vane plate 521 is not limited to the configuration in which the vane plate 521 is substantially perpendicular to the bearing 522, and may have a configuration in which the vane plate 521 has an angle other than a substantially perpendicular angle with respect to the bearing 522 as long as the respective vane plates 521 do not come into contact with each other during rotation of each light shielding vane 52. More specifically, each vane plate 521 may have a configuration in which the vane plate 521 tilts at a predetermined angle with respect to a plane parallel to a plate surface of the base plate main body 511 as long as the respective vane plates 521 do not come into contact with each other during rotation of each light shielding vane 52.

Herein, although not shown specifically, the height of the bottom of each concave portion 5112 of the base plate main body 511 on which the bearing 522 abuts is set so as to form a gap with a predetermined size between the adjacent vane plates 521 under the condition that the optical diaphragm 5 is assembled, i.e., under the condition that the light-incident surface of each bearing 522 of each light shielding vane 52 abuts on the bottom of each concave portion 5112.

Specifically, among the respective concave portions 5112A to 5112D, the height of the bottom of each of the concave portions 5112A and 5112C at diagonal positions are set to be the same size. The height of the bottom of each of the concave portions 5112B and 5112D at diagonal positions is also set to be the same size. The height of the bottom of each of the concave portions 5112A and 5112C is set to be larger by a predetermined size than the height of the bottom of each of the concave portions 5112B and 5112D. With such a configuration, under the condition that the optical diaphragm 5 is assembled, i.e., under the condition that the light-incident surface of each bearing 522 of each light shielding vane 52 abuts on the bottom of each concave portion 5112, the height of each vane plate 521 from the base plate main body 511 is varied in the respective light shielding vanes 52A to 52D.

More specifically, the vane plates 521 of the light shielding vanes 52 at diagonal positions are placed at the same distance from the base plate main body 511, and the vane plates 521 of the adjacent light shielding vanes 52 are placed at different distances from the base plate main body 511. Owing to such setting, when a gap with a predetermined size is formed between the adjacent vane plates 521, and the vane plates 521 are rotated, the vane plates 521 are prevented from mechanically interfering with each other.

The pin-shaped portion 523 is provided in the vicinity of the bearing 522 on the other end of the vane plate 521 with respect to the bearing 522, and is engaged with the diaphragm ring 56 to receive a pressure from the diaphragm ring 56.

As shown in FIG. 3, the pin-shaped portion 523 protrudes from the light-incident surface to the light-incident side of the vane plate 521. Under the condition that the optical diaphragm 5 is assembled, as shown in FIG. 3, the pin-shaped portion 523 is inserted in the track hole 5114 of the base plate main body 511, protrudes from the light-incident surface of the base plate main body 511 via the traffic hole 5114, and is engaged with a long hole (described later) of the diaphragm ring 56.

The four rotation axes 53 are composed of metallic members each having a substantially cylindrical shape, and are fixed between the base plate main body 511 and the vane holder 54 to axially support each light shielding vane 52 rotatably.

As shown in FIG. 3, the vane holder 54 is combined with the fixing member connecting portion 512, thereby having an outer shape (substantially rectangular shape in a plan view) substantially similar to that of the base plate main body 511, is composed of a plate made of synthetic resin, and presses each light shielding vane 52 against the base plate 51 rotatably.

As shown in FIGS. 2 and 3, substantially in the center portion in a plan view in the vane holder 54, an opening 541 in a circular shape in a plan view for transmitting a light beam irradiated from the first lens array 412, which is similar to the opening 5111 of the base plate main body 511, is formed.

Further, as shown in FIGS. 2 and 3, in the vane holder 54, shaft fixing holes 542 that pass trough the light-irradiation surface and the light-incident surface to fit and fix the other end of the rotary shaft 53 are respectively formed at positions corresponding to the respective concave portions 5112 of the base plate main body 511.

Further, as shown in FIGS. 2 and 3, in the vane holder 54, attachment holes 543 passing through the light-irradiation surface and the light-incident surface are respectively formed at positions corresponding to the attachment holes 5115A of the base plate main body 511. Then, by inserting fixing screws 5B through the attachment holes 543, and screwing them into the attachment holes 5115A, the vane holder 54 is fixed under the condition that the respective light shielding vanes 52 are pressed against the base plate main body 511.

As shown in FIG. 3, each of the four coil springs 55 allows the rotary shaft 53 to be inserted, and provided between the light shielding vane 52 and the vane holder 54 under the condition that the other end side of the rotary shaft 53 is inserted. On end side of each of the four coil springs 55 abuts on the light-irradiation side (the vicinity of the bearing 522) of the light shielding vane 52, and the other end side thereof abuts on the light-incident surface (the peripheral portion of the shaft fixing hole 542) of the vane holder 54. Then, each coil spring 55 biases the light shielding vane 52 toward the base plate main body 511 when the vane holder 54 is attached to the base plate main body 511, and allows the bearing 522 of the light shielding vane 52 to abut on the bottom of the concave portion 5112 of the base plate main body 511.

The diaphragm ring 56 is placed rotatably on the concave portion 5118 of the base plate main body 511, and is engaged with each pin-shaped portion 523 of the light shielding vanes 52 under the condition that it is set in the concave portion 5118. Then, the diaphragm ring 56 rotates to press each pin-shaped portion 523, thereby rotating the vane plates 521 of the light shielding vanes 52 about the rotary shafts 53. The diaphragm ring 56 is composed of synthetic resin, and as shown in FIG. 3, has a configuration in which a ring main body 561 and a needle connecting portion 562 are integrated.

The ring main body 561 has an circular hole 5611 allowing a ring support 5117 of the base plate main body 511 to be inserted therein, and is composed of a circular frame-shaped plate in a plan view.

As shown in FIG. 3, in the ring main body 561, long holes 5612 are respectively formed at positions corresponding to the track holes 5114 of the base plate main body 511, which allow the pin-shaped portions 523 protruding from the track holes 5114 to be inserted therein, and extend substantially in a linear shape in a direction orthogonal to the circumferential direction with a substantially center axis of the opening 5111 being the center.

As shown in FIG. 3, the needle connecting portion 562 extends outward along a plate surface of the ring main body 561 from an outer periphery of the ring main body 561, and connects the needle (described later) of the electromagnetic actuator 58 to the ring main body 561. Then, the needle connecting portion 562 is placed so as to be opposed to an upper end side of the base plate main body 511, as shown in FIG. 3, when the optical diaphragm 5 is assembled.

As shown in FIG. 3, in the needle connecting portion 562, a protrusion 5621 in a substantially rectangular frame shape in a plan view is formed, which corresponds to the shape of the arc-shaped hole 5116 of the base plate main body 511, and protrudes toward the light-beam irradiation. The protrusion 5621 accommodates a permanent magnet that is the needle (described later) of the electromagnetic actuator 58. Under the condition that the optical diaphragm 5 is assembled, the permanent magnet accommodated in the protrusion 5621, and a part of the protrusion 5621 are inserted in the arc-shaped hole 5226 of the base plate main body 511.

Herein, the length in the rotation direction (rotation direction with respect to an optical axis of an incident light beam as a center) of the diaphragm ring 56 in the protrusion 5621 is set to be smaller than that in the rotation direction of the diaphragm ring 56 in the arc-shaped hole 5116 of the base plate main body 511. Therefore, even in the case where the diaphragm ring 56 is rotated, the arc-shaped hole 5116 and the protrusion 5621 do not mechanically interfere with each other.

When the diaphragm ring 56 rotates under the condition that the optical diaphragm 5 is assembled, each pin-shaped portion 523 of the light shielding vanes 52 is pressed at the edge of each long hole 5612 because each long hole 5612 of the ring main body 561 extends substantially in a linear shape in the direction orthogonal to the circumferential direction with a substantially center axis of the opening 5111 being the center, and each pin-shaped portion 523 moves along each long hole 5612. Further, when each pin-shaped portion 523 moves along each long hole 5612, it moves so as to rotate with respect to each concave portion 5112 (each rotary shaft 53) of the base plate 51 without mechanically interfering with each track hole 5114 of the base plate 51. Due to the movement of each pin-shaped portion 523, each vane plate 521 of the light shielding vanes 52 rotates about each rotary shaft 53.

As shown in FIG. 3, the ring holder 57 has a substantially rectangular shape in a plan view in an outer shape substantially similar to that of the base plate main body 511, is composed of a metallic plate, and presses the diaphragm ring 56 against the base plate 51 rotatably.

As shown in FIG. 3, in the ring holder 57, an opening 571 in a circular shape in a plan view for transmitting a light beam irradiated from the first lens array 412, which is similar to the opening 5111 of the base plate main body 511, is formed in a substantially center portion in a plan view.

Further, as shown in FIG. 3, in the ring holder 57, track holes 572 similar to the track holes 5114 are formed at positions corresponding to the track holes 5114 of the base plate main body 511. In the same way as in the respective track holes 5114, the track holes 572 are escape holes through which the pin-shaped portions 523 of the light shielding vanes 52 are respectively inserted under the condition that the optical diaphragm 5 is assembled, and which are formed so as not to mechanically interfere with the respective pin-shaped portions 523 when the respective pin-shaped portions 523 move.

Further, as shown in FIG. 3, in the ring holder 57, attachment holes 573 passing through the light-irradiation surface and the light-incident surface are formed at positions corresponding to the attachment holes 5115D of the base plate main body 511. By inserting the fixing screws 5C through the attachment holes 573, and screwing them into the attachment holes 5115D, the ring holder 57 is fixed under the condition that the diaphragm ring 56 is pressed against the base plate main body 511.

Figure 5A:
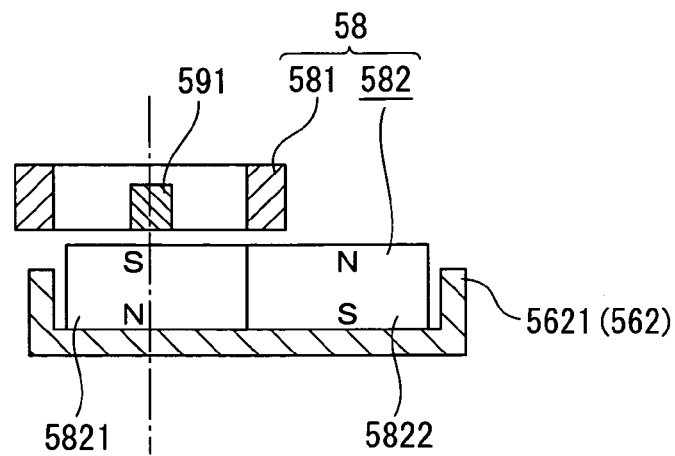
FIGS. 5A to 5C are diagrams each schematically showing the configurations of an electromagnetic actuator and a position sensor in the first exemplary embodiment.
Figure 5B:
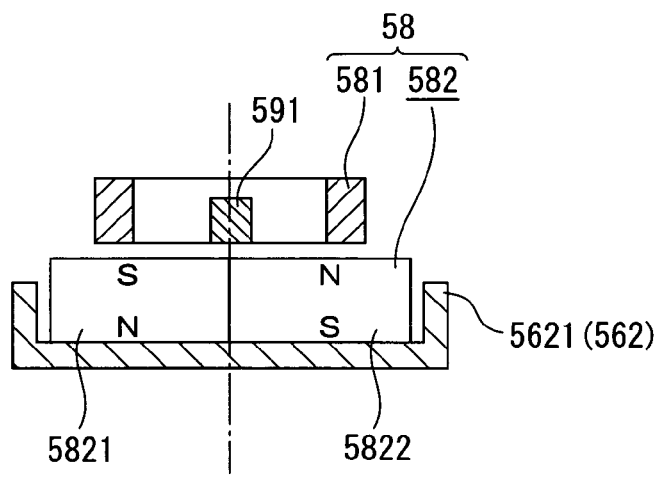
Figure 5C:
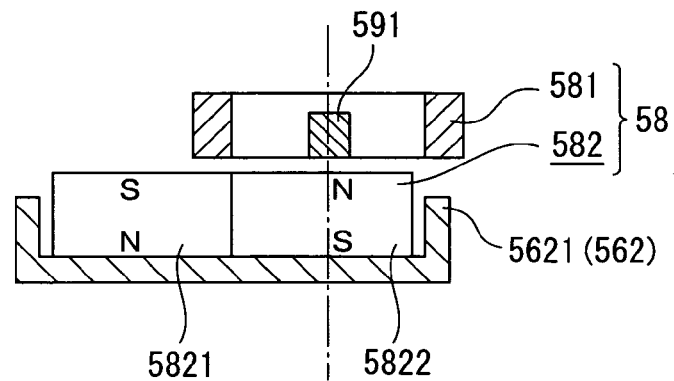

FIGS. 5A to 5C are diagrams each schematically showing the configurations of the electromagnetic actuator 58 and the position sensor 59.

As shown in FIG. 3 or FIGS. 5A to 5C, the electromagnetic actuator 58 includes an electromagnetic coil 581 as a fixing member and a permanent magnet 582 as a needle, and converts electric energy into mechanical energy to move the permanent magnet 582 with respect to the electromagnetic coil 581 under the control of the control device 6, thereby rotating the diaphragm ring 56.

As shown in FIG. 3, the electromagnetic coil 581 has a ring shape, and is accommodated in the concave portion of the fixing member connecting portion 512 so that a coil axis is substantially parallel to the optical axis of an incident light beam.

As shown in FIG. 3 or FIGS. 5A to 5C, the permanent magnet 582 has a configuration in which a first magnet portion 5821 (FIGS. 5A to 5C) and a second magnet portion 5822 (FIGS. 5A to 5C) are integrated, and is fixed inside the protrusion 5621 of the needle connecting portion 562 of the diaphragm ring 56.

As shown in FIGS. 5A to 5C, the first magnet portion 5821 is fitted and fixed inside the protrusion 5621 so that the needle connecting portion 562 side is an N-pole, and the side (opposed to the electromagnetic coil 581) spaced apart from the needle connecting portion 562 side is an S-pole.

In contrast to the first magnet portion 5822, as shown in FIGS. 5A to 5C, the second magnet portion 5822 is fitted and fixed inside the protrusion 5621 so that the needle connecting portion 562 side is an S-pole, and the side (opposed to the electromagnetic coil 581) spaced apart from the needle connecting portion 562 side is an N-pole.

The control device 6 is electrically connected to the electromagnetic coil 581 to apply a forward current or a reverse current to the electromagnetic coil 581, thereby changing the direction of an electromagnetic force caused by the interaction between the magnetic flux from the permanent magnet 582 and the current applied to the electromagnetic coil 581 substantially orthogonal to the magnetic flux (the current applied to a portion extending in an upper and lower direction in the electromagnetic coil 581 in FIG. 3). Then, the permanent magnet 582 is moved to a terminating end position shown in FIGS. 5A and 5C, or a neutral position shown in FIG. 5B by the electromagnetic force. In accordance with the movement of the permanent magnet 582, the diaphragm ring 56 rotates, and each light shielding vane 52 rotates in synchronization with the rotation of the diaphragm ring 56, whereby the amount of a light beam irradiated from the first lens array 412 is adjusted. In this exemplary embodiment, it is assumed that under the condition that the permanent magnet 582 is placed at the terminal position shown in FIG. 5A, the opening area by each light shielding vane 52 becomes a minimum opening area $S_{min}$, under the condition that the permanent magnet 582 is placed at the terminal position shown in FIG. 5C, the opening area by each light shielding vane 52 becomes a maximum opening area $S_{max}$, and under the condition that the permanent magnet 582 is placed at a neutral position shown in FIG. 5B, the opening area by each light shielding vane 52 becomes an intermediate opening area $S_{mid}$ between the maximum opening area $S_{max}$ and the minimum opening area $S_{min}$.

The position sensor 59 is attached to the fixing member connecting portion 512, and detects the position of the permanent magnet 582 with respect to the electromagnetic coil 581. The position sensor 59 outputs a signal in accordance with the detected position to the control device 6. The control device 6 applies a forward current or a reverse current to the electromagnetic coil 581 as described above, based on the signal outputted from the position sensor 59, and places the permanent magnet 582 (each light shielding vane 52) at a predetermined position.

As shown in FIG. 3 and FIGS. 5A to 5C, the position sensor 59 includes a position sensor main body 591 (FIGS. 5A to 5C), and a circuit board 592 (FIG. 3) on which the position sensor main body 591 is mounted.

As shown in FIGS. 5A to 5C, the position sensor main body 591 is placed at a position substantially matched with a coil axis inside the electromagnetic coil 581 under the condition that the position sensor 59 is attached to the fixing member connecting portion 512. More specifically, under the condition that the optical diaphragm 5 is assembled, the position sensor main body 591 is placed at a position opposed to the permanent magnet 582, as shown in FIGS. 5A to 5C. Then, the position sensor main body 591 includes a hall element 5911 as a magnetic element, an output characteristics corrector 5912, and a correction parameter storage 5913 (see FIG. 7). The position sensor main body 591 including the hall element 5911, the output characteristics corrector 5912, and the correction parameter storage 5913, is composed of an integrated circuit (IC) of one chip.

The hall element 5911 is a magnetic element using a hall effect, which outputs a predetermined voltage in accordance with the intensity of a magnetic field from the permanent magnet 582.

The output characteristics corrector 5912 corrects the output characteristics of the hall element 5911 based on correction parameters (an offset correction parameter and a gain correction parameter) stored in the correction parameter storage 5913.

Figure 6A:
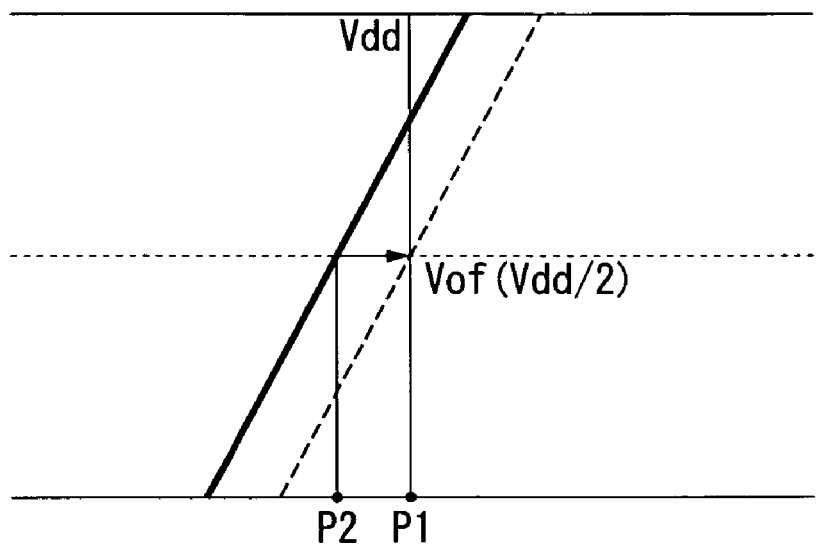
FIGS. 6A and 6B are diagrams each showing an example of a processing function of an output characteristics corrector in the first exemplary embodiment.
Figure 6B:
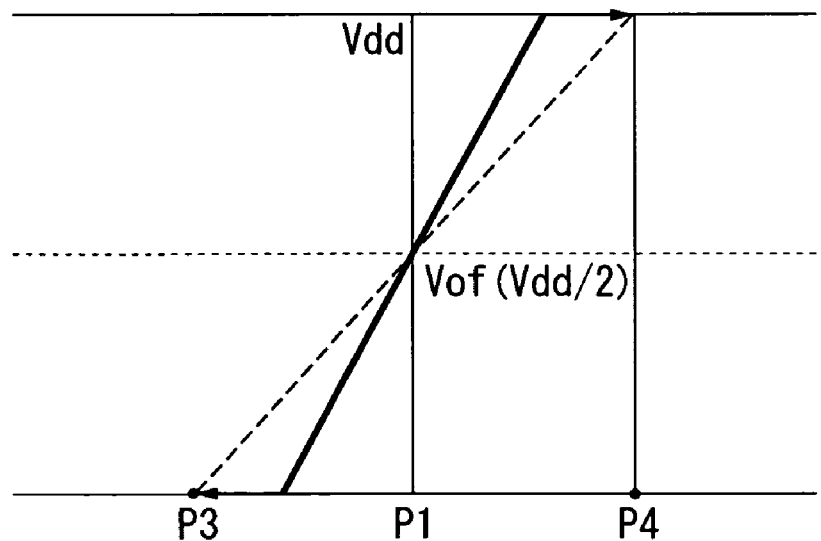

FIGS. 6A and 6B are diagrams respectively showing an example of a processing function of the output characteristics corrector 5912. Specifically, in FIGS. 6A and 6B, a vertical axis represents an output value (voltage value) outputted from the hall element 5911, and a horizontal axis represents the position (opening area by each light shielding vane 52) of the permanent magnet 582. Further, in FIGS. 6A and 6B, a solid line represents the output characteristics of the hall element 59 before the correction of the output characteristics by the output characteristics corrector 5912, and a broken line represents the output characteristics of the hall element 5911 after the correction of the output characteristics by the output characteristics corrector 5912.

In the correction (hereinafter, referred to as an offset correction) of the output characteristics of the hall element 5911 based on the offset correction parameter by the output characteristics corrector 5912, for example, as shown in FIG. 6A, the output characteristics of the hall element 5911 are corrected.

More specifically, in the offset correction, in order that the hall element 5911 outputs an offset voltage value Vof (a voltage value Vdd/2 that is a half of the maximum output voltage value Vdd) under the condition that the permanent magnet 582 is placed at a specified position P1 at which the opening area by the each light shielding vane 52 becomes an intermediate opening area $S_{mid}$, the position of the permanent magnet 582 with respect to the offset voltage value Vof is offset to correct the output characteristics. For example, as shown in FIG. 6A, under the condition that the permanent magnet 582 is placed at a predetermined position P2 before the offset correction, the hall element 5911 outputs the offset voltage value Vof. However, owning to the offset correction, the output characteristics are corrected so that the hall element 5911 outputs the offset voltage value Vof under the condition that the permanent magnet 582 is placed at the specified position P1. More specifically, in the offset correction, as shown in FIG. 6A, the position of the permanent magnet 582 is offset under the condition that the tilt of the output value of the hall element 5911 with respect to the position of the permanent magnet 582 is in a constant state.

Then, in this exemplary embodiment, a correction parameter calibrator 100 (described later) updates an offset correction parameter to an optimum offset correction parameter. Owing to the offset correction using the optimum offset correction parameter, the hall element 5911 outputs the offset voltage value Vof (voltage value Vdd/2 that is a half of the maximum output voltage value Vdd) under the condition that the opening area by each light shielding vane 52 is an intermediate opening area $S_{mid}$.

Further, in the correction (hereinafter, referred to as a gain correction) of the output characteristics of the hall element 5911 based on the gain correction parameter by the output characteristics corrector 5912, for example, as shown in FIG. 6B, the output characteristics of the hall element 5911 are corrected.

More specifically, in the gain correction, as shown in FIG. 6B, the output characteristics of the hall element 5911 are corrected in terms of a tilt based on the offset voltage value Vof outputted by the hall element 5911 under the condition that the opening area by each light shielding vane 52 is an intermediate opening area $S_{mid}$.

In this exemplary embodiment, the correction parameter calibrator 100 (described later) updates a gain correction parameter to an optimum gain correction parameter. Owing to the gain correction using the optimum gain correction parameter, the hall element 5911 output a minimum output voltage value 0 under the condition that the permanent magnet 582 is placed at a specified position P3 (first position) where the opening area by each light shielding vane 52 becomes a minimum opening area $S_{min}$, and the hall element 5911 outputs a maximum output voltage value Vdd under the condition that the permanent magnet 582 is placed at a specified position P4 (second position) where the opening area by each light shielding vane 52 becomes a maximum opening area $S_{max}$.

More specifically, although not shown, the output characteristics corrector 5912 is composed of an offset circuit portion that performs an offset correction, and a gain circuit portion that performs a gain correction.

The correction parameter storage 5913 stores an offset correction parameter and a gain correction parameter so that they are rewritable. More specifically, the offset correction parameter and the gain correction parameter stored in the correction parameter storage 5913 are rewritten appropriately by the correction parameter calibrator 100 (described later).

Specifically, although not shown, the correction parameter storage 5913 is composed of an offset storage storing an offset correction parameter and a gain storage storing a gain correction parameter. As the offset storage and the gain storage, for example, an electrically erasable programmable read only memory (EEPROM) or the like can be adopted.

As the position sensor main body 591 described above, for example, CM8201 produced by ASAHI KASEI ELECTRONICS Co., Ltd. can be adopted.

Control Configuration of Projector

FIG. 7 is a block diagram schematically showing control configurations of the projector 1 and the correction parameter calibrator 100.

The control device 6 controls the entire projector 1. As shown in FIG. 7, the control device 6 includes an interface 61, a control portion main body 62, a frame memory 63, a memory 64, and the like.

The interface 61 executes previously set input interface processing with respect to a signal inputted from the outside via a signal line, and converts the inputted signal into a processable signal in the control portion main body 62 to output it. For example, the interface 61 receives an image signal or the like outputted from various pieces of external equipment, and converts the image signal into a processable image signal in the control portion main body 62 to output it. The image signal (digital image signal) outputted from the interface 61 is temporarily recorded in the frame memory 63. Further, for example, the interface 61 is connected to the correction parameter calibrator 100 via a signal line Si1, and receives a control signal outputted from the correction parameter calibrator 100 and converts the control signal into a processable signal in the control portion main body 62 to output it.

The control portion main body 62 is composed of, for example a central processing unit (CPU), and as shown in FIG. 7, controls each liquid crystal panel 411, a light source device 411, an optical diaphragm, and the like. As shown in FIG. 7, the control portion main body 62 includes a liquid crystal panel driving control portion 621, a lamp driving control portion 622, a diaphragm driving control portion 623, and the like.

The liquid crystal panel driving control portion 621 drives and controls each liquid crystal panel 441 in accordance with a predetermined program, and a control instruction outputted from the correction parameter calibrator 100. For example, the liquid crystal panel driving control portion 621 appropriately reads a digital image signal outputted from the interface 61 and successively stored in the frame memory 63 in accordance with a predetermined program, subjects the read digital image signal to predetermined processing, and outputs a driving signal as image information corresponding to the processed image to each liquid crystal panel 441 to form a predetermined optical image. Examples of the predetermined processing in the liquid crystal panel driving control portion 621 include image size adjustment processing such as expansion and reduction, trapezium distortion correction processing, image quality adjustment processing, and gamma correction processing. Each processing is a known technique, so the detailed description thereof will be omitted. Further, the liquid crystal panel driving control portion 621 forms a predetermined optical image on each liquid crystal panel 441 in the same way as described above, in accordance with a control instruction outputted from the correction parameter calibrator 100.

The lamp driving control portion 622 outputs a control instruction indicating that the light source lamp 416 is driven at a predetermined driving frequency to the lamp driver 416A in accordance with a predetermined program and a control instruction outputted from the correction parameter calibrator 100, and causes the lamp driver 416A to generate a driving signal in accordance with a predetermined driving frequency to drive the light source lamp 416.

The diaphragm driving control portion 623 applies a forward current or a reverse current to the electromagnetic coil 581 based on an output value (voltage value) outputted from the position sensor 59 (hall element 5911) in accordance with a predetermined program and a control instruction outputted from the correction parameter calibrator 100, thereby placing each light shielding vane 52 at a predetermined position.

More specifically, the diaphragm driving control portion 623 analyzes inputted image information to generate lightness information on an image corresponding to the image information in accordance with a predetermined program. As the lightness information, for example, information on a maximum brightness value, a minimum brightness value, an average brightness value, and the like can be adopted at each brightness value corresponding to each pixel of an image corresponding to the image information. Further, the diaphragm driving control portion 623 specifies an opening area corresponding to the generated lightness information, based on lightness-opening area associated information stored in the memory 64, in which the lightness information and the opening area by each light shielding vane 52 are associated with each other. Further, the diaphragm driving control portion 623 specifies a designed voltage value associated with the specified opening area, based on opening area-voltage value associated information stored in the memory 64, in which the opening area and the designed voltage value outputted from the hall element 5911 are associated with each other. Then, the diaphragm driving control portion 623 applies a forward current or a reverse current to the electromagnetic coil 581 until the specified designed voltage value is outputted from the position sensor 59, thereby placing each light shielding vane 52 at a predetermined position in accordance with the lightness information and the opening area.

Further, the diaphragm driving control portion 623 applies a forward current or a reverse current to the electromagnetic coil 581 in accordance with a control instruction outputted from the correction parameter calibrator 100 until an instruction voltage value included in the control instruction is outputted from the position sensor 59, thereby placing each light shielding vane 52 at a predetermined position.

The memory 64 stores the above-mentioned lightness-opening area associated information and opening area-voltage value associated information used in the diaphragm driving control portion 623. As the lightness-opening area associated information and opening area-voltage value associated information, for example, a data configuration configured in a Look-Up-Table (LUT) or the like can be adopted. As the opening area-voltage value associated information, for example, regarding the above-mentioned minimum opening area $S_{min}$, intermediate opening area $S_{mid}$, and maximum opening area $S_{max}$, a minimum output voltage value 0 is associated with the minimum opening area $S_{min}$, an offset voltage value Vdd/2 is associated with the intermediate opening area $S_{mid}$, and a maximum output voltage value Vdd is associated with the maximum opening area $S_{max}$.

In producing the optical diaphragm 5, in the case where a production error of a magnetizing position of the permanent magnet 582, a production error of a mounting position of the permanent magnet 582, a production error of a mounting position of the position sensor 59, or the like occurs, each light shielding vane 52 cannot be placed at a position in accordance with a desired opening area by the control of the diaphragm driving control portion 623.

Figure 8A:
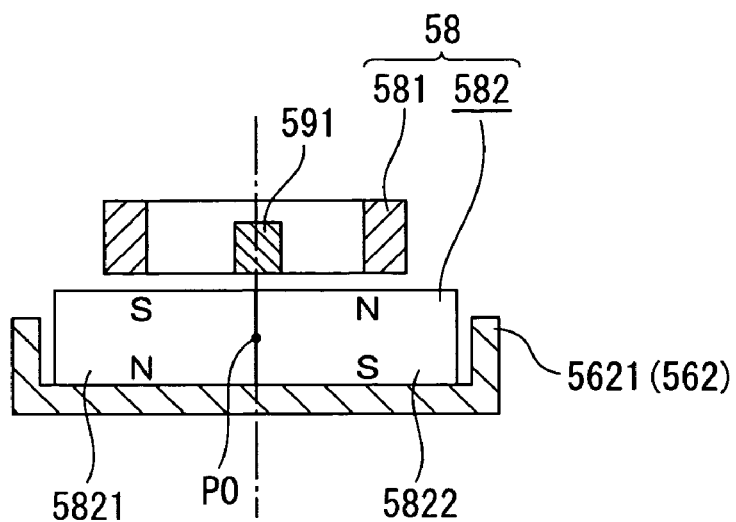
FIGS. 8A to 8C are diagrams each schematically showing a production error of the optical diaphragm in the first exemplary embodiment.
Figure 8B:
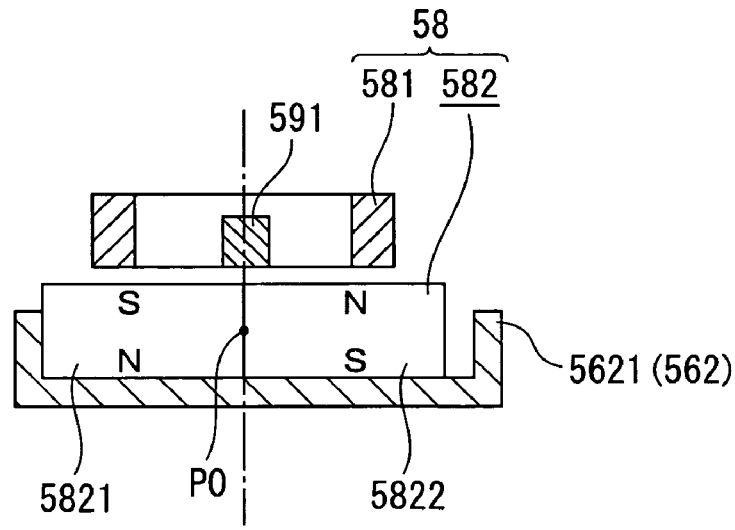
Figure 8C:
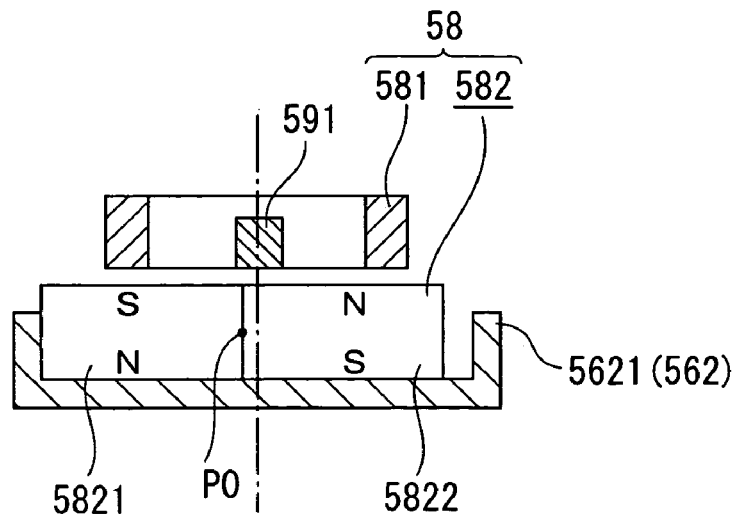

FIGS. 8A to 8C each schematically show a production error of the optical diaphragm 5. Specifically, FIG. 8A shows the case where a production error has not occurred in the optical diaphragm 5. FIGS. 8B and 8C each show the case where a production error has occurred in the optical diaphragm 5.

In the case where a production error has not occurred in the optical diaphragm 5, as shown in FIG. 8A, when each light shielding vane 52 is placed at a position where the opening area by each light shielding vane 52 becomes an intermediate opening area $S_{mid}$, the diaphragm driving control portion 623 applies a forward current or a reverse current to the electromagnetic coil 581 to place the permanent magnet 582 so that the position where the offset voltage value Vdd/2 corresponding to the intermediate opening area $S_{mid}$ is outputted from the position sensor 59, i.e., a position P0 between different poles of the first magnet portion 5821 and the second magnet portion 5822 is opposed to the position sensor main body 591, based on the opening area-voltage value information.

Further, even in the case where a production error has occurred in the optical diaphragm 5, more specifically, as shown in FIG. 8B, even in the case where a production error has occurred at a mounting position of the permanent magnet 582 with respect to the inner side of the protrusion 5621, in the same way as the above, when each light shielding vane 52 is placed at a position where the opening area by each light shielding vane 52 becomes an intermediate opening area $S_{mid}$, the diaphragm driving control portion 623 applies a forward current or a reverse current to the electromagnetic coil 581 to place the permanent magnet 582 so that the position at which the offset voltage value Vdd/2 corresponding to the intermediate opening area $S_{mid}$ is outputted from the position sensor 59, i.e., the position P0 between different poles of the first magnet portion 5821 and the second magnet portion 5822 is opposed to the position sensor main body 591, based on the opening area-voltage value information. Therefore, the permanent magnet 582 is placed at a position (shown in FIG. 8B) shifted from the position (shown in FIG. 8C) of the permanent magnet 582 at which the opening area is supposed to be the intermediate opening area $S_{mid}$.

In the case where a production error has occurred at a mounting position of the permanent magnet 582, the permanent magnet 582 is placed at a shifted position not only when the opening area becomes the intermediate opening area $S_{mid}$, but also when the permanent magnet 582 is placed at a position where the opening area becomes other opening areas, with the result that each light shielding vane 52 cannot be placed at a position where the opening area becomes a desired opening area. This also applies to the case where a production error such as a interface variation of N- and S-poles of the permanent magnet 582 has occurred at a magnetizing position, and the case where a production error has occurred at a mounting position of the position sensor 59.

Thus, even in the case where a production error has occurred in the optical diaphragm 5, in the control by the diaphragm control portion 623, it is necessary to place the permanent magnet 582 at a desired position, and to place each light shielding vane 52 at a position where the opening area becomes a desired opening area.

Configuration of a Correction Parameter Calibrator

After the production of the projector 1, the correction parameter calibrator 100 updates the offset correction parameter and the gain correction parameter stored in the correction parameter storage 5913 so that the position sensor 59 outputs a voltage value (designed voltage value) corresponding to the desired opening area based on the opening area-voltage value information when the permanent magnet 582 is placed at a position where the opening area becomes a desired opening area. As shown in FIG. 7, the correction parameter calibrator 100 includes a light-beam detector 110, and a calibrator main body 120 composed of a personal computer provided with a CPU and a hard disk.

Under the control of the calibrator main body 120, the light-beam detector 110 detects the amount of light of an optical image enlarged and projected from the projector 1 driven with a control instruction from the calibrator main body 120. As the light-beam detector 110, for example, a two-dimensional optical sensor or the like composed of imaging elements such as an illuminator, an optical sensor, a photosensor, a charge coupled device (CCD), and a metal oxide semiconductor (MOS) can be adopted. Then, the light-beam detector 110 is connected to the calibrator main body 120 via a signal line Si2 (FIG. 7), and outputs a signal in accordance with the light amount of the detected optical image to the calibrator main body 120.

As shown in FIG. 7, the calibrator main body 120 includes an operation portion 121, a display portion 122, and a control device 123.

The operation portion 121 has, for example, various kinds of operation buttons subjected to an input operation through a keyboard, a mouse, or the like. By performing an input operation of the operation buttons, the control device 123 is operated appropriately, and for example, the operation contents of the control device 123 are set or the like with respect to the information displayed on the display portion 122. Then, a predetermined operation signal is outputted appropriately to the control device 123 from the operation portion 121 by the input operation of the operation portion 121 by an operator.

The operation portion 121 may have a configuration in which various kinds of conditions are set and inputted not only by an input operation of the operation buttons but also an input operation through a touch panel, an input operation through a voice, etc.

The display portion 122 is controlled by the control device 123, and displays predetermined information. For example, information processed by the control device 123 is displayed, or information to be stored in a memory (described later) of the control device 123 is set or updated by an input operation of the operation portion 121, the data in the memory outputted from the control device 123 is appropriately displayed. As the display portion 122, for example, liquid crystal, organic electroluminescence (EL), a plasma display panel (PDP), a cathode-ray tube (CRT), or the like is used.

The control device 123 executes a predetermined program in accordance with an input of an operation signal from the operation portion 121, causes the projector 1 to output a predetermined control instruction to drive the projector 1, and updates an offset correction parameter and a gain correction parameter to optimum values. As shown in FIG. 7, the control device 123 includes an interface 1231, a control portion main body 1232, and a memory 1233.

The interface 1231 is connected to the interface 61 of the projector 1 via the signal line Si1, and executes output interface processing previously set with respect to a signal inputted from the control portion main body 1232 to output it to the projector 1.

Further, the interface 1231 is connected to the light-beam detector 110 via the signal line Si2, and executes the output interface processing previously set with respect to the signal inputted from the control portion main body 1232 to output it to the light-beam detector 110.

Further, the interface 1231 converts the signal outputted from the light-beam detector 110 into a signal processable in the control portion main body 1232 to output it to the control portion main body 1232.

The memory 1233 stores a program to be executed in the control portion main body 1232, and reference light amount information and reference output value information to be used in the control portion main body 1232.

Specifically, the light amount information is composed of intermediate light amount information regarding an intermediate light amount in terms of design enlarged and projected from the projector 1 and detected by the light-beam detector 110 in the case where the opening area is an intermediate opening area $S_{mid}$, and maximum light amount information or minimum light amount information regarding a maximum light amount or a minimum light amount in terms of design enlarged and projected from the projector 1 and detected by the light-beam detector 110 in the case where the opening area is a maximum opening area $S_{max}$ or a minimum opening area $S_{min}$. Further, the intermediate light amount information, the maximum light amount information, and the minimum light amount information relate to a predetermined range in which a predetermined allowable value P is taken into consideration with respect to the intermediate light amount $L_{mid}$, the maximum light amount $L_{max}$, and the minimum light amount $L_{min}$ in terms of design. More specifically, the intermediate light amount information relates to a range of $L_{mid}$–P to $L_{mid}$+P, the maximum light amount information relates to a range of $L_{max}$–P to $L_{max}$+P, and the minimum light amount information relates to a range of $L_{min}$–P to $L_{min}$+P.

Further, the reference output value information is designed offset voltage value information regarding the offset voltage value Vdd/2 in terms of design outputted from the position sensor 59 when the permanent magnet 582 is placed at a position where the opening area becomes the intermediate opening area $S_{mid}$, designed maximum output voltage value information regarding the maximum output voltage value Vdd in terms of design outputted from the position sensor 59 when the permanent magnet 582 is placed at a position where the opening area becomes the maximum opening area $S_{max}$, and designed minimum output voltage value information regarding the minimum output voltage value 0 in terms of design outputted from the position sensor 59 when the permanent magnet 582 is placed at a position where the opening area becomes the minimum opening area $S_{min}$.

More specifically, the memory 1233 corresponds to the light amount information storage and the output value information storage according to the invention.

The control portion main body 1232 is configured including a CPU and the like. The control portion main body 1232 reads a predetermined program from the memory 1233 to execute predetermined processing in accordance with the input operation of the operation portion 121 by an operator, outputs a predetermined control instruction to the projector 1 to drive the projector 1, and updates an offset correction parameter and a gain correction parameter to optimum values based on the signal outputted from the light-beam detector 110.

Further, the control portion main body 1232 corresponds to the light source driving control portion, the diaphragm driving control portion, and the parameter updating portion according to the invention.

Correction Parameter Calibrating Method Using Correction Parameter Calibrator

Next, the correction parameter calibrating method using the above-mentioned correction parameter calibrator 100 will be described with reference to the drawings.

Figure 9:
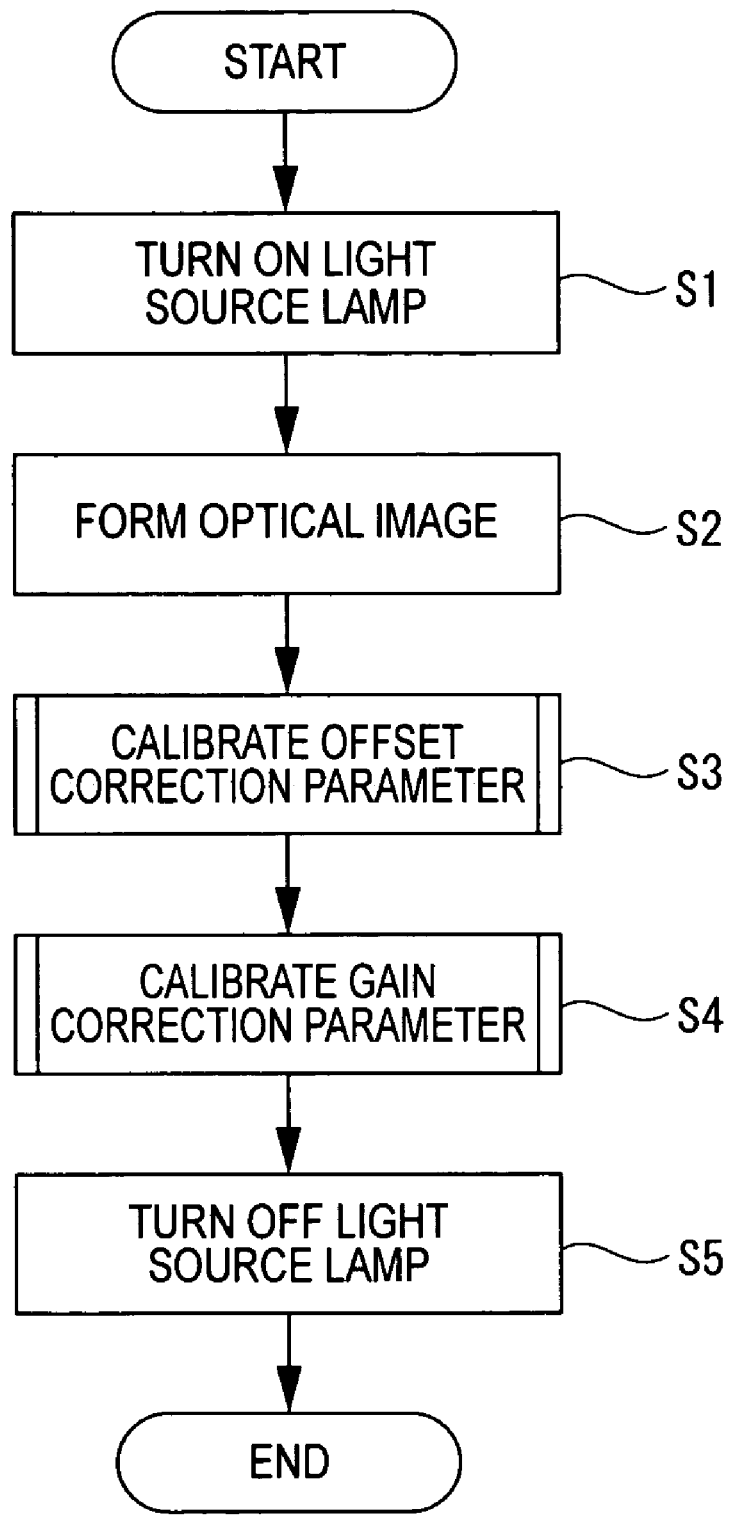
FIG. 9 is a flowchart illustrating a correction parameter calibrating method using the correction parameter calibrator in the first exemplary embodiment.

FIG. 9 is a flowchart illustrating the correction parameter calibrating method using the correction parameter calibrator 100.

It is assumed that the projector 1 is switched on to be driven under the condition of being assembled as a whole before the following correction parameter calibrating method is performed. Further, it is assumed that the correction parameter calibrator 100 and the projector 1 are connected to each other via the signal line Si1. Further, the light-beam detector 110 and the interface 1231 are connected to each other via the signal line Si2.

First, the operator performs an input operation so that the operation portion 121 of the correction parameter calibrator 100 calibrates correction parameters (an offset correction parameter and a gain correction parameter) in the projector 1. The control portion main body 1232 of the correction parameter calibrator 100 inputs an operation signal outputted from the operation portion 121, and calibrates the correction parameters in accordance with a predetermined program as described below.

More specifically, the control portion main body 1232 outputs a control instruction of causing the projector 1 to light up the light source lamp 416 via the signal line Si1. Then, the lamp driving control portion 622 of the projector 1 causes the lamp driver 416A to light up the light source lamp 416 in accordance with the control instruction (Step S1: light-beam irradiation step).

After Step S1, the control portion main body 1232 outputs a control instruction of causing the projector 1 to perform a white display of each liquid crystal panel 441 via the signal line Si1. Then, the liquid crystal panel driving control portion 621 of the projector 1 causes each liquid crystal panel 441 to form an optical image of a white display in accordance with the control instruction (Step S2).

After Step S2, the control portion main body 1232 calibrates the offset correction parameter (Step S3).

Figure 10:
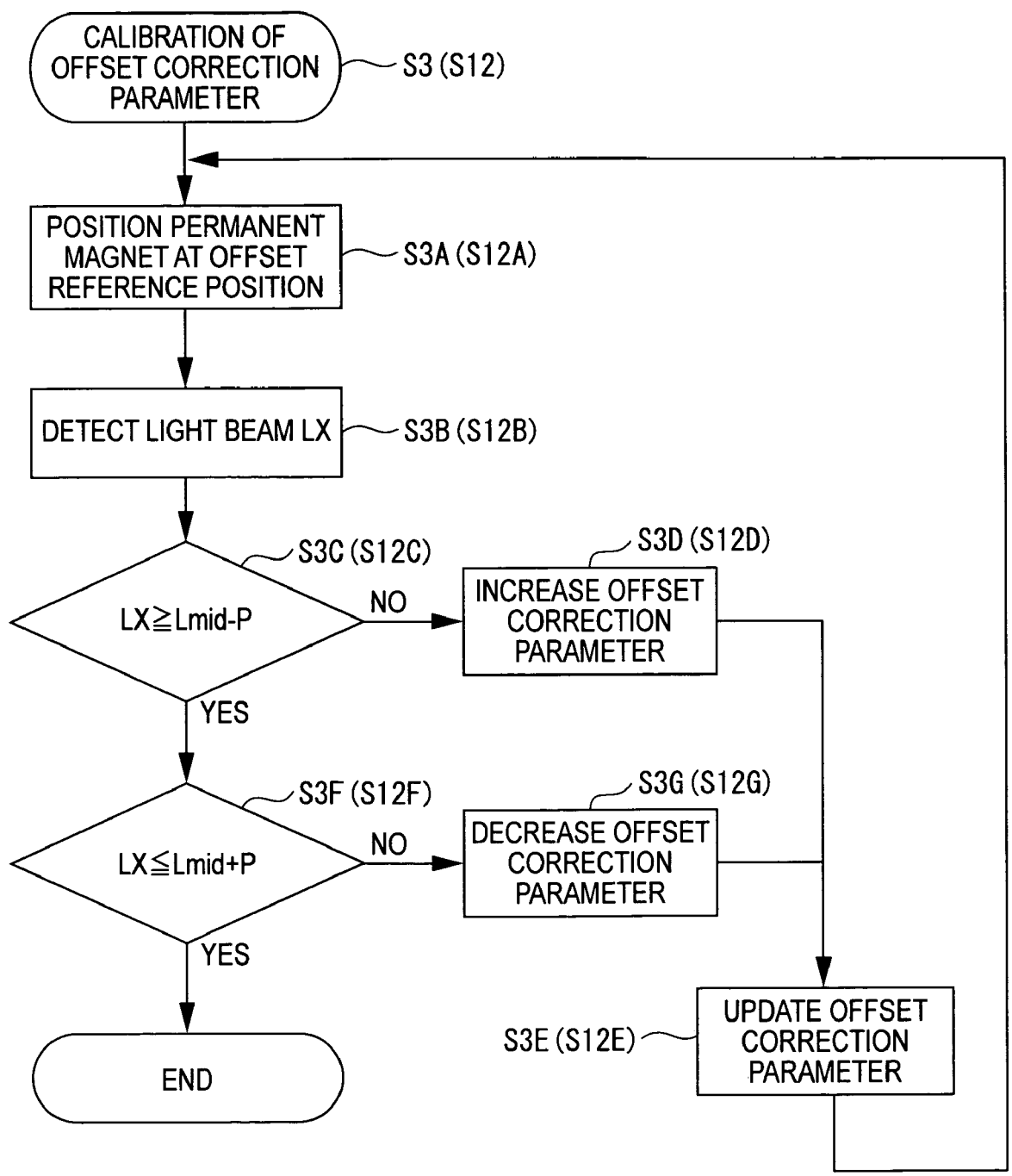
FIG. 10 is a flowchart illustrating an offset correction parameter calibrating method in the first exemplary embodiment.

Specifically, FIG. 10 is a flowchart illustrating an offset correction parameter calibrating method.

First, the control portion main body 1232 reads designed offset voltage value information stored in the memory 1233, and outputs a control instruction of placing the permanent magnet 582 at a position where the offset voltage value Vdd/2 based on the designed offset voltage value information is outputted from the position sensor 59 to the projector 1 via the signal line Si1. Then, the diaphragm driving control portion 623 of the projector 1 applies a forward current or a reverse current to the electromagnetic coil 581 in accordance with the control instruction, and places the permanent magnet 582 at a reference position (an offset reference position) at which the offset voltage value Vdd/2 is outputted from the position sensor 59 (Step S3A: Permanent magnet positioning step).

After Step S3A, the control portion main body 1232 outputs a predetermined control signal to the light-beam detector 110 via the signal line Si2, and causes the light-beam detector 110 to detect a light amount LX of an optical image enlarged and projected from the projector 1 (Step S3B: Light-beam detection step). Then, the light-beam detector 110 outputs a signal in accordance with the detection light amount LX of the detected optical image to the control portion main body 1232.

After Step S3B, the control portion main body 1232 compares the intermediate light amount information stored in the memory 1233 with the detection light amount LX detected in the light-beam detector 110.

Specifically, first, the control portion main body 1233 determines whether or not the detection light amount LX is $L_{min}-P$ or more based on the intermediate light amount information (Step S3C).

In the case where the control portion main body 1232 determines "N", i.e., in the case where the control portion main body 1232 determines that the detection light amount LX is less than $L_{min}-P$ in Step S3C, the control portion main body 1232 outputs a control instruction of causing the projector 1 to increase an offset correction parameter via the signal line Si1. Then, the projector 1 increases the offset correction parameter stored in the correction parameter storage 5913 of the position sensor 59 (Step S3D). Then, the correction parameter storage 5913 stores the changed offset correction parameter (Step S3E).

More specifically, the state in which the detection light amount LX is determined to be less than $L_{mid}-P$ in Step S3C corresponds to the following state: the permanent magnet 582 is placed at an offset reference position where the offset voltage value Vdd/2 is outputted from the position sensor 59 due to the above-mentioned production error occurring in the optical diaphragm 5 so that the opening area by each light shielding vane 52 becomes an opening area smaller than the intermediate opening area $S_{mid}$.

Then, in Steps S3D and S3E, the offset correction parameter is increased and rewritten, whereby the output characteristics corrector 5912 performs the above-mentioned offset correction based on the rewritten offset correction parameter. More specifically, due to the offset correction, the output characteristics of the hall element 5911 are corrected, and a voltage value different from the offset voltage value Vdd/2 is outputted from the hall element 5911.

After Step S3E, the process returns to Step S3A again. More specifically, the diaphragm control portion 623 applies a forward current or a reverse current to the electromagnetic coil 581 again in accordance with a control instruction outputted from the correction parameter calibrator 100, and places the permanent magnet 582 at an offset reference position where the offset voltage value Vdd/2 is outputted from the position sensor 59.

Then, the control portion main body 1232 repeats the above-mentioned Steps S3A to S3E until "Y" is determined, i.e., the detection light amount LX is determined to be $L_{mid}-P$ or more in Step S3C.

In the case where the control portion main body 1232 determines "Y", i.e., the control portion main body 1232 determines that the detection light amount LX is $L_{min}-P$ or more in Step S3C, the control portion main body 1232 then determines whether or not the detection light amount LX is $L_{min}+P$ or less based on the intermediate light amount information (Step S3F).

In the case where the control portion main body 1232 determines "N", i.e., in the case where the control portion main body 1232 determines that the detection light amount LX exceeds $L_{mid}+P$ in Step S3F, the control portion main body 1232 outputs a control instruction of causing the projector 1 to decrease an offset correction parameter via the signal line Si1. The projector 1 decreases the offset correction parameter stored in the correction parameter storage 5913 of the position sensor 59 (Step S3G). Then, the correction parameter storage 5913 stores the changed offset correction parameter in Step S3E.

More specifically, the state in which the detection light amount LX is determined to be less than $L_{mid}$+P in Step S3F corresponds to the following state: the permanent magnet 582 is placed at an offset reference position where the offset voltage value Vdd/2 is outputted from the position sensor 59 due to the above-mentioned production error occurring in the optical diaphragm 5 so that the opening area by each light shielding vane 52 becomes larger than the intermediate opening area $S_{mid}$.

Then, in Steps S3G and S3E, the offset correction parameter is decreased and rewritten, whereby the output characteristics corrector 5912 performs the above-mentioned offset correction based on the rewritten offset correction parameter. More specifically, due to the offset correction, the output characteristics of the hall element 5911 are corrected, and a voltage value different from the offset voltage value Vdd/2 is outputted from the hall element 5911.

After the offset correction parameter is decreased in Step S3G, and the offset correction parameter is rewritten in Step S3E, the process returns to Step S3A again. More specifically, the diaphragm driving control portion 623 applies a forward current or a reverse current to the electromagnetic coil 581 again in accordance with a control instruction outputted from the correction parameter calibrator 100, and places the permanent magnet 582 at an offset reference position where the offset voltage value Vdd/2 is outputted from the position sensor 59 in accordance with a control instruction outputted from the correction parameter calibrator 100.

Then, the control portion main body 1232 repeats the above-mentioned Steps S3A to S3G until "Y" is determined, i.e., the detection light amount LX is determined to be $L_{mid}$+P or less in Step S3F.

Owing to the above-mentioned calibration of the offset correction parameter (Step S3), the detection light amount LX falls within a range of $L_{mid}$–P or more and $L_{mid}$+P or less, whereby even in the case where the above-mentioned production error has occurred in the optical diaphragm 5, the opening area by each light shielding vane 52 becomes a substantially intermediate opening area $S_{mid}$ when the permanent magnet 582 is placed at the offset reference position where the offset voltage value Vdd/2 is outputted from the position sensor 59.

After Step S3, the control portion main body 1232 calibrates a gain correction parameter (Step S4).

Figure 11:
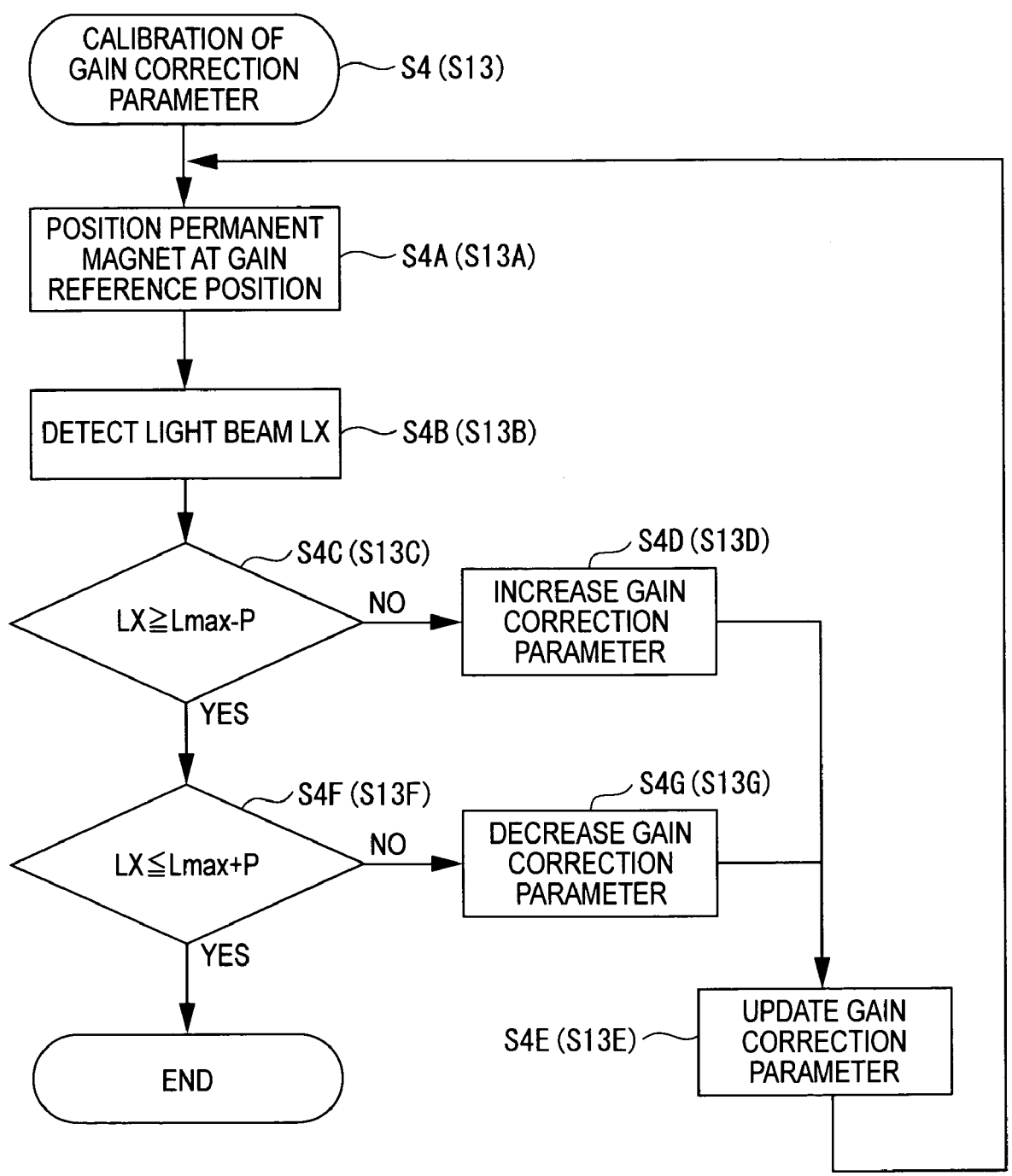
FIG. 11 is a flowchart illustrating a gain correction parameter calibrating method in the first exemplary embodiment.

Specifically, FIG. 11 is a flowchart illustrating a gain correction parameter calibrating method.

First, the control portion main body 1232 reads designed maximum output voltage value information stored in the memory 1233, and outputs a control instruction of placing the permanent magnet 582 at a reference position (gain reference position) where the maximum output voltage value Vdd based on the designed maximum output voltage value information is outputted from the position sensor 59 to the projector 1 via the signal line Si1. Then, the diaphragm driving control portion 623 of the projector 1 applies a forward current or a reverse current to the electromagnetic coil 581 in accordance with the control instruction, and places the permanent magnet 582 at a gain reference position where the maximum output voltage value Vdd is outputted from the position sensor 59 (Step S4A: Permanent magnet positioning step).

After Step S4, the control portion main body 1232 outputs a predetermined control instruction to the light-beam detector 110 via the signal line Si2, and causes the light-beam detector 110 to detect a light amount LX of an optical image enlarged and projected from the projector 1 (Step S4B: Light-beam detection step). Then, the light-beam detector 110 outputs a signal in accordance with the detection light amount LX of the detected optical image to the control portion main body 1232.

After Step S4B, the control portion main body 1232 compares the maximum light amount information stored in the memory 1233 with the detection light amount LX detected in the light-beam detector 110.

Specifically, first, the control portion main body 1232 determines whether or not the detection light amount LX is $L_{max}$–P or more based on the maximum light amount information (Step S4C).

In the case where the control portion main body 1232 determines "N", i.e., in the case where the control portion main body 1232 determines that the detection light amount LX is less than $L_{max}$–P in Step S4C, the control portion main body 1232 outputs a control instruction of causing the projector 1 to increase a gain correction parameter via the signal line Si1. Then, the projector 1 increases the gain correction parameter stored in the correction parameter storage 5913 of the position sensor 59 (Step S4D). Then, the correction parameter storage 5913 stores the changed gain correction parameter (Step S4E).

More specifically, the state in which the detection light amount LX is determined to be less than $L_{max}$–P in Step S4E corresponds to the following state: the permanent magnet 582 is placed at a gain reference position where the maximum output voltage value Vdd is outputted from the position sensor 59 due to the above-mentioned production error occurring in the optical diaphragm 5 so that the opening area by each light shielding vane 52 becomes an opening area smaller than the maximum opening area Smax.

Then, in Steps S4D and S4E, the gain correction parameter is increased and rewritten, whereby the output characteristics corrector 5912 performs the above-mentioned gain correction based on the rewritten gain correction parameter. More specifically, due to the gain correction, the output characteristics of the hall element 5911 are corrected, and a voltage value different from the maximum output voltage value Vdd is outputted from the hall element 5911.

After Step S4E, the process returns to Step S4A again. More specifically, the diaphragm control portion 623 applies a forward current or a reverse current to the electromagnetic coil 581 again in accordance with a control instruction outputted from the correction parameter calibrator 100, and places the permanent magnet 582 at a gain reference position where the maximum output voltage value Vdd is outputted from the position sensor 59.

Then, the control portion main body 1232 repeats the above-mentioned Steps S4A to S4E until "Y" is determined, i.e., the detection light amount LX is determined to be $L_{max}$–P or more in Step S4C.

In the case where the control portion main body 1232 determines "Y", i.e., the control portion main body 1232 determines that the detection light amount LX is $L_{max}$–P or more in Step S4C, then, the control portion main body 1232 determines whether or not the detection light amount LX is $L_{max}$+P or less based on the maximum light amount information (Step S4F).

In the case where the control portion main body 1232 determines "N", i.e., in the case where the control portion main body 1232 determines that the detection light amount LX exceeds $L_{max}$+P in Step S4F, the control portion main body 1232 outputs a control instruction of causing the projector 1 to decrease a gain correction parameter via the signal line Si1. The projector 1 decreases the gain correction parameter stored in the correction parameter storage 5913 of the position sensor 59 (Step S4G). Then, the correction parameter storage 5913 stores the changed gain correction parameter in Step S4E.

More specifically, the state in which the detection light amount LX is determined to exceed $L_{max}$+P in Step S4F corresponds to the following state: the permanent magnet 582 is placed at a gain reference position where the maximum output voltage value Vdd is outputted from the position sensor 59 due to the above-mentioned production error occurring in the optical diaphragm 5 so that the opening area by each light shielding vane 52 becomes larger than the maximum opening area $S_{max}$.

Then, in Steps S4G and S4E, the gain correction parameter is decreased and rewritten, whereby the output characteristics corrector 5912 performs the above-mentioned gain correction based on the rewritten gain correction parameter. More specifically, due to the gain correction, the output characteristics of the hall element 5911 are corrected, and a voltage value different from the maximum output voltage value Vdd is outputted from the hall element 5911.

After the gain correction parameter is decreased in Step S4G, and the gain correction parameter is rewritten in Step S4E, the process returns to Step S4A again. More specifically, the diaphragm driving control portion 623 applies a forward current or a reverse current to the electromagnetic coil 581 again in accordance with a control instruction outputted from the correction parameter calibrator 100, and places the permanent magnet 582 at a gain reference position where the maximum output voltage value Vdd is outputted from the position sensor 59 in accordance with a control instruction outputted from the correction parameter calibrator 100.

Then, the control portion main body 1232 repeats the above-mentioned Steps S4A to S4G until "Y" is determined, i.e., the detection light amount LX is determined to be $L_{max}$+P or less in Step S4F.

Owing to the above-mentioned calibration of the gain correction parameter (Step S4), the detection light amount LX falls within a range of $L_{max}$–P or more and $L_{max}$+P or less, whereby even in the case where the above-mentioned production error has occurred in the optical diaphragm 5, the opening area by each light shielding vane 52 becomes a substantially maximum opening area $S_{max}$ when the permanent magnet 582 is placed at the gain reference position where the maximum output voltage value Vdd is outputted from the position sensor 59. Further, as described above, in the gain correction, the tilt of the output characteristics in the hall element 5911 is changed with the offset voltage value Vof being a reference. Therefore, in the case where the permanent magnet 582 is placed at a position where the minimum output voltage value 0 is outputted from the position sensor 59, the opening area by each light shielding vane 52 becomes a substantially minimum opening area $S_{min}$. More specifically, by calibrating the gain correction parameter, the output characteristics in the hall element 5911 are corrected to the output characteristics corresponding to the opening area–voltage value associated information stored in the memory 64.

Then, the above-mentioned Steps S3C to S3G and S4C to S4G correspond to the parameter updating step according to the invention.

After Step S4, the control portion main body 1232 outputs a signal indicating that the calibration of the correction parameters has been completed to the projector 1 via the signal line Si1. Then, the lamp driving control portion 622 of the projector 1 causes the lamp driver 416A to turn off the light source lamp 416 in accordance with the control instruction (Step S5).

The calibration of the correction parameters is completed by the above-mentioned Steps S1 to S5.

According to the above-mentioned first exemplary embodiment, there are the following effects.

In this exemplary embodiment, since the optical diaphragm 5 has the electromagnetic actuator 58 as a driving device for rotating each light shielding vane 52, it has the following effects.

More specifically, the optical diaphragm 5 can be driven with a low voltage, which can reduce the power consumption of the optical diaphragm 5.

Further, the optical diaphragm 5 can exert a relatively large force in a relatively small region, and can rotate the diaphragm ring 56 smoothly to rotate the light shielding vanes 52 smoothly.

Further, the optical diaphragm 5 can be used even in an unsatisfactory environment such as high humidity, so the life of the optical diaphragm 5 can be prolonged.

Further, the optical diaphragm 5 has satisfactory driving response characteristics, and cause the light shielding vanes 52 to respond at a high speed and rotate smoothly.

Thus, by using the electromagnetic actuator 58 as a driving device, compared with the configuration using a pulse motor or the like as a driving device as in a conventional example, the driving device can be configured with a simple configuration of the electromagnetic coil 581 and the permanent magnet 582, whereby the configuration of the optical diaphragm 5 can be simplified and miniaturized. Further, compared with the conventional configuration, the vibration during driving can be reduced, and the optical diaphragm 5 can be driven steadily.

The diaphragm driving control portion 623 that drives the optical diaphragm 5 recognizes a designed voltage value associated with the predetermined opening area, when the light shielding vanes 52 are placed as positions where a predetermined opening area is obtained based on the opening area-voltage value information stored in the memory 64. Then, the diaphragm driving control portion 623 applies a forward current or a reverse current to the electromagnetic coil 581 so that the output value outputted from the position sensor 59 becomes substantially the same as the recognized designed voltage value, thereby placing the permanent magnet 582 at a predetermined position. According to such a configuration, the processing load by the diaphragm driving control portion 623 is alleviated, and the control configuration of the control device 6 can be simplified.

Further, the position sensor 59 has the hall element 5911 and the output characteristics corrector 5912. Therefore, if the correction parameter (an offset correction parameter and a gain correction parameter) are calibrated to optimum correction parameters, the output characteristics corrector 5912 corrects the output characteristics of the hall element 5911 based on the calibrated correction parameters. Thus, even in the case where the above-mentioned production error has occurred in the optical diaphragm 5, when the permanent magnet 582 is placed at a position corresponding to a predetermined opening area, a designed voltage value corresponding to the predetermined opening area can be outputted from the hall element 5911. Therefore, in the case where the diaphragm driving control portion 623 applies a forward current or a reverse current to the electromagnetic coil 581 so that the output value from the position sensor 59 becomes substantially the same as the designed voltage value corresponding to the predetermined opening area, the permanent magnet 582 can be placed at a position corresponding to the predetermined opening area, and each light shielding vane 52 can be placed with high precision at a position where the predetermined opening area is obtained. Thus, while the processing load of the diaphragm driving control portion 623 is being reduced, the light shielding vanes 52 can be moved with high precision by the diaphragm driving control portion 623 to be driven steadily.

Herein, since the correction parameters include an offset correction parameter, the output characteristics corrector 5912 performs an offset correction using an offset correction parameter, thereby offsetting the position of the permanent magnet 582 with respect to the offset voltage value Vdd/2, and consequently, enabling the hall element 5911 to output the offset voltage value Vdd/2 under the condition that the permanent magnet 582 is placed at the offset reference position where the intermediate opening area $S_{mid}$ is obtained. Thus, owing to the configuration in which an offset correction can be performed using the offset correction parameter, the output characteristics of the hall element 5911 can be corrected with a simple circuit configuration.

Further, since the correction parameter includes a gain correction parameter in addition to the offset correction parameter, the output characteristics corrector 5912 performs a gain correction using the gain correction parameter, thereby enabling the hall element 5911 to output each designed voltage value in terms of design corresponding to each position of the permanent magnet 582 in a range from a position P3 where the minimum opening area $S_{min}$ is obtained to a position P4 where the maximum opening area $S_{max}$ is obtained, under the condition that the permanent magnet 582 is placed in the above-mentioned range. Thus, owing to the configuration enabling a gain correction using the gain correction parameter, the output characteristics of the hall element 5911 can be corrected with a simple circuit configuration.

Further, the voltage value outputted from the hall element 5911 can be corrected to each designed voltage value over the entire range (positions P3 to P4) owing to the gain correction. Therefore, each light shielding vane 52 is moved with higher precision, whereby stable driving can be realized.

Further, the correction parameter storage 5913 provided in the position sensor 59 stores correction parameters so that they are rewritable. Therefore, the correction parameters can be calibrated appropriately to be updated to optimum correction parameters. Thus, the output characteristics corrector 5912 corrects the output characteristics of the hall element 5911 using the updated optimum correction parameters, thereby enabling the hall element 5911 to output a designed voltage value corresponding to a predetermined opening area in the case where the permanent magnet 582 is placed at a position corresponding to the predetermined opening area.

Then, the projector 1 can adjusts the amount of a light beam irradiated from the light source device 411 to the liquid crystal panel 411 by the optical diaphragm 5. Therefore, the diaphragm driving control portion 623 controls the optical diaphragm 5 in accordance with the lightness information on an image to reduce the light amount in the case where it is dark as a whole, and to increase the light amount in the case where it is light as a whole, whereby a projected image with a high contrast can be realized.

Further, the projector 1 includes the optical diaphragm 5 that can be simplified and miniaturized in configuration. Therefore, in the projector 1, the optical diaphragm 5 can be provided easily between members of the first lens array 412 and the second lens array 413 placed close to each other, whereby the degree of freedom of the layout of the projector 1 can be enhanced.

Further, the projector 1 includes the optical diaphragm 5 capable of suppressing the vibration during driving to realize stable driving, so a projected image can be maintained satisfactorily by suppressing the influence given to the projected image by vibration.

Further, the projector 1 can rotate each light shielding vane 52 with high precision by the diaphragm control portion 623 while reducing the processing load of the diaphragm driving control portion 623. Therefore, the amount of a light beam irradiated from the light source device 411 to the liquid crystal panel 411 can be adjusted with high precision, and the quality of a projected image can be enhanced.

The correction parameter calibrator 100 updates the correction parameters based on the amount of an optical image irradiated from the light source device 411 and enlarged and projected by the projection lens 3 via the optical diaphragm 5, i.e., the light beam whose amount is adjusted actually by the optical diaphragm 5, under the condition that the projector 1 is assembled. Therefore, the amount of a light beam irradiated from the light source device 411 to the liquid crystal panel 441 can be adjusted with high precision, and the quality of a projected image can be enhanced.

Second Exemplary Embodiment

Next, a second exemplary embodiment of the invention will be described with reference to the drawings.

In the following description, the same portions as those described above are denoted with the same reference numerals as those in the above, and the description thereof will be omitted.

In the first exemplary embodiment, after the projector 1 is assembled, the correction parameter calibrator 100 drives the projector 1 appropriately, thereby calibrating correction parameters.

In contrast, in the second exemplary embodiment, a correction parameter calibrator 200 drives the optical diaphragm 5 appropriately, using the optical diaphragm 5 alone, thereby calibrating correction parameters. More specifically, the second exemplary embodiment is different from the first exemplary embodiment only in the configuration of the correction parameter calibrator 200, and is the same as the first exemplary embodiment in the other configurations of the projector 1.

Figure 12:
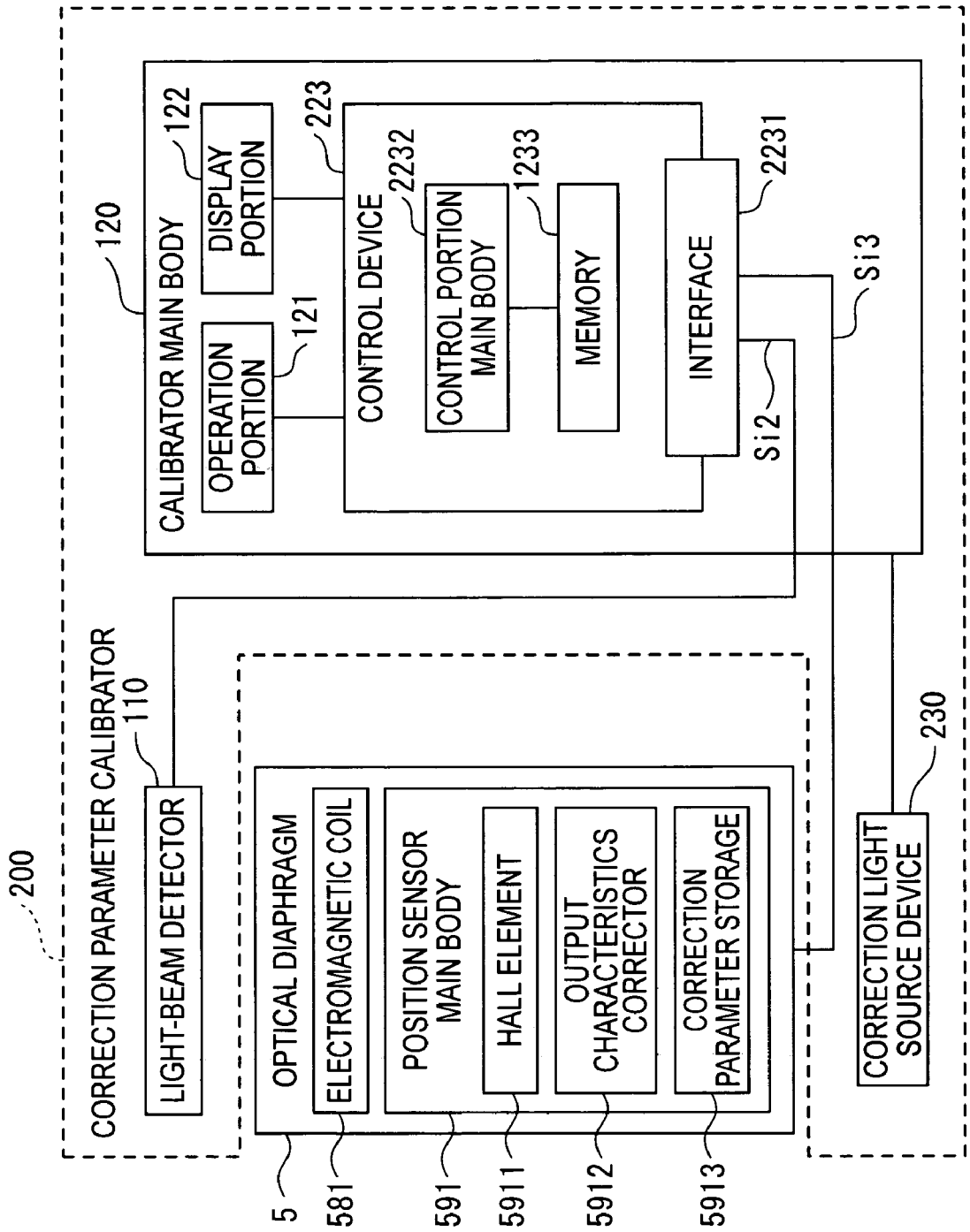
FIG. 12 is a block diagram schematically showing a control configuration of a correction parameter calibrator in a second exemplary embodiment of the invention.

FIG. 12 is a block diagram schematically showing a control configuration of the correction parameter calibrator 200 in the second exemplary embodiment.

As shown in FIG. 12, the correction parameter calibrator 200 is different from the correction parameter calibrator 100 described in the first exemplary embodiment only in that the correction light source device 230 is provided, and in the control configuration of a control device 323 corresponding to the control device 123.

A correction light source device 230 irradiates a light beam toward the optical diaphragm 5 under the control of the control device 223. As the correction light source device 230, for example, various kinds of solid light-emitting elements such as a light-emitting diode (LED), a laser diode, an organic EL element, and a silicon light-emitting element can be adopted.

The control device 223 executes a predetermined program in accordance with an input of an operation signal from the operation portion 121, drives the optical diaphragm 5, and updates an offset correction parameter and a gain correction parameter to optimum values. As shown in FIG. 12, the control device 223 includes an interface 2231 and a control portion main body 2232 in addition to the memory 1233 described in the first exemplary embodiment.

The interface 2231 is connected to the optical diaphragm 5 via the signal line Si3, and executes output interface processing previously set with respect to a signal inputted from the control portion main body 2232 to output it to the optical diagram 5 (the electromagnetic coil 581, the position sensor 59).

Further, the interface 3231 converts the signal outputted from the optical diaphragm 5 (the position sensor 59) into a signal processable in the control portion main body 2232 to output it to the control portion main body 2232.

Further, the interface 2231 is connected to the light-beam detector 110 via the signal line Si2, and executes the output interface processing previously set with respect to a signal inputted from the control portion main body 2232 to output it to the light-beam detector 110.

Further, the interface 2231 converts the signal outputted from the light-beam detector 110 into a signal processable in the control portion main body 2232 to output it to the control portion main body 2232.

The control portion main body 2232 is configured including a CPU and the like. The control portion main body 2232 reads a predetermined program from the memory 1233 to execute predetermined processing in accordance with the input operation of the operation portion 121 by an operator, thereby applying a forward current or a reverse current to the electromagnetic coil 581, and updates an offset correction parameter and a gain correction parameter to optimum values based on the signal outputted from the light-beam detector 110.

The control portion main body 2232 corresponds to the light source driving control portion, the diaphragm driving control portion and the parameter updating portion according to the invention.

Next, the correction parameter calibrating method using the above-mentioned correction parameter calibrator 200 will be described with reference to the drawings.

Figure 13:
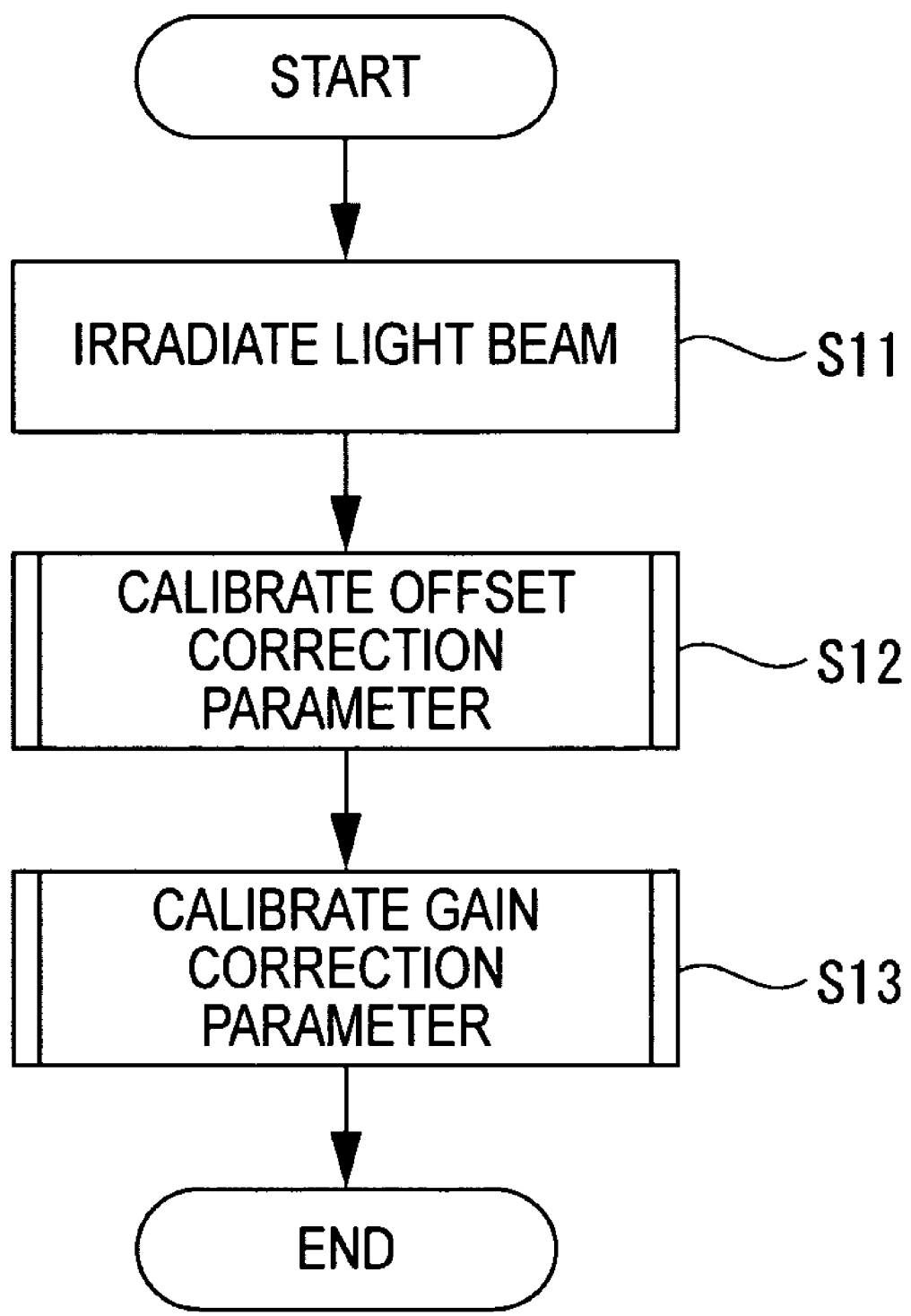
FIG. 13 is a flowchart illustrating a correction parameter calibrating method using a correction parameter calibrator in the second exemplary embodiment.

FIG. 13 is a flowchart illustrating a correction parameter calibrating method using the correction parameter calibrator 200 in the second exemplary embodiment.

It is assumed that, before performing the following correction parameter calibrating method, under the condition that the optical diaphragm 5 is assembled as a whole, the optical diaphragm 5 is connected to the interface 2231 via the signal line Si3, and the light-beam detector 110 is connected to the interface 2231 via the signal line Si2.

First, when an input operation of calibrating correction parameters is performed with respect to the operation portion 121, the control portion main body 2232 of the correction parameter calibrator 200 calibrates the correction parameters in accordance with a predetermined program as described below.

More specifically, the control portion main body 2232 outputs a predetermined control instruction to the correction light source device 230 to cause the correction light source device 230 to irradiate a light beam (Step S11: Light-beam irradiation step).

After Step S11, the control portion main body 2232 calibrates an offset correction parameter (Step S12). The offset correction parameter calibrating method is substantially the same as that of the offset correction parameter calibrating method described in the first exemplary embodiment, so the method will be described with reference to FIG. 10 hereinafter.

First, the control portion main body 2232 reads designed offset voltage value information stored in the memory 1233 to recognize an offset voltage value Vdd/2 based on the designed offset voltage value information. Further, the control portion main body 2232 applies a forward current or a reverse current to the electromagnetic coil 581, thereby placing the permanent magnet 582 at a reference position (an offset reference position) where the offset voltage value Vdd/2 is outputted from the position sensor 59 (Step S12A: Permanent magnet positioning step).

After Step S12A, the control portion main body 2232 outputs a predetermined control signal to the light-beam detector 110 via the signal line Si2, thereby causing the light-beam detector 110 to detect a light amount LX of a light beam irradiated from the correction light source device 230 via the optical diaphragm 5 (Step S12B: Light-beam detection step). Then, the light-beam detector 110 outputs a signal in accordance with the detection light amount LX of the detected light beam to the control portion main body 2232.

After Step S12B, the processes that are substantially similar to those of Steps S3C to S3G described in the first exemplary embodiment are performed. More specifically, the control portion main body 2232 compares the intermediate light amount information stored in the memory 1233 with the detection light amount LX detected by the light-beam detector 110 (Steps S12C, S12F), updates the offset correction parameter appropriately in accordance with the comparison results (Steps S12D, S12G), and stores the changed offset correction parameter in the correction parameter storage 5913 (Step S12E).

After Step S12, the control portion main body 2232 calibrates a gain correction parameter (Step S13). The gain correction parameter calibrating method is substantially similar to the gain correction parameter calibrating method described in the first exemplary embodiment, so the method will be described with reference to FIG. 11 hereinafter.

First, the control portion main body 2232 reads designed maximum output voltage value information stored in the memory 1233 to recognize a maximum output voltage value Vdd based on the designed maximum output voltage value information. Further, the control portion main body 2232 applies a forward current or a reverse current to the electromagnetic coil 581, thereby placing the permanent magnet 582 at a reference position (a gain reference position) where the maximum output voltage value Vdd is outputted from the position sensor 59 (Step S13A: Permanent magnet positioning step).

After Step S13A, the control portion main body 2232 outputs a predetermined control signal to the light-beam detector 110 via the signal line Si2, thereby causing the light-beam detector 110 to detect a light amount LX of a light beam irradiated from the correction light source device 230 via the optical diaphragm 5 (Step S13B: Light-beam detection step). Then, the light-beam detector 110 outputs a signal in accordance with the detection light amount LX of the detected light beam to the control portion main body 2232.

After Step S13B, the processes that are substantially similar to those of Steps S4C to S4G described in the first exemplary embodiment are performed. More specifically, the control portion main body 2232 compares the maximum light amount information stored in the memory 1233 with the detection light amount LX detected by the light-beam detector 110 (Steps S13C, S13F), updates the gain correction parameter appropriately in accordance with the comparison results (Steps S13D, S13G), and stores the changed gain correction parameter in the correction parameter storage 5913 (Step S13E).

The above-mentioned Steps S12C to S12G and S13C to S13G correspond to the parameter updating step according to the invention.

Owing to the above-mentioned Steps S11 to S13, the calibration of the correction parameters is completed.

In the above-mentioned second exemplary embodiment, there are the following effects in addition to effects substantially similar to those in the first exemplary embodiment.

A correction parameter calibrator 200 of this embodiment updates correction parameters based on the amount of a light beam irradiated from the correction light source device 230 via the optical diaphragm 5 under the condition that the optical diaphragm 5 is assembled. Therefore, the correction parameters can be updated using the optical diaphragm 5 alone and the correction parameter calibrator 200 without updating the correction parameters under the condition that the optical diaphragm 5 is mounted on the projector 1, whereby the efficiency of the operation space for updating the correction parameters can be enhanced.

Further, the correction light source device 230 is composed of a solid light-emitting element. Therefore, for example, compared with the configuration in which a light source lamp of a discharge light-emitting type is adopted as the correction light source device 230, the correction parameter calibrator 200 can be miniaturized and reduced in weight. Further, a light beam with a stable brightness can be irradiated from the correction light source device 230, so the correction parameters are updated based on the amount of a light beam with a stable brightness, whereby the correction parameters can be calibrated with high precision.

Third Exemplary Embodiment

Next, Embodiment 3 of the invention will be described with reference to the drawings.

In the following description, the same portions as those described above are denoted with the same reference numerals as those in the above, and the description thereof will be omitted.

In the first exemplary embodiment, after the projector 1 is assembled, the correction parameter calibrator 100 drives the projector 1 appropriately, thereby calibrating correction parameters. Further, the correction parameter calibrator 100 calibrates the correction parameters based on the detection light amount LX detected in the light-beam detector 110.

In contrast, in Embodiment 3, a correction parameter calibrator 300 drives the optical diaphragm 5 appropriately, using the optical diaphragm 5 alone, thereby calibrating correction parameters. Further, the correction parameter calibrator 300 includes a mechanical diaphragm driving device 340 that is mechanically connected to the optical diaphragm 5 to place each light shielding vane 52 mechanically at a position where a predetermined opening area is obtained. Then, under the condition that each light shielding vane 52 is placed at a position where a predetermined opening area is obtained in the mechanical diaphragm driving device 340, the correction parameter calibrator 300 calibrates the correction parameters so that the position sensor 59 outputs a designed output value corresponding to the predetermined opening area. More specifically, this embodiment is different from the first exemplary embodiment only in the configuration of the correction parameter calibrator 300, and is the same as the first exemplary embodiment in the other configurations of the projector 1.

Figure 14:
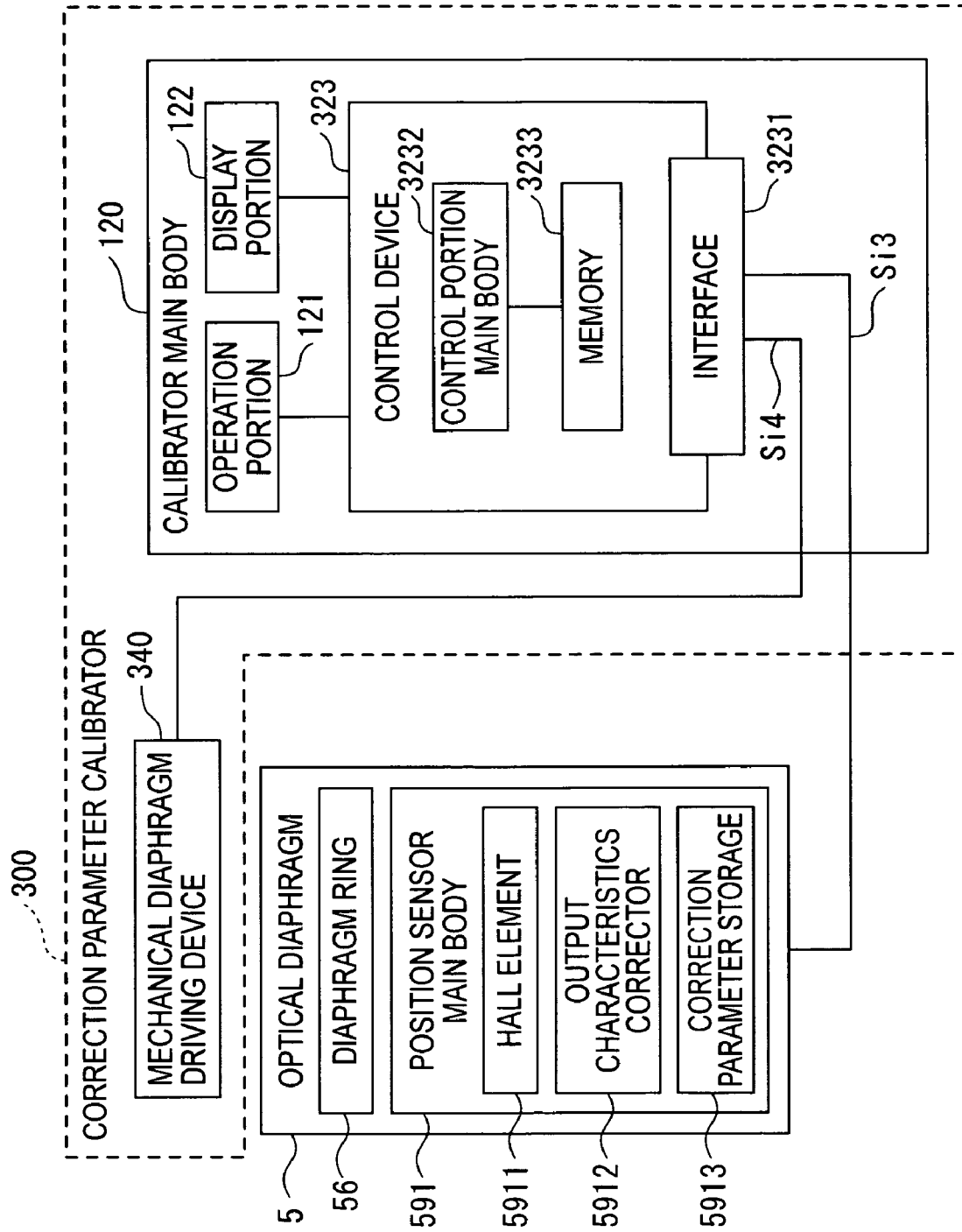
FIG. 14 is a block diagram schematically showing a control configuration of a correction parameter calibrator in a third exemplary embodiment of the invention.

FIG. 14 is a block diagram schematically showing a control configuration of the correction parameter calibrator 300 in Embodiment 3.

As shown in FIG. 14, the correction parameter calibrator 300 is different from the correction parameter calibrator 100 described in the first exemplary embodiment only in that the light-beam detector 110 is omitted and the mechanical diaphragm driving device 340 is provided, and in the control configuration of a control device 323 corresponding to the control device 123.

The mechanical diaphragm driving device 340 is composed of, for example, a motor, and is mechanically connected to the diaphragm ring 56 in the optical diaphragm 5 to be driven, thereby rotating the diaphragm ring 56. More specifically, by driving the mechanical diaphragm driving device 340, the diaphragm ring 56 is rotated, and each light shielding vane 52 is placed at a position where a predetermined opening area is obtained.

The control device 323 executes a predetermined program in accordance with an input of an operation signal from the operation portion 121, drives the mechanical diaphragm driving device 340 appropriately, and updates an offset correction parameter and a gain correction parameter to optimum values based on the output value outputted from the position sensor 59. As shown in FIG. 14, the control device 323 includes an interface 3231, a control portion main body 3232, and a memory 3233.

The interface 3231 is connected to the optical diaphragm 5 (position sensor 59) via the signal line Si3, and executes output interface processing previously set with respect to a signal inputted from the control portion main body 3232 to output it to the position sensor 59.

Further, the interface 3231 converts the signal outputted from the position sensor 59 into a signal processable in the control portion main body 3232 to output it to the control portion main body 3232.

Further, the interface 3231 is connected to the mechanical diaphragm driving device 340 via the signal line Si4, and executes the output interface processing previously set with respect to a signal inputted from the control portion main body 3232 to output it to the mechanical diaphragm driving device 340.

The memory 3233 stores a program to be executed by the control portion main body 3232, and reference output value information and driving value information to be used in the control portion main body 3232.

Specifically, the reference output value information is constituted of designed offset voltage value information regarding an offset voltage value in terms of design outputted from the position sensor 59 when the permanent magnet 582 is placed at a position where the opening area becomes an intermediate opening area $S_{mid}$, designed maximum output voltage value information regarding a maximum output voltage value in terms of design outputted from the position sensor 59 when the permanent magnet 582 is placed at a position where the opening area becomes a maximum opening area $S_{max}$, and designed minimum output voltage value information regarding a minimum output voltage value in terms of design outputted from the position sensor 59 when the permanent magnet 582 is placed at a position where the opening area becomes a minimum opening area $S_{min}$. Further, the designed offset voltage value information, the designed maximum output voltage value information, and the designed minimum output voltage value information are information regarding a predetermined range in which a predetermined allowance value P is taken into consideration with respect to an offset voltage value Vdd/2, a maximum output voltage value Vdd, and a minimum output voltage value 0 in terms of design. More specifically, the designed offset voltage value information is information regarding a range of Vdd/2−P to Vdd/2+P, and the designed maximum output value information is information regarding a range of Vdd−P to Vdd+P and a range of P or less.

Specifically, the memory 3233 corresponds to the output value information storage according to the invention.

Further, the driving value information is information regarding a driving value (a pulse value or the like if the mechanical diaphragm driving device 340 is composed of a pulse motor, etc.) for driving the mechanical diaphragm driving device 340. More specifically, the driving value information is composed of intermediate driving value information regarding an intermediate driving value of the mechanical diaphragm driving device 340 for placing each light shielding vane 52 at a position where the opening area becomes an intermediate opening area $S_{mid}$, and maximum driving value information or minimum driving value information regarding a maximum driving value or a minimum driving value of the mechanical diaphragm driving device 340 for placing each light shielding vane 52 at a position where the opening area becomes the maximum opening area $S_{max}$ or the minimum opening area $S_{min}$.

The control portion main body 3232 is configured, including a CPU and the like. The control portion main body 323 reads a predetermined program from the memory 3233 to execute predetermined processing in accordance with an input operation of the operation portion 121 by an operator, drives the mechanical diaphragm driving device 340 to place each light shielding vane 52 at a reference position where a predetermined opening area is obtained, and updates an offset correction parameter and a gain correction parameter to appropriate values based on the signal outputted from the position sensor 59.

The control portion main body 3232 corresponds to the mechanical diaphragm driving control portion and the parameter updating portion according to the invention.

Next, the correction parameter calibrating method using the above-mentioned correction parameter calibrator 300 will be described with reference to the drawings.

Figure 15:
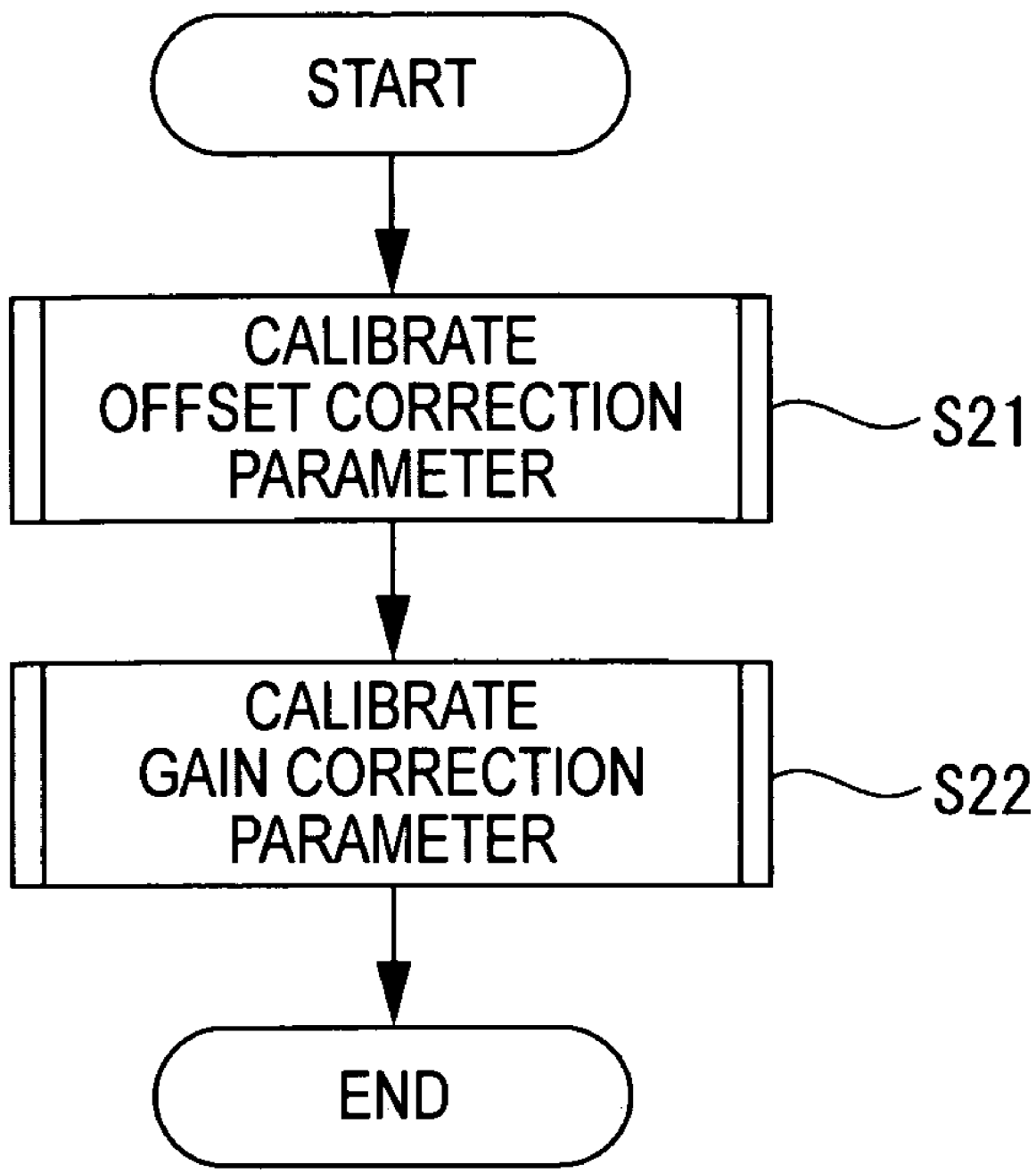
FIG. 15 is a flowchart illustrating a correction parameter calibrating method using a correction parameter calibrator in the third exemplary embodiment.

FIG. 15 is a flowchart illustrating a correction parameter calibrating method using the correction parameter calibrator 300 in Embodiment 3.

It is assumed that, before performing the following correction parameter calibrating method, under the condition that the optical diaphragm 5 is assembled as a whole, the diaphragm ring 56 is connected to the mechanical diaphragm driving device 340 mechanically, and the position sensor 59 is connected to the interface 3231 via the signal line Si3. It is also assumed that the mechanical diaphragm driving device 340 is connected to the interface 3231 via the signal line Si4. Further, it is assumed that the diaphragm ring 56 in the optical diaphragm 5 is placed at a predetermined rotation position, and each light shielding vane 52 is placed at a position where a predetermined opening area (e.g., the minimum opening area $S_{min}$, the maximum opening area $S_{max}$) is obtained.

First, when an input operation of configuring correction parameters is performed with respect to the operation portion 121, the control portion main body 3232 of the correction parameter calibrator 300 calibrates the correction parameters in accordance with a predetermined program as described below.

More specifically, first, the control portion main body 3232 calibrates an offset correction parameter (Step S21).

Figure 16:
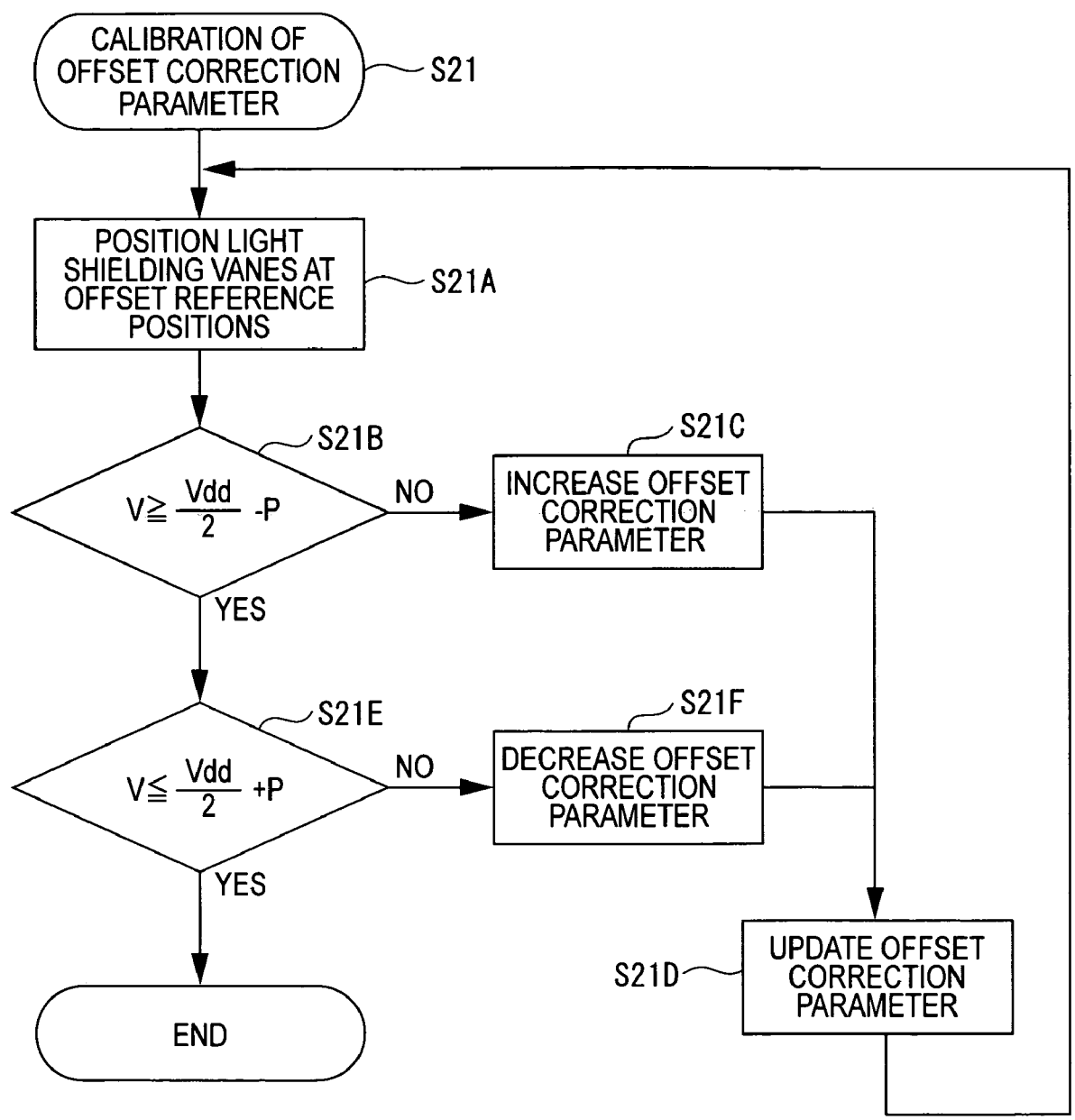
FIG. 16 is a flowchart illustrating an offset correction parameter calibrating method in the third exemplary embodiment.

Specifically, FIG. 16 is a flowchart illustrating an offset correction parameter calibrating method.

First, the control portion main body 3232 reads intermediate driving value information stored in the memory 3233, and outputs an intermediate driving value based on the intermediate driving value information to the mechanical diaphragm driving device 340. The mechanical diaphragm driving device 340 rotates the diaphragm ring 56 by a rotation amount in accordance with the intermediate driving value, and places each light shielding vane 52 at a reference position (an offset reference position) where the opening area becomes an intermediate opening area $S_{mid}$ (Step S21A: Light shielding vane positioning step).

After Step S21A, the control portion main body 3232 compares the designed offset voltage value information stored in the memory 3233 with an output value V outputted from the position sensor 59.

Specifically, first, the control portion main body 3232 determines whether or not the output value V is Vdd/2−P or more based on the designed offset voltage value information (Step S21B).

In the case where the control portion main body 3232 determines "N", i.e., in the case where the control portion main body 3232 determines that the output value V is less than Vdd/2−P in Step S21B, the control portion main body 3232 increases the offset correction parameter stored in the correction parameter storage 5913 of the position sensor 59 (Step S21C), and stores the changed offset correction parameter in the correction parameter storage 5913 (Step S21D).

More specifically, the state in which the output value V is determined to be less than Vdd/2−P in Step S21B corresponds to the following state: an output value smaller than the value in which an allowable value P is taken into consideration with respect to the offset voltage value Vdd/2 in terms of design is outputted from the position sensor 59 when each light shielding vane 52 is placed at an offset reference position where the opening area becomes an intermediate opening area $S_{mid}$ due to the above-mentioned production error occurring in the optical diaphragm 5.

After Step S21D, the process returns to Step S21B again, and the above-mentioned Steps S21B to S21D are repeated until "Y" is determined, i.e., the output value V is determined to be Vdd/2−P or more in Step S21C. More specifically, the offset correction parameter is increased and rewritten in Steps S21C and S21D, whereby the output characteristics corrector 5912 performs the above-mentioned offset correction based on the rewritten offset correction parameter. Then, the output characteristics of the hall element 5911 are corrected by the offset correction, whereby the output value V to be Vdd/2−P or more is outputted from the hall element 5911.

In the case where the control portion main body 3232 determines "Y", i.e., the control portion main body 3232 determines that the output value V is Vdd/2−P or more in Step S21B, the control portion main body 3232 determines whether or not the output value V is Vdd/2+P or less based on the designed offset value information (Step S21E).

In the case where the control portion main body 3232 determines "N", i.e., the control portion main body 3232 determines that the output value V exceeds Vdd/2+P in Step S21E, the control portion main body 3232 decreases the offset correction parameter stored in the correction parameter storage 5913 (Step S21F). Then, in Step S21D, the control portion main body 3232 stores the changed offset correction parameter in the correction parameter storage 5913.

More specifically, the state in which the output value V is determined to exceed Vdd/2+P in Step S21E corresponds to the state in which an output value larger than the value in which an allowable value P is taken into consideration with respect to the offset voltage value Vdd/2 in terms of design is outputted from the position sensor 59 when each light shielding vane 52 is placed at an offset reference position where the intermediate opening area $S_{mid}$ is obtained due to the above-mentioned production error occurring in the optical diaphragm 5.

After the offset correction parameter is decreased in Step S21F, and the offset correction parameter is rewritten in Step S21D, the process is returned to Step S21B again, and the above-mentioned steps S21B to S21F are repeated until "Y" is determined, i.e., the output value V is determined to be Vdd/2+P or less in Step S21F. More specifically, the offset correction parameter is decreased and rewritten in Steps S21F and S21D, whereby the output characteristics corrector 5912 performs the above-mentioned offset correction based on the rewritten offset correction parameter. Then, owing to the offset correction, the output characteristics of the hall element 5911 are corrected, and the output value V to be Vdd/2+P or less is outputted from the hall element 5911.

Owing to the calibration of the offset correction parameter (Step S21) as described above, the output value V from the hall element 5911 falls within a range of Vdd/2−P or more and Vdd/2+P or less when each light shielding vane 52 is placed at an offset reference position where the intermediate opening area $S_{mid}$ is obtained.

After Step S21, the control portion main body 3232 calibrates an gain correction parameter (Step S22).

Figure 17:
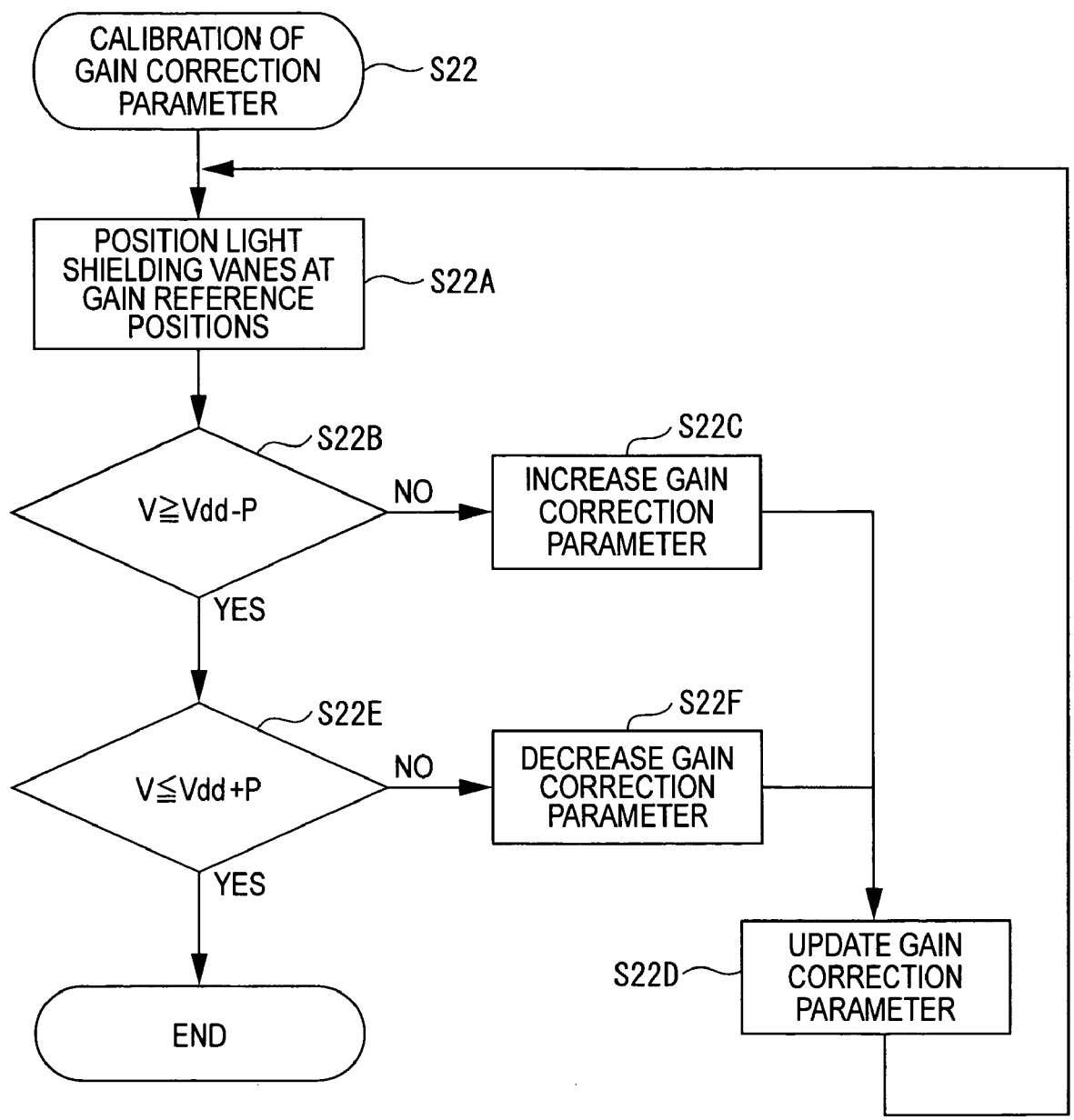
FIG. 17 is a flowchart illustrating a gain correction parameter calibrating method in the third exemplary embodiment.

Specifically, FIG. 17 is a flowchart illustrating an gain correction parameter calibrating method.

First, the control portion main body 3232 reads maximum driving value information stored in the memory 3233, and outputs an maximum driving value based on the maximum driving value information to the mechanical diaphragm driving device 340. The mechanical diaphragm driving device 340 rotates the diaphragm ring 56 by a rotation amount in accordance with the maximum driving value, and places each light shielding vane 52 at a reference position (an gain reference position) where the opening area becomes a maximum opening area $S_{max}$ (Step S22A: Light shielding vane positioning step).

After Step S22A, the control portion main body 3232 compares the designed maximum output voltage value information stored in the memory 3233 with an output value V outputted from the position sensor 59.

Specifically, first, the control portion main body 3232 determines whether or not the output value V is Vdd−P or more based on the designed offset voltage value information (Step S22B).

In the case where the control portion main body 3232 determines "N", i.e., in the case where the control portion main body 3232 determines that the output value V is less than Vdd−P in Step S22B, the control portion main body 3232 increases the gain correction parameter stored in the correction parameter storage 5913 of the position sensor 59 (Step S22C), and stores the changed gain correction parameter in the correction parameter storage 5913 (Step S22D).

More specifically, the state in which the output value V is determined to be less than Vdd−P in Step S22B corresponds to the following state: an output value smaller than the value in which an allowable value P is taken into consideration with respect to the maximum output voltage value Vdd in terms of design is outputted from the hall element 5911 when each light shielding vane 52 is placed at an gain reference position where the opening area becomes a maximum opening area $S_{max}$ due to the above-mentioned production error occurring in the optical diaphragm 5.

After Step S22D, the process returns to Step S22B again, and the above-mentioned Steps S22B to S22D are repeated until "Y" is determined, i.e., the output value V is determined to be Vdd−P or more in Step S22C. More specifically, the gain correction parameter is increased and rewritten in Steps S22C and S22D, whereby the output characteristics corrector 5912 performs the above-mentioned gain correction based on the rewritten gain correction parameter. Then, the output characteristics of the hall element 5911 are corrected by the gain correction, whereby the output value V to be Vdd−P or more is outputted from the hall element 5911.

In the case where the control portion main body 3232 determines "Y", i.e., the control portion main body 3232 determines that the output value V is Vdd−P or more in Step S22B, the control portion main body 3232 determines whether or not the output value V is Vdd+P or less based on the designed maximum output voltage value information (Step S22E).

In the case where the control portion main body 3232 determines "N", i.e., the control portion main body 3232 determines that the output value V exceeds Vdd+P in Step S22E, the control portion main body 3232 decreases the gain correction parameter stored in the correction parameter storage 5913 (Step S22F). Then, in Step S21D, the control portion main body 3232 stores the changed gain correction parameter in the correction parameter storage 5913.

More specifically, the state in which the output value V is determined to exceed Vdd+P in Step S22E corresponds to the state in which an output value larger than the value in which an allowable value P is taken into consideration with respect to the maximum output voltage value Vdd in terms of design is outputted from the hall element 5911 when each light shielding vane 52 is placed at an gain reference position where the maximum opening area $S_{max}$ is obtained due to the above-mentioned production error occurring in the optical diaphragm 5.

After the gain correction parameter is decreased in Step S22F, and the gain correction parameter is rewritten in Step S22D, the process is returned to Step S22B again, and the above-mentioned steps S22B to S22F are repeated until "Y" is determined, i.e., the output value V is determined to be Vdd+P or less in Step S22F. More specifically, the gain correction parameter is decreased and rewritten in Steps S22F and S22D, whereby the output characteristics corrector 5912 performs the above-mentioned gain correction based on the rewritten gain correction parameter. Then, owing to the gain correction, the output characteristics of the hall element 5911 are corrected, and the output value V to be Vdd+P or less is outputted from the hall element 5911.

Owing to the calibration of the gain correction parameter (Step S22) as described above, the output value V from the hall element 5911 falls within a range of Vdd−P or more and Vdd+P or less when each light shielding vane 52 is placed at an gain reference position where the maximum opening area $S_{max}$ is obtained. Further, as described above, in the gain correction, the tilt of the output characteristics in the hall element 5911 is changed with the offset voltage value Vof being a reference, so the output value V falling within the range of P or less based on the designed minimum output voltage value information is outputted from the hall element 5911 when the permanent magnet 582 is placed at a position where each light shielding vane 52 achieves the minimum opening area $S_{min}$. More specifically, owing to the calibration of the gain correction parameter, in the same way as in the first exemplary embodiment, the output characteristics in the hall element 5911 are corrected to the output characteristics corresponding to the opening area−voltage value associated information stored in the memory 64.

The above-mentioned Steps S21B to S21F and Steps S22B to S22F correspond to the parameter updating step according to the invention.

The correction parameters are calibrated in the above-mentioned Steps S21 and S22.

In the above-mentioned Embodiment 3, the following effects are obtained in addition to the effects substantially similar to those in the first exemplary embodiment.

The correction parameter calibrator 300 of this embodiment places each light shielding vane 52 at a predetermined reference position using the mechanical diaphragm driving device 340 under the condition that the optical diaphragm 5 is assembled, and updates the correction parameters based on the output value outputted from the position sensor 59. Therefore, it is not necessary to update the correction parameters under the condition that the optical diaphragm 5 is mounted on the projector 1, and the correction parameters can be updated using the optical diaphragm 5 alone and the correction parameter calibrator 300, whereby the efficiency of the operation space for updating the correction parameters can be enhanced. Further, compared with the configuration in which a light beam is irradiated to the optical diaphragm 5 and the correction parameters are updated based on a light beam via the optical diaphragm 5, the correction parameters can be calibrated satisfactorily without depending upon a working environment.

The invention is not limited to the above-mentioned embodiments, and includes alteration, modification, and the like as long as they are within the scope in which the object of the invention can be achieved.

In each embodiment, although the correction parameter storage 5913 is provided in the position sensor 59, the invention is not limited thereto, and for example, a correction parameter storage similar to the correction parameter storage 5913 may be provided in the control device 6 of the projector 1. The output characteristics corrector 5912 of the position sensor 59 reads correction parameters stored in the correction parameter storage provided in the control device 6, and performs an offset correction or a gain correction.

In each embodiment, the configuration of the optical diaphragm 5 is not limited to the configuration described in each embodiment, and an optical diaphragm with other configurations may be adopted.

In Embodiments 1 and 2, when the gain correction parameter is corrected, the permanent magnet 582 is placed at a gain reference position where the maximum output voltage value Vdd is outputted from the position sensor 59 in permanent magnet positioning steps S4A and S13A. Further, in Steps S4C, S13C, S4F, and S13F, the maximum light amount information is compared with the detection light amount LX. The invention is not limited to this configuration, and in each of the above-mentioned steps, the permanent magnet 582 may be placed at a gain reference position where the minimum output voltage value 0 is outputted from the position sensor 59, and the minimum light amount information may be compared with the detection light amount LX.

Similarly, in Embodiment 3, when the gain correction parameter is corrected, each light shielding vane 52 is placed at a gain reference position where the maximum opening area $S_{max}$ is obtained in light shielding vane positioning step S22A. Further, in Steps S22B and S22E, the designed maximum output value information is compared with the output value V. The invention is not limited to this configuration, and in each of the above-mentioned steps, each light shielding vane 52 may be placed at a gain reference position where the minimum opening area $S_{min}$ is obtained, and the designed minimum output value information may be compared with the output value V.

In each of the above-mentioned embodiments, the optical diaphragm 5 is provided between the first lens array 412 and the second lens array 413. However, the invention is not limited thereto, and the optical diaphragm 5 may be placed at any position in an optical path of a light beam irradiated from the light source device 411 to each liquid crystal panel 441, such as a position between the light source device 411 and the first lens array 412.

In each of the above-mentioned embodiments, although the projector 1 using three liquid crystal panels 441 has been described, the invention is not limited thereto. For example, the invention is applicable to a projector using only one liquid crystal panel, a projector using two liquid crystal panels, or a projector using four or more liquid crystal panels.

In each of the above-mentioned embodiments, although the optical unit 4 has a substantially L-shape in a plan view, it may adopt other shapes. For example, the optical unit 4 may have a substantially U-shape in a plan view.

In each of the above-mentioned embodiments, only an example of a front-type projector that performs projection in a direction of observing a screen has been described. However, the invention is also applicable to a rear-type projector that performs projection on an opposite side from the direction of observing a screen.

In each of the above-mentioned embodiments, although the transmission-type liquid crystal panel 441 is adopted as an optical modulator, the invention is not limited thereto, and a reflection-type liquid crystal panel, Digital Micromirror Device (Trade Mark of Textile Instrument Co., Ltd.), Grating Light Valve (GLV) Device (Trade Mark of Silicon Light Machines Inc.) using a diffraction phenomenon of light, etc. may be adopted.

In each of the above-mentioned embodiments, the configuration in which the optical diagram 5 is mounted on the projector 1 has been described. However, the optical diaphragm 5 may be mounted on other optical appliances such as a camera, instead of the projector 1. Further, in the case where the optical diaphragm 5 is mounted on the camera, the optical diaphragm 5 may be used as a lens shutter or the like as well as a diaphragm.

The preferred configuration for carrying out the invention has been disclosed in the above description. However, the invention is not limited thereto. More specifically, although the invention has been particularly shown and described regarding particular embodiments, those skilled in the art can variously modify the shape, material, quantity, and the other detailed configurations with respect to the above-mentioned embodiments, without departing from the technical idea and object of the invention.

Thus, the description limiting the shape, material, and the like as disclosed in the above is shown merely for an illustrative purpose so as to make the invention understood easily, and does not limit the invention. Therefore, the description of names of members with the limitation of a shape, a material, and the like omitted partially or entirely is also included in the invention.

The optical diaphragm of the invention can simplify a configuration, and realize the stable driving by moving light shielding vanes with high precision. Therefore, the optical diaphragm of the invention is useful for a projector used in presentation, home theater, or the like.

What is claimed is:

1. An optical diaphragm for adjusting an amount of an incident light beam, comprising:
    light shielding vanes that are configured movably, and
        move to change an opening area enabling a passage of the light beam, thereby adjusting the amount of the light beam;

an electromagnetic actuator including a coil through which a current passes, and a permanent magnet that generates a magnetic flux, moves with respect to the coil by an electromagnetic force due to an interaction between the current passing through the coil and the magnetic flux, and is connected to the light shielding vanes to move the light shielding vanes; and a position detector including: a magnetic element that outputs a predetermined voltage in accordance with intensity of a magnetic field from the permanent magnet; and an output characteristics corrector that obtains a predetermined correction parameter, and corrects output characteristics of the magnetic element based on the predetermined correction parameter, wherein the predetermined correction parameter is an offset correction parameter for, under a condition that the permanent magnet is placed at a defined position at which the opening area becomes a predetermined opening area, offsetting a position of the permanent magnet with respect to a defined voltage value so that the magnetic element outputs the predetermined voltage, thereby correcting output characteristics.

2. The optical diaphragm according to claim 1, wherein the predetermined correction parameter is a gain correction parameter that, when the permanent magnet is placed in a range from a first position where the opening area becomes a minimum opening area to a second position where the opening area becomes a maximum opening area, corrects output characteristics so that the magnetic element outputs each designed voltage value in terms of design so as to correspond to each position in the range of the permanent magnet.

3. The optical diaphragm according to claim 1, wherein: the position detector includes a correction parameter storage that stores the predetermined correction parameter so that the predetermined correction parameter is rewritable; and the output characteristics corrector reads the predetermined correction parameter stored in the correction parameter storage, and corrects output characteristics of the magnetic element based on the read correction parameter.

4. A projector, comprising:
a light source device;
an optical modulator that modulates a light beam irradiated from the light source device;
a projection optical device that enlarges and projects the light beam modulated in the optical modulator;
an optical diaphragm that is placed in an optical path of the light beam irradiated from the light source device to the optical modulator, and adjusts a light amount of the light beam irradiated from the light source device to the optical modulator; and
a control device for controlling the optical diaphragm, wherein:
the optical diaphragm includes:
light shielding vanes that are configured movably, and move to change an opening area enabling a passage of the light beam, thereby adjusting the amount of the light beam;
an electromagnetic actuator including a coil through which a current passes, and a permanent magnet that generates a magnetic flux, moves with respect to the coil by an electromagnetic force due to an interaction between the current passing through the coil and the magnetic flux, and is connected to the light shielding vanes to move the light shielding vanes; and
a position detector including: a magnetic element that outputs a predetermined voltage in accordance with intensity of a magnetic field from the permanent magnet; and an output characteristics corrector that obtains a predetermined correction parameter, and corrects output characteristics of the magnetic element based on the predetermined correction parameter, wherein the predetermined correction parameter is an offset correction parameter for, under a condition that the permanent magnet is placed at a defined position at which the opening area becomes a predetermined opening area, offsetting a position of the permanent magnet with respect to a defined voltage value so that the magnetic element outputs the predetermined voltage, thereby correcting output characteristics; and the control device drives and controls the electromagnetic actuator based on an output value from the position detector.

5. The projector according to claim 4, wherein:
the control device includes a correction parameter storage that stores the predetermined correction parameter so that the predetermined correction parameter is rewritable; and the output characteristics corrector reads the predetermined correction parameter stored in the correction parameter storage, and corrects output characteristics of the magnetic element based on the read correction parameter.

6. A correction parameter calibrator system for calibrating a correction parameter, the correction parameter calibrator system comprising:
a projector, including:
a light source device; an optical modulator that modulates a light beam irradiated from the light source device; a projection optical device that enlarges and projects the light beam modulated in the optical modulator; an optical diaphragm that is placed in an optical path of the light beam irradiated from the light source device to the optical modulator, and adjusts a light amount of the light beam irradiated from the light source device to the optical modulator; and a projector-side control device that drives the light source device, the optical modulator, and the optical diaphragm, wherein the optical diaphragm includes:
light shielding vanes that are configured movably, and move to change an opening area enabling a passage of the light beam, thereby adjusting the amount of the light beam;
an electromagnetic actuator including a coil through which a current passes and a permanent magnet that generates a magnetic flux, moves with respect to the coil by an electromagnetic force due to an interaction between the current passing through the coil and the magnetic flux, and is connected to the light shielding vanes to move the light shielding vanes; and
a position detector including: a magnetic element that outputs a predetermined voltage in accordance with intensity of a magnetic field from the permanent magnet; an output characteristics corrector that obtains a predetermined correction parameter, and corrects output characteristics of the magnetic element based on the predetermined correction parameter; and a correction parameter storage that stores the predetermined correction parameter so that the predetermined correction parameter is rewritable, the projector-side control device drives and controls the electromagnetic actuator based on an output value from the position detector; and a correction parameter calibrator that includes:

a calibration-side control device that outputs a predetermined control instruction to the projector-side control device to drive the projector; and a light-beam detector that detects a light amount of an optical image enlarged and projected from the projector, and outputs detection light amount information on the light amount, the calibration-side control device includes:

a light amount information storage that stores reference light amount information on a reference light amount to be a reference;

an output value information storage that stores reference output value information on a reference output value to be a reference;

a light source driving control device that causes the projector-side control device to drive the light source device, and causes the light source device to irradiate a light beam;

a diaphragm driving control portion that causes the projector-side control device to drive the electromagnetic actuator, and places the permanent magnet at a reference position where the reference output value based on the reference output value information is outputted from the position detector; and a parameter updating portion that updates the predetermined correction parameter stored in the correction parameter storage so that a detection light amount based on the detection light amount information outputted from the light-beam detector becomes substantially the same as the reference light amount based on the reference light amount information.

7. A correction parameter calibrator system for calibrating a correction parameter, the correction parameter calibrator system comprising:

an optical diaphragm that adjusts an amount of an incident light beam, wherein the optical diaphragm includes:

light shielding vanes that are configured movably, and move to change an opening area enabling a passage of the light beam, thereby adjusting the amount of the light beam;

an electromagnetic actuator including a coil through which a current passes and a permanent magnet that generates a magnetic flux, moves with respect to the coil by an electromagnetic force due to an interaction between the current passing through the coil and the magnetic flux, and is connected to the light shielding vanes to move the light shielding vanes; and a position detector including: a magnetic element that outputs a predetermined voltage in accordance with intensity of a magnetic field from the permanent magnet; an output characteristics corrector that obtains a predetermined correction parameter, and corrects output characteristics of the magnetic element based on the predetermined correction parameter; and a correction parameter storage that stores the predetermined correction parameter so that the predetermined correction parameter is rewritable, and a correction parameter calibrator that includes:

a correction light source device that irradiates a light beam to the optical diaphragm;

a light-beam detector that detects an amount of a light beam irradiated from the correction light source device via the optical diaphragm; and a calibration-side control device that drives and controls the correction light source device and the electromagnetic actuator; and the calibration-side control device includes:

a light amount information storage that stores reference light amount information on a reference light amount to be a reference;

an output value information storage that stores reference output value information on a reference output value to be a reference;

a light source driving control device that causes the correction light source device to irradiate a light beam;

a diaphragm driving control portion that drives and controls the electromagnetic actuator based on an output value outputted from the position detector, and places the permanent magnet at a reference position where the reference output value based on the reference output value information is outputted from the position detector; and a parameter updating portion for updating the predetermined correction parameter stored in the correction parameter storage so that a detection light amount based on the detection light amount information outputted from the light-beam detector becomes substantially the same as the reference light amount based on the reference light amount information.

8. The correction parameter calibrator system according to claim 7, wherein the correction light source device comprises a solid light-emitting element.

9. A correction parameter calibrator system for calibrating a correction parameter, the correction parameter calibrator system comprising:

an optical diaphragm that adjusts an amount of an incident light beam, wherein the optical diaphragm includes:

light shielding vanes that are configured movably, and move to change an opening area enabling a passage of the light beam, thereby adjusting the amount of the light beam;

an electromagnetic actuator including a coil through which a current passes and a permanent magnet that generates a magnetic flux, moves with respect to the coil by an electromagnetic force due to an interaction between the current passing through the coil and the magnetic flux, and is connected to the light shielding vanes to move the light shielding vanes; and a position detector including: a magnetic element that outputs a predetermined voltage in accordance with intensity of a magnetic field from the permanent magnet; an output characteristics corrector that obtains a predetermined correction parameter, and corrects output characteristics of the magnetic element based on the predetermined correction parameter; and a correction parameter storage that stores the predetermined correction parameter so that the predetermined correction parameter is rewritable; and a correction parameter calibrator that includes:

a mechanical diaphragm driving device that is mechanically connected to the optical diaphragm to drive it, thereby placing each of the light shielding vanes at a predetermined position; and a calibration-side control device that drives the mechanical diaphragm driving device; and the calibration-side control device includes:
   an output value information storage that stores reference output value information on a reference output value to be a reference;
   a mechanical diaphragm driving control portion that drives the mechanical diaphragm driving device to place each of the light shielding vanes at a predetermined reference position; and
   a parameter updating portion that updates the predetermined correction parameter stored in the correction parameter storage so that an output value outputted from the position detector becomes substantially the same as a reference output value based on the reference output value information.

10. A correction parameter calibrating method that calibrates a correction parameter using a correction parameter calibrator system, the correction parameter calibrator system comprises:
   a projector, including:
      a light source device; an optical modulator that modulates a light beam irradiated from the light source device; a projection optical device that enlarges and projects the light beam modulated in the optical modulator; an optical diaphragm that is placed in an optical path of the light beam irradiated from the light source device to the optical modulator, and adjusts a light amount of the light beam irradiated from the light source device to the optical modulator, and a projector-side control device for driving the light source device, the optical modulator, and the optical diaphragm, the optical diaphragm including:
      light shielding vanes that are configured movably, and move to change an opening area enabling a passage of the light beam, thereby adjusting the amount of the light beam;
      an electromagnetic actuator including a coil through which a current passes;
      a permanent magnet that generates a magnetic flux, moves with respect to the coil by an electromagnetic force due to an interaction between the current passing through the coil and the magnetic flux, and is connected to the light shielding vanes to move the light shielding vanes; and
      a position detector including: a magnetic element that outputs a predetermined voltage in accordance with intensity of a magnetic field from the permanent magnet; an output characteristics corrector that obtains a predetermined correction parameter, and corrects output characteristics of the magnetic element based on the predetermined correction parameter; and a correction parameter storage that stores the correction parameter so that the correction parameter is rewritable,
   the projector-side control device driving and controlling the electromagnetic actuator based on an output value from the position detector,
   the correction parameter calibrating method comprising:
      a light-beam irradiation step of causing the projector-side control device to drive and control the light source device, and causing the light source device to irradiate a light beam;
      a permanent magnet positioning step of causing the projector-side control device to drive and control the electromagnetic actuator, and placing the permanent magnet at a reference position where a reference output value to be a reference is outputted from the position detector, wherein the predetermined correction parameter is an offset correction parameter for, under a condition that the permanent magnet is placed at a defined position at which the opening area becomes a predetermined opening area, offsetting a position of the permanent magnet with respect to a defined voltage value so that the magnetic element outputs the predetermined voltage, thereby correcting output characteristics;
      a light-beam detection step of detecting a light amount of a optical image enlarged and projected from the projector; and
      a parameter updating step of updating the predetermined correction parameter stored in the correction parameter storage so that a detection light amount detected in the light-beam detection step becomes substantially the same as a reference light amount to be a reference.

11. A correction parameter calibrating method that calibrates a correction parameter using a correction parameter calibrator system, the correction parameter calibrator system that comprises:
   an optical diaphragm for adjusting an amount of an incident light beam, the optical diaphragm including:
      light shielding vanes that are configured movably, and move to change an opening area enabling a passage of the light beam, thereby adjusting the light amount of the light beam;
      an electromagnetic actuator including a coil through which a current passes; and a permanent magnet that generates a magnetic flux, moves with respect to the coil by an electromagnetic force due to an interaction between the current passing through the coil and the magnetic flux, and is connected to the light shielding vanes to move the light shielding vanes; and
      a position detector including a magnetic element that outputs a predetermined voltage in accordance with intensity of a magnetic field from the permanent magnet, an output characteristics corrector that obtains a predetermined correction parameter, and corrects output characteristics of the magnetic element based on the predetermined correction parameter, and a correction parameter storage that stores the predetermined correction parameter so that the predetermined correction parameter is rewritable,
   the correction parameter calibrating method comprising:
      a permanent magnet positioning step of driving and controlling the electromagnetic actuator, and placing the permanent magnet at a reference position where a reference output value to be a reference is outputted from the position detector;
      a light-beam detection step of detecting an amount of a light beam via the optical diaphragm; and
      a parameter updating step of updating the predetermined correction parameter stored in the correction parameter storage so that a detection light amount detected in the light-beam detection step becomes substantially the same as a reference light amount to be a reference, wherein the predetermined correction parameter is an offset correction parameter for, under a condition that the permanent magnet is placed at a defined position at which the opening area becomes a predetermined opening area, offsetting a position of the permanent magnet with respect to a defined voltage value so that the magnetic element outputs the predetermined voltage, thereby correcting output characteristics.

12. A correction parameter calibrating method that calibrates a correction parameter using a correction parameter calibrator system, the correction parameter calibrator system comprises:

an optical diaphragm for adjusting an amount of an incident light beam, the optical diaphragm including:
light shielding vanes that are configured movably, and move to change an opening area enabling a passage of the light beam, thereby adjusting the light amount of the light beam;
an electromagnetic actuator including a coil through which a current passes; and a permanent magnet that generates a magnetic flux, moves with respect to the coil by an electromagnetic force due to an interaction between the current passing through the coil and the magnetic flux, and is connected to the light shielding vanes to move the light shielding vanes; and
a position detector including a magnetic element that outputs a predetermined voltage in accordance with intensity of a magnetic field from the permanent magnet, an output characteristics corrector that obtains a predetermined correction parameter, and corrects output characteristics of the magnetic element based on the predetermined correction parameter, and a correction parameter storage that stores the predetermined correction parameter so that the predetermined correction parameter is rewritable, the correction parameter calibrating method comprising:
a light shielding vane positioning step of placing each of the light shielding vanes at a predetermined reference position; and
a parameter updating step of updating the predetermined correction parameter stored in the correction parameter storage so that an output value outputted from the position detector becomes substantially the same as a reference output value to be a reference, wherein the predetermined correction parameter is an offset correction parameter for, under a condition that the permanent magnet is placed at a defined position at which the opening area becomes a predetermined opening area, offsetting a position of the permanent magnet with respect to a defined voltage value so that the magnetic element outputs the predetermined voltage, thereby correcting output characteristics.

* * * * *